US012724920B2

(12) United States Patent
Arkoff et al.

(10) Patent No.: US 12,724,920 B2
(45) Date of Patent: Sep. 1, 2026

(54) MEDICAL DATA GOVERNANCE AND DETERMINISTIC ARBITRATION SYSTEM FOR EVIDENCE-BOUND ARTIFICIAL INTELLIGENCE OUTPUTS

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/433,438

(22) Filed: Dec. 26, 2025

(65) Prior Publication Data

US 2026/0121859 A1 Apr. 30, 2026

Related U.S. Application Data

(63) Continuation-in-part of application No. 18/520,430, filed on Nov. 27, 2023.

(51) Int. Cl.
*G06F 21/62* (2013.01)
*G06F 21/64* (2013.01)
*G06Q 50/26* (2024.01)

(52) U.S. Cl.
CPC .......... *G06F 21/6245* (2013.01); *G06F 21/64* (2013.01); *G06Q 50/265* (2013.01)

(58) Field of Classification Search
None
See application file for complete search history.

(56) References Cited

U.S. PATENT DOCUMENTS

2021/0294920 A1* 9/2021 Sachs ...................... G06F 21/10
2025/0307418 A1* 10/2025 Spencer ................ G06F 21/577
(Continued)

OTHER PUBLICATIONS

Chamarthi, Praveen et al., "Protect sensitive data in RAG applications with Amazon Bedrock", AWS Blogs, Apr. 2025, 12 pages. (Year: 2025).*

*Primary Examiner* — Michael Pyzocha
(74) *Attorney, Agent, or Firm* — IP Consulting Group; Michael Razavi; Alfred F. Hoyte, Jr.

(57) ABSTRACT

A system and method are disclosed for policy-constrained symbolic rendering of artificial intelligence outputs using deterministic evidence structures and authenticated display controls. Governed records derived from device, clinical, operational, environmental, or multi modal data are normalized, lineage-tracked, and assembled into deterministic evidence packs whose ranking, augmentation, pruning, and ordering are reproducible and traceable. Governed prompts constructed from these evidence packs are provided to internal or external artificial intelligence models under controlled, deterministic invocation parameters. Candidate model outputs—textual or multimodal—are symbolically interpreted, evaluated by a multi-policy engine, and constrained into compliant renderable forms. A cryptographic render-token architecture binds each constrained output to its governing evidence, policy state, model and tokenizer identity, viewport or session binding, environmental conditions, temporal validity, and decision lineage. A display gate renders only upon successful token validation and revocation checks. Correction-propagation mechanisms revoke affected tokens, perform deterministic replay, and issue superseding views for reliable, auditable use in safety-critical environments.

20 Claims, 14 Drawing Sheets

(56) References Cited

U.S. PATENT DOCUMENTS

| | | | | |
|---|---|---|---|---|
| 2025/0307456 | A1* | 10/2025 | Burns | G06F 21/6245 |
| 2025/0378155 | A1* | 12/2025 | Manton | G06F 21/6209 |
| 2026/0023842 | A1* | 1/2026 | Neystadt | G06F 21/45 |
| 2026/0039618 | A1* | 2/2026 | Lin | H04L 51/212 |
| 2026/0044490 | A1* | 2/2026 | Cunningham | G06F 16/2365 |
| 2026/0058993 | A1* | 2/2026 | Bleeker | H04L 63/108 |
| 2026/0058997 | A1* | 2/2026 | Qureshi | H04L 63/20 |
| 2026/0075055 | A1* | 3/2026 | Solnik | H04L 63/10 |
| 2026/0105172 | A1* | 4/2026 | Waltermann | G06F 21/6218 |

* cited by examiner

ENERGY- AND GRID-AWARE GOVERNANCE WORKFLOW (1000)

CORRECTION PROPAGATION AND SUPERSESSION WORKFLOW (1200)

MEDICAL DATA GOVERNANCE AND DETERMINISTIC ARBITRATION SYSTEM FOR EVIDENCE-BOUND ARTIFICIAL INTELLIGENCE OUTPUTS

CROSS-REFERENCE TO RELATED APPLICATIONS

This application is a Continuation-in-Part (CIP) of U.S. patent application Ser. No. 18/520,430, filed Nov. 27, 2023, entitled "Medical Data Governance System," published as U.S. Publication No. 2024/0096460, which itself is a Continuation-in-Part of U.S. patent application Ser. No. 16/940,477, filed Jul. 28, 2020, entitled "Medical Data Governance System," published as U.S. Publication No. 2023/0197214, which claims the benefit of U.S. Provisional Application No. 62/880,019, filed Jul. 29, 2019. The disclosures of all referenced applications are incorporated herein by reference in their entireties.

FIELD OF THE INVENTION

The present invention relates to computer-implemented systems for generating, validating, and governing artificial intelligence outputs in regulated environments. More specifically, the invention concerns deterministic construction of evidence contexts, sentence level verification of model outputs against cryptographically protected governed records, and cryptographic enforcement of an output rendering pathway through a compliance-controlled display gate.

BACKGROUND OF THE INVENTION

Large language models and related generative AI systems are increasingly used to assist in producing summaries, clinical interpretations, operational guidance, and other forms of domain-specific reasoning. However, existing systems suffer from inherent limitations: they may generate statements not supported by source data, may omit important contraindications or restrictions, and often lack a mechanism to bind their outputs to verified underlying evidence. These deficiencies pose significant risks in regulated domains such as healthcare, finance, and safety-critical industries, where each statement produced by an automated system may influence human decision-making and must therefore be traceable, auditable, and consistent with controlled records.

Conventional retrieval-augmented generation architectures do not ensure deterministic selection of evidence, do not enforce consistent utilization of context windows, and cannot guarantee that two identical requests yield reproducible outputs. Likewise, typical guardrail systems evaluate only the generated text, without cryptographically binding the text to governed records, without enforcing verifiable provenance, and without protecting against bypass of the output rendering layer.

Existing EMR, data warehouse, and consent-management systems provide storage and access control over records but are not designed to provide, and do not natively implement, deterministic evidence pack formation for AI inputs, sentence-level verification of model outputs, or compliance gating of the final rendered text. Moreover, conventional architectures lack integrated mechanisms for cryptographic render tokens, replay-invariant audit trails, or deterministic correction propagation when governed data changes.

Emerging national and federal artificial intelligence initiatives contemplate centralized AI platforms operated by government science or energy agencies. These platforms aggregate large scale compute, scientific and clinical datasets, and shared foundation models that are intended to be accessed by multiple institutions, including hospitals, life sciences organizations, and operators of critical infrastructure such as electric grids. Although these platforms can accelerate scientific discovery, they typically do not provide a governed interface tailored to regulated environments that require provenance aware data use, institution specific policies, and complete auditability of AI assisted decisions.

Existing artificial intelligence systems deployed in clinical and other regulated environments often generate outputs that are not directly traceable to specific medical evidence or governed records. In many cases, model outputs include statements that are partially supported, unsupported, or contradicted by the underlying data, a phenomenon sometimes referred to as hallucination. Conventional systems typically do not provide a technical mechanism to ensure that a clinician sees only those statements that are consistent with available medical evidence and institutional policies, nor do they provide a complete audit trail suitable for regulatory review. Regulators and professional bodies have indicated that artificial intelligence used in clinical decision making should be transparent, evidence grounded, and auditable, but existing architectures lack an integrated arbitration and governance layer that enforces these requirements at the point where model outputs are rendered.

The growth of such centralized AI infrastructure also raises concerns about energy consumption and stability of the underlying power grid. Large scale model training and inference jobs can create highly variable demand on regional power systems, while hospitals and other safety critical operators must preserve sufficient reserves to maintain clinical and operational safety. Existing AI platforms and scheduling systems do not provide a unified governance mechanism that coordinates model invocation and output rendering with real time grid state, institutional policy, and safety constraints, particularly where AI outputs may influence clinical care, life sciences workflows, or energy system operations.

Emerging artificial intelligence platforms increasingly support autonomous or semi-autonomous agents that can sequence tasks, initiate their own model invocations, construct analytic workflows, or perform iterative refinement of outputs without continuous human oversight. As these platforms evolve, they may incorporate automated research, self-optimization, or self-modification capabilities that enable rapid development of new models or decision procedures. When such systems interface with safety-critical environments, the absence of deterministic governance mechanisms creates technical hazards, because even small defects in data selection, context formation, or policy interpretation may propagate across multiple automated actions at machine speed.

In high-capability platforms, an autonomous agent may repeatedly generate or revise model-assisted content, workflows, or configurations using intermediate outputs as inputs to later steps. Without deterministic evidence context formation, citation-bound verification, or policy-constrained rendering, a single unsupported or contradicted assumption can recursively influence subsequent outputs. This phenomenon can lead to recurrent defect propagation, in which an unchecked defect multiplies across tasks and models, creating systemic inconsistencies that cannot be detected by conventional monitoring or conventional guardrail layers that operate only on final model text.

Accordingly, there is a technical need for a computer-implemented governance system that remains stable even as external model capabilities accelerate, agentic workflows expand, and new model versions appear without prior institutional coordination. Such a system must impose deterministic evidence selection, reproducible invocation conditions, sentence level verification, and cryptographically enforced rendering controls so that institutional policies, consent requirements, and safety prerequisites remain effective regardless of changes in external model behavior or multi-agent orchestration patterns.

Existing approaches to safety checking and clinical validation of artificial intelligence outputs are often implemented as batch style workflows or slow human review steps that are not compatible with interactive clinical use. In many conversational systems, safety or checklist based review is performed after a complete response has been generated, which either introduces unacceptable latency into a bedside workflow or is skipped under time pressure. As a result, institutions are forced to choose between unsafe but responsive artificial intelligence tools and safer tools that are too slow for real time use in clinical decision support or other regulated environments.

Conventional artificial intelligence systems typically perform evidence retrieval, model invocation, verification, policy enforcement, and content rendering in loosely coupled or independent subsystems. Such fragmentation prevents deterministic reconstruction, weakens auditability, and allows unsupported or non-compliant content to reach users. The disclosed invention addresses these limitations by providing a unified technical architecture in which governed data ingestion, deterministic evidence pack construction, deterministic model invocation, arbitration, policy evaluation, and cryptographic display-gate enforcement are tightly integrated. This integration enables deterministic replay, verified provenance, and policy-compliant rendering in regulated environments.

Accordingly, there is a need for an improved computer-implemented system that:

- deterministically constructs evidence contexts from governed, cryptographically signed records;
- invokes AI models under deterministic constraints ensuring reproducibility and compliance;
- verifies each output sentence against governed evidence using structured contradiction and support analysis; and
- enforces a cryptographically controlled display gate such that no model output may be rendered to a human viewer unless it satisfies policy requirements and is bound to a valid render token.

The present invention addresses these deficiencies.

Emerging AI platforms increasingly use mixtures of models and agents that operate over heterogeneous data, including structured records, free text, medical images, continuous physiological traces, and video streams. In such systems, video segments may be represented as sequences of key-frames with spatial object tags and temporal indices, and agent frameworks may decompose complex tasks into multiple specialized experts. Although these architectures increase expressive power, they also increase governance risk, because candidate outputs may be derived from non-textual evidence in ways that are difficult for human reviewers to trace or reconstruct. Conventional logging mechanisms typically record only coarse grained events, and do not provide deterministic reconstruction of which multi modal governed records, model identities, and policy states gave rise to each rendered output.

Regulatory Landscape

Regulatory authorities, including the United States Food and Drug Administration, have issued guidance indicating that artificial intelligence and machine learning based software used in medical decision making should follow good machine learning practice, maintain traceable records of data and model development, support monitoring of real world performance over the product life cycle, and provide clear, meaningful information to users about model behavior, limitations, and updates. In some embodiments, the disclosed system is configured to support these expectations by requiring that model assisted outputs rendered to clinicians are grounded in governed medical records, that an arbitration engine and policy evaluator determine which portions of candidate model output may be shown in view of applicable regulatory and ethical policies, and that a compliance ledger records, for each rendered view, the evidence packs, model identities, verification results, and policy decisions involved. This combination of governed data, arbitration, policy evaluation, and persistent logging enables artificial intelligence behavior that is transparent, evidence grounded, and auditable in a manner consistent with emerging regulatory expectations for trustworthy artificial intelligence in clinical workflows.

Definitions

Data—Any clinical, operational, administrative, numerical, textual, waveform, video, audio, sensor, metadata, or derived information originating from a human, machine, software system, device, or artificial intelligence component. Data may be continuous or discrete, raw or processed, structured or unstructured, anonymized or identifying, and may originate from medical devices, monitoring systems, laboratory analyzers, imaging systems, wearable sensors, EMR/HIS platforms, journaling systems, third-party applications, or derived computational transformations.

Data Affinity Analysis Component—A subsystem configured to detect association inconsistencies, temporal conflicts, measurement anomalies, or device-capability mismatches within governed records, and to generate corrected governed records with lineage tracking. In some embodiments, this component is implemented as an affinity analysis engine 812 as shown in FIG. 8.

Governed Data—Any data element that has been associated with one or more identifiers, normalized, time-aligned when appropriate, and protected through a cryptographic integrity mechanism such as a signature, hash, or message authentication code. Governed data includes amended versions, lineage relationships, consent or purpose metadata, structured or unstructured representations, summaries, and computed derivatives.

Governed Store—Any storage system capable of persisting governed data, lineage information, integrity metadata, consent metadata, and related attributes. A governed store may be implemented using relational databases, document stores, graph structures, object stores, streaming logs, or equivalent technologies and may operate in centralized, distributed, encrypted, on-premises, cloud, hybrid, or replicated environments.

Token—As used herein, a token refers to a minimal unit of data that is provided as input to, or produced as output by, a model. Tokens may represent natural language text segments, numerical values, structured fields, image features, video keyframe descriptors, audio feature vectors, or other modality specific representations. Tokens are therefore not limited to textual units, and the term token is intended to encompass any discrete representation by which a model processes information.

Candidate output—refers to any content produced by a model prior to arbitration and policy evaluation. Candidate outputs may include natural language text, structured data, numerical control recommendations, image or video annotations, keyframe-level tags, or composite outputs that combine multiple modalities, each such output being subject to evidence-bound arbitration and policy evaluation prior to any rendering or export.

Ingest Subsystem—Any component or combination of components that receives data, converts it into a normalized representation, associates identifiers, verifies provenance, aligns timestamps, applies integrity protections, and delivers governed data to the governed store. This may include drivers, adapters, converters, parsers, protocol handlers, or streaming processors.

Normalized Data—Any data that has undergone unit conversion, nomenclature mapping, schema alignment, sampling alignment, time normalization, semantic harmonization, or comparable processing to achieve a consistent internal format. Normalization may reference clinical or technical standards but is not limited to any specific schema or convention.

Identifier—Any symbol, token, label, numerical value, or handle used to associate a record with a patient, provider, device, location, event, workflow, time interval, or process. Identifiers may be permanent, temporary, pseudonymous, anonymized, hashed, surrogate, or synthetic.

Evidence Pack—A deterministically constructed set of governed data, metadata, and derived representations selected for use in model invocation. An evidence pack may include governed records, summaries, structured data, text segments, token sequences, abstractions, semantic features, or any representation of informational content. Its contents and ordering are determined by deterministic logic, including ranking, scoring, context-capacity constraints, acceptance-band rules, or tokenizer identity. In some embodiments, an evidence pack further includes non-textual governed records such as image-feature tensors, video keyframe descriptors, spatial object tags, or other multimodal evidence elements that are linked to the same governed identifiers, timestamps, and provenance metadata as textual governed records.

Model—Any computational system capable of mapping inputs to outputs using learned parameters, rules, heuristics, retrieval mechanisms, or combinations thereof. A model may produce text, values, classifications, predictions, summaries, explanations, or decisions, and may take the form of a large language model, neural network, statistical model, retrieval-augmented system, multimodal model, image or video model, code model, reinforcement-learning agent, rule-based expert system, or mixture-of-experts architecture. Models may be executed locally, remotely, or across distributed platforms. In some embodiments, an external platform exposes a collection of models or agents, and each such model or agent is treated as a typed principal subject to the same deterministic invocation semantics, governance constraints, arbitration logic, and render token-based display gating mechanisms described herein.

Deterministic Replay—refers to the ability of the system to reconstruct prior outputs, verification states, policy decision states, and rendering decisions by reexecuting evidence pack formation, governed prompt construction, model invocation, arbitration, and policy evaluation using recorded identifiers, model parameters, tokenizer identity, and governing metadata.

Token Window, Context Capacity, Utilization—Representational regions and constraints associated with a model's input capacity. Token window refers to the portion of representational space available; context capacity denotes the maximum number of tokens permitted; utilization describes the number or proportion of tokens consumed. These concepts apply regardless of tokenizer, architecture, or runtime configuration.

Tokenizer Identity—Any version, configuration, hash, signature, or distinguishing attribute associated with a tokenizer used to convert text to tokens or tokens to text. Tokenizer identity enables consistent interpretation across sessions and supports deterministic replay.

Deterministic Generation Controller—Any mechanism that invokes an artificial intelligence model under deterministic conditions, such as fixed decoding parameters, absence of sampling randomness, pinned model versions, enforcement of tokenizer identity, governed prompt hashing, and reproducibility guarantees. The controller may operate in decentralized or centralized architectures.

Arbitration Engine—Any mechanism that evaluates candidate model output by comparing it to governed data to determine support, contradiction, omission, equivalence, or inconsistency. Arbitration may involve sentence segmentation, semantic comparison, numeric consistency checks, temporal alignment, prerequisite validation, contradiction detection, and token-level analysis.

Policy Evaluator—Any system capable of applying versioned rules associated with consent, purpose of use, clinician role, jurisdiction, safety prerequisites, governance requirements, institutional protocols, or workflow policies. The evaluator may interpret hierarchical, dynamic, external, or embedded rule sets and produces a policy trace describing evaluation outcomes.

Policy Decision State—is a deterministic, machine-interpretable structure that encodes the outcome of evaluating versioned policies against arbitration results, governed record metadata, user attributes, jurisdictional constraints, purpose-of-use declarations, and environmental or safety conditions. The policy decision state determines the allowable rendering action and is reproducible during deterministic replay.

Deterministic Evidence Pack Reconstruction—As used herein, deterministic evidence pack reconstruction refers to the process by which the evidence pack constructor reexecutes deterministic scoring, ranking, eligibility filtering, selection, and ordering procedures using all relevant governed records when a user request implicates governed records not included in the currently active evidence pack.

Absence-of-Evidence Classification—is a deterministic process by which the system classifies a user request or model-generated statement as unsupported due to the absence of corresponding governed records in the governed store, thereby preventing model-generated statements on such topics from being rendered.

Supersession Trace—is an immutable ledger entry that links an original rendering event to a revised or superseding rendering event following correction, amendment, or supersession of governed records. The supersession trace records lineage, revocation, policy versions, environmental state, and evidence identifiers associated with both the original and updated outputs.

Display Gate—A controlled rendering mechanism that determines whether candidate or transformed output may be displayed. The display gate may allow, constrain, mask, modify, escalate, or block output and serves as the exclusive authorized pathway by which any model output may reach a viewport or user.

Render Token—is a cryptographically authenticated and verifiable artifact that binds a rendered or constrained output to at least an evidence pack identifier, a citation checksum, a model identity, a tokenizer identity, a policy version identifier, a viewport or session identifier, and temporal validity metadata. A render token may be implemented using digital signatures, message authentication codes, cryptographic hashes, authenticated data structures, or encrypted or time-bounded constructs, and may incorporate watermarking or lineage metadata linking the rendered output to governed evidence. A render token is required for all rendering actions and must be validated as non-expired, non-revoked, structurally correct, and matched to a corresponding entry in the compliance ledger before any display or export operation is permitted. In some embodiments, a render token generator is responsible for constructing render tokens that bind a candidate output to the applicable policy state, evidence pack, canonical deterministic ordering, and execution metadata prior to display gating.

Masking—Any operation that removes, hides, alters, redacts, or transforms unsupported or restricted content prior to display while preserving readability, grammar, or contextual coherence. Masking may depend on arbitration results, policy restrictions, or role-based visibility.

Compliance Ledger—Any append-only or tamper-evident recording system that captures identifiers, evidence pack identifiers, governed prompt hashes, model invocation parameters, arbitration results, policy traces, gate decisions, lineage changes, and supersession events. The ledger may use cryptographic linking, sequential logging, or blockchain-style structures.

Replay—The ability to reconstruct a past decision or output using recorded identifiers, governed data, tokenizer identity, model version, decoding parameters, and applicable policies. Replay ensures deterministic reproduction of prior outputs.

Correction Propagation—The automated process by which updates to governed data trigger reevaluation of earlier decisions. A superseding view replaces an earlier output when reevaluation produces a different result under updated data or policies.

Consensus Arbitration—Any mechanism involving multiple models whose independent outputs are compared to determine agreement, equivalence, contradiction, or consensus against predefined thresholds. Consensus may involve absolute or relative scoring, weighting, or rule-based criteria.

Deployment Environment—Any computing environment in which the system operates, including on-premises servers, private clouds, public clouds, hybrid environments, distributed systems, edge devices, mobile devices, or combinations thereof.

Viewport—Any interface or environment through which content is presented. A viewport may be a device display, application window, embedded module, or remote visualization. A client framework enforces render token requirements associated with that viewport.

User or Agent—A user may be a human, a process, or a software system. An agent may be an autonomous or semi-autonomous computation operating under explicit role, privilege, and purpose constraints.

Workflow, Question, or Request—Any inquiry, instruction, command, or action that triggers governed data retrieval, evidence pack construction, model invocation, arbitration, policy evaluation, or rendering decisions.

Citation Checksum—is a deterministic hash, digest, or authenticated summary of the set of governed record identifiers or other structured citations supporting constrained output, and must be reproducible under deterministic replay to validate that rendered content remains cryptographically bound to the underlying governed evidence.

Session Identifier—Any identifier that associates a rendering action with a specific authenticated user session, device session, workflow instance, or display context. A session identifier prevents reuse of a render token outside the intended session.

Constrained Output—refers to candidate model output that has been processed by the arbitration engine and the policy evaluator to remove, mask, redact, or transform unsupported, contradicted, or disallowed elements while preserving grammatical coherence and rendering eligibility.

Verification Structure—A structured representation produced by the arbitration engine that maps portions of candidate output to supporting or contradicting governed records, lists detected inconsistencies, and summarizes verification results for use by the policy evaluator and display gate.

Deterministic Ordering—An ordering of governed records, tokens, or evidence elements determined by an algorithm that produces the same order whenever provided with the same inputs, governed records, tokenizer identity, and selection rules, independent of runtime variability or nondeterministic factors.

Deterministic Rules—refer to selection, ranking, comparison, augmentation, pruning, or evaluation operations that produce repeatable outputs for identical inputs. Such rules operate solely on defined inputs and constraints and exclude randomness, stochastic behavior, or nondeterministic execution effects. Deterministic rules may be applied throughout evidence selection, evidence pack formation, arbitration, and policy evaluation to enable reproducible and auditable system behavior.

Deterministic Decoding Settings—Model invocation parameters, including but not limited to temperature, nucleus sampling parameters, beam settings, or decoding modes, that are configured to produce identical token sequences for identical prompts, models, and tokenizers across repeated executions.

Machine-Interpretable Policy Rules—Structured policy instructions represented in a form executable by a computing system, including conditional expressions, constraints, filters, or logic structures governing visibility, data access, jurisdictional controls, or rendering permissions that are automatically evaluated by the policy evaluator.

Validity Interval—A time interval encoded within or associated with a render token defining the period during which the token is considered valid for rendering operations. The validity interval may determine expiration, revocation conditions, or update requirements when governed data changes.

Deterministic Utilization Computation—A computational process that determines the proportion or number of tokens consumed relative to available context capacity using fixed algorithms and tokenizer identity, enabling reproducible decisions about augmentation or pruning during evidence pack formation.

Governed Prompt Hash—A hash or cryptographic digest generated from the governed prompt, including its structure, selected governed records, and ordering, enabling reproducibility, auditability, and verification during deterministic replay.

Viewport Identifier—An identifier associated with a specific rendering context, device display, output channel, or user interface instance to which a render token is bound, preventing rendered output from being transferred to unauthorized or mismatched viewing contexts.

External Scientific AI Platform—an external computing environment operated by a governmental, national, federal, or collaborative scientific organization and configured to provide authenticated access to foundation models, datasets, high-performance computing resources, or AI inference services. An external scientific AI platform may host scientific, clinical, engineering, or population-level datasets and may execute model invocations initiated by participating institutions.

External Model Connector—a controlled interface through which the system invokes a model, dataset, or agent hosted on an external scientific AI platform, the connector being configured to enforce deterministic invocation semantics, auditable parameter passing, tokenizer identity consistency, metadata capture, and policy-controlled access constraints for each external model invocation.

Scientific Dataset Identifier—an identifier referencing a dataset residing on an external scientific AI platform, the identifier being recordable in the compliance ledger and usable by the evidence pack constructor or deterministic generation controller when constructing governed prompts or evidence packs that incorporate external data resources.

Governed External Invocation—an invocation of a model or computational workload hosted on an external scientific AI platform that is executed through the external model connector under deterministic, auditable, and policy-controlled conditions, and whose resulting outputs are subject to arbitration, verification, and rendering governance in the same manner as outputs produced by local models.

Energy or Grid State Signal—a machine-interpretable input describing current, forecasted, or emergency energy system conditions, including electrical load, reserve capacity, energy price, frequency stability, or grid emergency declarations, the signal being receivable by the system for use in policy evaluation or orchestration decisions.

Energy-Aware Policy Rule—a machine-interpretable rule that conditions execution of a model invocation, deferral of an AI workload, or authorization of a rendered output on one or more energy or grid state signals, including thresholds, safety margins, priority assignments, or permitted operational envelopes associated with energy system status.

External Platform Job Identifier—a recordable identifier associated with a job, model execution, dataset access, or computational workflow performed on an external scientific AI platform, the identifier being storable in the compliance ledger such that the provenance of rendered content can be reconstructed.

Participating Institution—a regulated entity, such as a hospital, laboratory, life sciences organization, or operator of energy or safety-critical infrastructure, that accesses external scientific AI platforms through the system and is subject to local institutional policies, consent constraints, safety rules, and regulatory requirements.

Workload Criticality Rating—a machine-interpretable classification describing the operational priority or safety relevance of a model invocation or analytic workload, including categories such as time-critical clinical support, high-priority infrastructure control, or non-urgent analytical tasks, the rating being usable by the policy evaluator in conjunction with energy or grid state signals.

Hallucination—As used in this specification, a hallucinated statement is a statement produced by a model that is not supported by, or is contradicted by, the governed records in the relevant evidence pack, when evaluated under the arbitration logic described herein.

Institutional Identifier Sources—Systems that provide validated patient, device, or encounter identifiers, including patient-registration systems, master patient indices, or ADT feeds, used to supplement or correct identifiers originating from device data streams.

Canonical Deterministic Ordering—refers to an ordering of governed records, identifiers, or evidence elements that is produced by a deterministic algorithm such that the same ordered sequence is generated whenever the same governed records and associated metadata are provided as inputs. Canonical deterministic ordering may be implemented using stable ranking rules, lexicographic comparators, authenticated data structures, or other algorithms that yield an unambiguous and reproducible ordering suitable for deterministic reconstruction, hashing, and audit.

Evidence Pack Identifier (Evidence Pack ID)—refers to a deterministic, cryptographic, or hash-based identifier that uniquely represents the specific composition, canonical deterministic ordering, and associated metadata of a deterministic evidence pack. The evidence pack identifier may be computed from hashes of governed record identifiers, canonical deterministic ordering, tokenizer identity, formatting parameters, and other metadata fields sufficient to ensure that the identifier is reproducible, verifiable, and suitable for deterministic replay, lineage validation, provenance verification, and binding of render tokens or other downstream artifacts to the precise evidence context from which a constrained output was derived.

Governed Prompt—is a deterministic assembly of governed records, metadata, and structural formatting derived from a deterministic evidence pack, constructed under tokenizer-identity rules and used as the reproducible input to deterministic model invocation.

Governed Agent—is a software agent, including an artificial intelligence or autonomous computational agent, whose actions are mediated by the governance system described herein. A governed agent may initiate requests, retrieve information, propose workflows, or generate candidate outputs, but each such action is constrained by policies encoded in the policy evaluator, must be grounded in governed evidence packs, and is subject to arbitration, render token validation and display gating in the same manner as human-initiated requests.

Tokenization—refers to the process by which the governance system generates, assigns, validates, and manages one or more render tokens or authorization tokens that bind a candidate output, request, or action to a specific governance context, including applicable policies, governed evidence packs, canonical deterministic ordering, model or agent identity, and execution metadata. Tokenization, as used herein, is a governance and authorization mechanism and is distinct from linguistic or model-internal tokenization used for text encoding or inference.

Model Fitness Condition—As used herein, a model fitness condition refers to a set of declared assumptions, metadata constraints, and operating ranges associated with a model or decision engine under which the model's outputs are considered valid and eligible for rendering. Model fitness conditions may include, without limitation, data acquisition modality, measurement resolution or precision, reference ranges, temporal validity, institutional protocols, regulatory definitions, and environmental or operational context. A violation of a model fitness condition does not imply model error or malfunction, but indicates that the model is being applied outside the scope of its declared validity.

Contextual Drift—As used herein, contextual drift refers to a condition in which one or more inputs, reference values, acquisition modalities, governing definitions, or contextual parameters presented to a model differ from those present during model training, validation, or authorization, such that one or more declared model fitness conditions are no longer satisfied.

SUMMARY OF THE INVENTION

The systems and methods disclosed herein provide a computer-implemented governance architecture that controls how artificial intelligence outputs are prepared, verified, policy-evaluated, and rendered in clinical applications and other regulated decision environments. In various embodiments, the architecture operates as an evidence-bound and policy-constrained rendering pipeline in which candidate model output is verified against governed records and is rendered only through a controlled display gate that enforces cryptographic authorization and audit logging.

In some embodiments, the disclosed system is configured to interpose between one or more models, agents, or external artificial intelligence platforms and a regulated deployment environment. The system constrains candidate outputs to governed evidence packs, applies sentence-level verification and machine-interpretable policy rules, and enforces cryptographically controlled rendering so that institutional policies, consent restrictions, safety prerequisites, and regulatory constraints remain effective across model versions, agentic workflows, and deployment configurations.

In one aspect, the invention provides a governed data layer that receives clinical, operational, or sensor-derived data in heterogeneous formats and transforms such data into integrity-protected governed records. In some embodiments, an ingestion and signing service normalizes units, sampling intervals, identifiers, and time windows; associates incoming data with validated identifiers; and applies an integrity protection mechanism, such as a digital signature, message authentication code, or cryptographic hash, to produce governed records. A governed store persists governed records, maintains lineage among original and corrected records, binds policy-relevant metadata (including consent, declared purpose attributes, role visibility, jurisdictional tags, and workflow classifications), and exposes query interfaces for deterministic retrieval.

In another aspect, the invention provides a deterministic evidence pack constructor that forms a reproducible evidentiary context for model invocation. In some embodiments, for a given question or workflow request, the evidence pack constructor retrieves candidate governed records according to deterministic selection criteria over identifiers, time bounds, location, device type, and context; applies deterministic scoring and ranking; and produces a canonical deterministic ordering of selected governed records. The constructor may enforce a representational capacity acceptance band using a tokenizer identity and a context capacity parameter, deterministically augmenting or pruning governed records to keep the evidence pack within specified bounds while preserving required facet coverage. The resulting evidence pack includes the canonical deterministic ordering, an evidence pack identifier, and a citation checksum, each deterministically derived from the selected governed records and configuration parameters.

In a further aspect, the invention provides a deterministic generation controller that invokes one or more models under reproducible invocation conditions. In some embodiments, the deterministic generation controller constructs a governed prompt from the evidence pack, verifies tokenizer identity consistency between evidence pack formation and model invocation, and applies a deterministic decoding configuration that yields repeatable tokens for identical inputs and settings. The controller records invocation metadata including model identity and version, tokenizer identity, evidence pack identifier, governed prompt hash, decoding parameters, timestamps, and contextual identifiers, and transmits such metadata to a compliance ledger for audit and replay.

In another aspect, the invention provides an arbitration engine that verifies candidate model output against the governed evidence pack. In some embodiments, the arbitration engine segments candidate output into sentences or other atomic units and evaluates each unit against governed records in the evidence pack, optionally including additional governed records retrieved from the governed store. The arbitration engine classifies each unit relative to the governed data context, including supported, contradicted, or not addressed classifications, and may perform numerical tolerance evaluation, time-window alignment, prerequisite validation, contradiction detection, and semantic comparison. The arbitration engine generates a verification structure that associates segments of candidate output with classifications, referenced governed record identifiers, and evaluation metadata.

In another aspect, the invention provides a policy evaluator that applies versioned machine-interpretable policy rules to verification results and governed metadata. In some embodiments, policy rules incorporate consent attributes, declared purpose of use, role-based visibility, jurisdiction-specific constraints, institutional protocols, ethical and review requirements, and safety prerequisites. The policy evaluator produces a policy decision state that specifies whether candidate output may be rendered, must be constrained, must be deferred, or must be blocked, and may generate policy traces or rule evaluation records for audit.

In another aspect, the invention provides a display gate and render token enforcement layer that serves as an authorized rendering boundary for model-assisted content. In some embodiments, the display gate receives candidate output, verification structures, policy decision state, and session context and selects an action, including allowing rendering, constraining content, escalating for review, deferring execution, or blocking. For allowed or constrained content, the display gate applies removal, masking, redaction, or semantic transformation operations to produce constrained output, including token-level masking for unsupported or disallowed spans in some embodiments. The display gate issues a cryptographically authenticated render token that binds the constrained output to an evidence pack identifier, citation checksum, model identity, tokenizer identity, policy version, and viewport or session identifiers, and may further encode a validity interval and revocation conditions. Client frameworks, network controls, or controlled rendering interfaces enforce that content is rendered only when a valid, current render token is presented. In some embodiments, a watermark generator embeds visible or invisible watermarks into rendered content, cryptographically linking rendered views to render tokens and citation checksums.

In another aspect, the invention provides a compliance ledger and audit subsystem that records a replayable representation of evidence selection, model invocation, verification, policy evaluation, rendering decisions, and export actions. In some embodiments, the compliance ledger stores append-only ledger entries including evidence pack identifiers, canonical deterministic ordering references, governed prompt hashes, decoding settings, model identity and version, verification structures, policy decision states, gate actions, and associated cryptographic artifacts. The compliance ledger supports deterministic replay by enabling reconstruction of the evidence pack, governed prompt, invocation settings, and policy conditions for a prior rendering decision, and supports generation of exportable audit bundles for internal governance, quality review, and regulatory verification.

In yet another aspect, the invention provides correction propagation, revocation, and supersession mechanisms that respond to changes in governed data, policy, or other upstream inputs. In some embodiments, when governed records are corrected, superseded, or otherwise invalidated, the system identifies affected evidence packs, render tokens, constrained outputs, or rendered views, and initiates a deterministic reevaluation workflow. The system may rebuild evidence packs, rerun arbitration and policy evaluation using recorded versions and configuration parameters, and determine whether prior renderings remain valid or require supersession. Render tokens associated with invalidated views may be revoked so that client devices refuse rendering, and superseding outputs may be issued through the display gate with updated evidence bindings and policy state, with supersession traces recorded in the compliance ledger.

In some embodiments, the disclosed system supports streaming and low-latency operation in which evidence pack preparation, arbitration, policy evaluation, constraint application, and render token pre-assembly are performed incrementally as candidate output is produced. Segment-level processing pipelines may perform partial output segmentation, parallel arbitration, incremental policy evaluation, and segment-level constraint generation to provide interactive rendering behavior while preserving evidence binding, policy enforcement, and auditability.

In some embodiments, the system governs multi-modal evidence and model interfaces. Governed records may include structured data, free text, image features, video keyframe descriptors, physiological traces, and other modality-specific representations, each of which is subject to evidence-bound arbitration, policy evaluation, and render-token-controlled display gating prior to rendering. The evidence pack constructor may deterministically select and package such governed records, and model invocation metadata may identify the models, agents, decoding configurations, and tokenization identities used for each modality. Arbitration and policy evaluation may apply to candidate outputs expressed as text, structured codes, image annotations, or video tags, and the display gate constrains and authorizes rendering according to the same evidence-bound and policy-constrained semantics.

In some embodiments, the system supports multi-model invocation and consensus. Two or more models may be invoked on the same governed prompt and evidence pack, and arbitration may verify each candidate output independently. A consensus module may determine eligibility for rendering based on configured agreement criteria, and disagreements may trigger constraint, escalation, or blocking, with corresponding audit records stored in the compliance ledger.

In some embodiments, the system supports governed agents and orchestration workflows. Agents may initiate requests, propose workflows, or generate candidate outputs under explicit roles, consent envelopes, declared purposes, time scopes, and least-privilege authorization. Agent actions are mediated by deterministic evidence pack formation, arbitration, policy evaluation, and display gating in the same manner as human-initiated requests, and orchestration logic may be versioned and recorded to support reproducible workflow execution.

In some embodiments, the disclosed system supports multi-tenant deployments. Each tenant institution may maintain distinct governed stores, policy rule sets, cryptographic materials, and administrative boundaries while sharing arbitration, verification, display gating, and audit services under logical and cryptographic separation. In various embodiments, while clinical examples are described, the same technical mechanisms may be applied to other regulated environments including financial surveillance, insurance, government benefits determinations, pharmaceutical safety, industrial control systems, and critical infrastructure operations.

In some embodiments, the disclosed system provides a governed interface to external model platforms, including centralized scientific or governmental artificial intelligence platforms. External dataset identifiers, platform job identifiers, external model versions, compute configurations, and response metadata may be recorded in the compliance ledger, and outputs returned from external platforms may be subjected to the same arbitration, policy evaluation, and display gating constraints as locally hosted models, thereby preserving evidence binding and auditability across institutional boundaries.

In some embodiments, the policy evaluator and orchestration components accept external state signals, including energy or grid state signals, and apply energy-aware policy rules to determine whether model invocation or rendering may proceed, should be deferred, or must be blocked under current environmental conditions. Deferred workloads may be queued and reevaluated when conditions change, and energy-aware decision metadata may be recorded in the compliance ledger as part of the audit trail.

In some embodiments, the system maintains model metadata describing conditions under which a model was trained, validated, or authorized for use, including data acquisition modality, measurement resolution or precision, expected reference ranges, temporal scope, institutional protocols, and applicable regulatory definitions. During operation, incoming data and contextual parameters may be evaluated against stored model metadata to determine whether model fitness conditions are satisfied, and the system may block rendering, require revalidation or fine-tuning, or apply policy-driven restrictions or annotations when conditions fall outside the declared validity scope.

The disclosed systems improve the functioning of computer systems used in regulated environments by providing evidence context formation, reproducible model invocation, sentence-level verification against governed records, machine-interpretable policy evaluation, cryptographic authorization of rendering, and replayable auditability with correction propagation and supersession tracking. These mechanisms reduce propagation of unsupported content to user interfaces and provide verifiable provenance and policy context for each rendered view.

As used in this specification, a model-generated statement is "supported," "unsupported," "contradicted," "not addressed," or "evidence-consistent" according to comparison against governed records contained in a deterministic evidence pack under deterministic comparison rules. References to "truthful," "accurate," "complete," or "valid" statements refer exclusively to statements classified as supported by governed records in the deterministic evidence pack and do not invoke extrinsic notions of truth or correctness.

The foregoing summary is illustrative and is not intended to limit the scope of the invention, which is defined by the claims and their equivalents.

DETAILED DESCRIPTION OF THE DRAWINGS

FIG. 1

Figure 1:
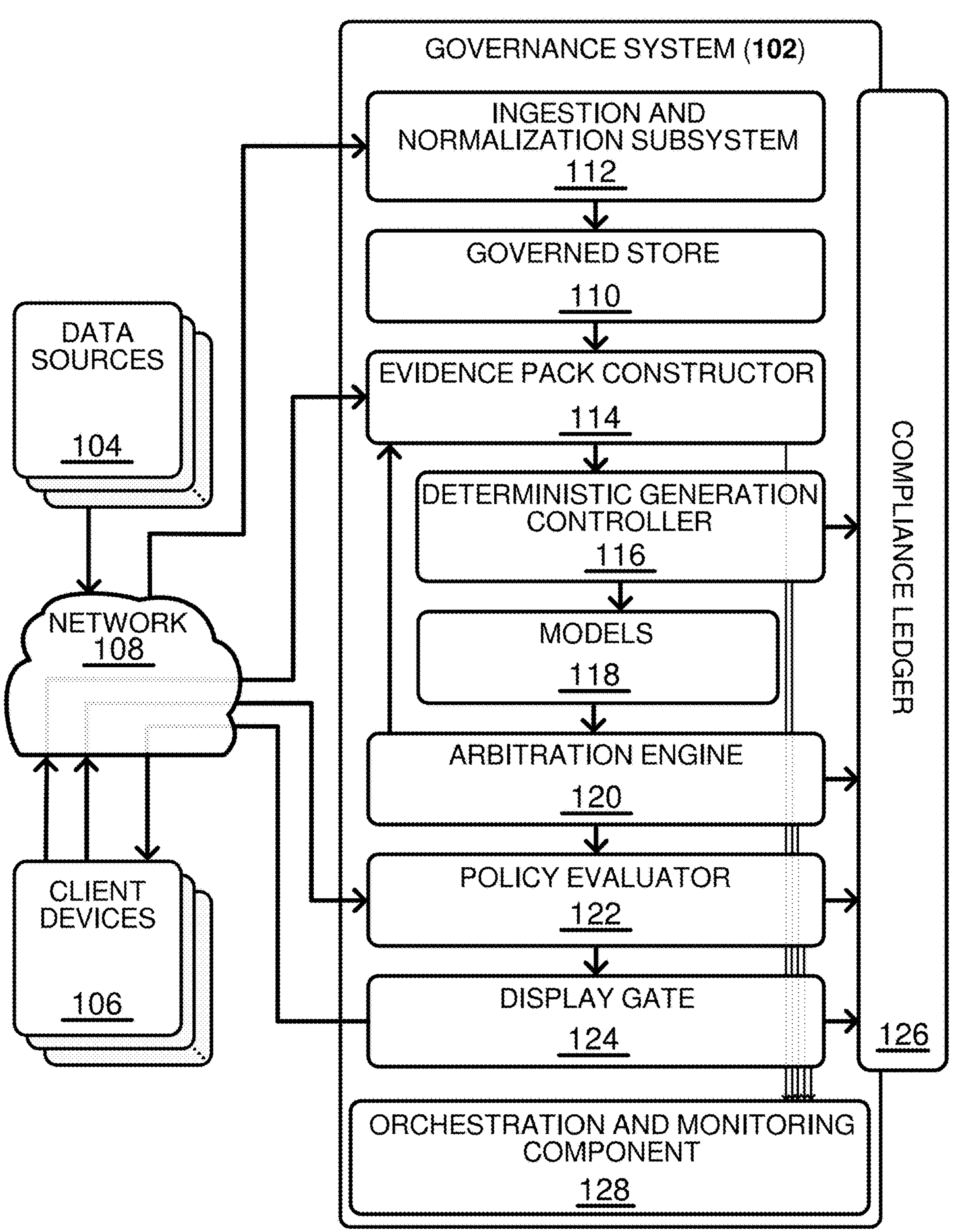
FIG. 1 is a schematic block diagram of a policy-constrained symbolic rendering pipeline, showing the interaction among a model output generator, a context-aware symbolic interpreter, a policy engine, a deterministic evidence pack constructor, a display gate, and an audit and compliance subsystem.

FIG. 1 illustrates an example computing environment 100 in which a deterministic governance system 102 operates to control ingestion, preparation, model invocation, verification, policy evaluation, and rendering of AI-assisted outputs. The environment 100 may include one or more data sources 104, one or more user or client devices 106, a network 108, and the governance system 102 itself, which in turn includes a governed store 110, an ingestion and normalization subsystem 112, an evidence pack constructor 114, a deterministic generation controller 116, one or more models 118, an arbitration engine 120, a policy evaluator 122, a display gate 124, and a compliance ledger 126. In some embodiments, an orchestration and monitoring component 128 coordinates the timing and sequencing of model invocations and rendering requests, but such orchestration functionality may be distributed across the other components.

The data sources 104 represent devices and systems from which governed data is obtained. In a clinical embodiment, the data sources 104 may include medical devices such as vital sign monitors, infusion pumps, ventilators, laboratory systems, imaging systems, and electronic health record or hospital information systems. In other embodiments, the data sources 104 may include industrial control systems, energy management systems, grid telemetry sources, or other operational technology. The data sources 104 may produce structured or unstructured data, including time-series measurements, event logs, orders, reports, or derived analytic outputs.

The client devices 106 represent user-facing systems such as clinician workstations, mobile devices, bedside terminals, or operator consoles that are capable of displaying AI-assisted information to human users. In some embodiments, the client devices 106 execute application software that presents user interfaces for reviewing governed records, initiating questions or requests, receiving constrained outputs from the display gate 124, and acknowledging or acting on model-assisted recommendations. The client devices 106 may be connected to the governance system 102 over the network 108, or may be co-located in the same facility.

The network 108 represents any combination of local area networks, wide area networks, hospital networks, datacenter fabrics, or secure virtual networks used to carry messages between the data sources 104, the client devices 106, and the governance system 102. In some embodiments, the network 108 includes segmented or firewalled links that ensure that only constrained and token-authorized content traverses into user-facing environments.

Within the governance system 102, the ingestion and normalization subsystem 112 receives data from the data sources 104, associates the data with appropriate identifiers such as patient identifiers or asset identifiers, normalizes the data into a consistent governed format, and applies integrity protection mechanisms before persistence. The ingestion and normalization subsystem 112 may perform unit conversions, time alignment, and parsing of structured messages, and may also validate that incoming data conforms to expected schemas. In some embodiments, the ingestion and normalization subsystem 112 signs or authenticates each governed record using a digital signature or message authentication code, and records provenance metadata describing the source, time of acquisition, and transformation path.

The governed store 110 persists the normalized and integrity-protected governed records. The governed store 110 may maintain lineage relationships between original governed records and corrected or amended versions, such that any later correction of association errors, time-segment errors, or measurement errors can be traced. In some embodiments, the governed store 110 also records consent metadata, role visibility attributes, jurisdictional flags, and other policy-relevant annotations that are later used by the policy evaluator 122. The governed store 110 may provide query interfaces that allow the evidence pack constructor 114 to retrieve governed records based on identifiers, time windows, clinical criteria, or other selection parameters.

The evidence pack constructor 114 is configured to assemble one or more evidence packs in response to a question or request received from a client device 106 or another system component. The evidence pack constructor 114 may apply deterministic selection rules that rank candidate governed records based on relevance, temporal proximity, measurement type, or other criteria, and may then construct a deterministic ordering over selected governed records. The evidence pack constructor 114 may further enforce a context-capacity acceptance band by computing a utilization of representational capacity associated with a tokenizer identity, and applying deterministic augmentation or pruning rules to ensure that the final evidence pack falls between lower and upper utilization thresholds. The evidence pack constructor 114 generates a pack identifier that uniquely identifies the ordered set of governed records, for example by hashing the ordered identifiers and tokenizer identity, and provides the resulting evidence pack to the deterministic generation controller 116.

The deterministic generation controller 116 constructs a governed prompt from the evidence pack produced by the evidence pack constructor 114. The deterministic generation controller 116 may format the evidence pack into a prompt structure that includes governed record snippets, structured citations, or summary encodings, together with the user's question or task specification. Before invoking a model, the deterministic generation controller 116 verifies that the tokenizer identity associated with the selected model 118 matches the tokenizer identity used when constructing the evidence pack. The deterministic generation controller 116 enforces deterministic decoding settings, such as disabling random sampling, fixing temperature and top-k parameters, and using fixed seeds or other procedures that avoid non-deterministic behavior. The deterministic generation controller 116 records model version, tokenizer identity, governed prompt hash, decoding parameters, and the pack identifier, and forwards this metadata to the compliance ledger 126.

The models 118 represent one or more machine learning models or AI systems that are invoked under the control of the deterministic generation controller 116. In various embodiments, the models 118 may include large language models, domain-specific models, retrieval-augmented models, or other AI components. The models 118 produce candidate outputs in response to governed prompts, but these outputs are not directly rendered to users. Instead, candidate outputs are passed to the arbitration engine 120 for verification.

The arbitration engine 120 receives candidate model output from the models 118 and the corresponding evidence pack from the evidence pack constructor 114 or deterministic generation controller 116. The arbitration engine 120 segments the candidate output into sentences or other atomic units, and compares each unit to governed records contained in the evidence pack and, in some embodiments, to additional governed records retrieved from the governed store 110. The arbitration engine 120 classifies each unit as supported, contradicted, or not addressed by the governed data, and may evaluate numerical claims using configured tolerances and verified time windows. The arbitration engine 120 generates a verification structure that associates each segment of candidate output with its support status and referencing governed records, and passes this verification structure to the policy evaluator 122.

The policy evaluator 122 applies versioned machine-interpretable policy rules to the verification structure produced by the arbitration engine 120 and to metadata associated with the governed records involved in the evidence pack. The policy evaluator 122 may consider consent attributes, role-based visibility restrictions, jurisdictional constraints, purpose-of-use rules, and institutional policies that determine which content may be rendered in a particular context. The policy evaluator 122 may produce a policy decision state that indicates whether the candidate output may be rendered as-is, must be constrained or redacted, must be deferred, or must be blocked entirely. In some embodiments, the policy evaluator 122 controls issuance of a render token that is required for any subsequent rendering by the display gate 124.

The display gate 124 enforces a rendering boundary between the governance system 102 and the client devices 106. The display gate 124 receives the candidate output, the verification structure, and the policy decision state from the policy evaluator 122. Based on these inputs, the display gate 124 constrains the candidate output by removing, masking, or transforming unsupported or disallowed portions, while preserving grammatical structure where possible. The display gate 124 generates a render token that cryptographically binds the constrained output to the pack identifier, a citation checksum, model identity, tokenizer identity, and a viewport or session identifier. The render token may also encode a validity interval or revocation conditions. The display gate 124 provides the constrained output and associated render token to the client devices 106 over the network 108, and the client devices 106 are configured to render content only when a valid render token is present. If the render token is invalid, expired, revoked, or absent, the client devices 106 refuse to display the content, thereby preventing bypass of the governance system 102.

The compliance ledger 126 records model invocation metadata, evidence pack identifiers, verification structures, policy decision states, and gate decisions in append-only form. The compliance ledger 126 may be implemented using a tamper-evident data structure, such as an append-only log or blockchain-like mechanism. The compliance ledger 126 enables deterministic replay by providing sufficient information to reconstruct the evidence pack, governed prompt, model invocation settings, and policy evaluation conditions for a prior decision. Using the compliance ledger 126, auditors, regulators, or institutional reviewers may reproduce the arbitration and policy decisions for a specific rendered view, verify that the same outcome is obtained, and inspect the governed records and policies that influenced the decision.

The orchestration and monitoring component 128 coordinates the overall operation of the governance system 102. In some embodiments, the orchestration and monitoring component 128 schedules model invocations, manages resource utilization, monitors latency, and reacts to external signals, such as institutional safety states or other operational constraints, when deciding how and when to initiate requests through the deterministic generation controller 116. The orchestration and monitoring component 128 may also observe error conditions, revoked tokens, or governed record corrections and trigger reevaluation workflows that propagate corrections and generate superseding views where appropriate.

The arrangement shown in FIG. 1 is one example configuration. In other embodiments, some of the illustrated components may be combined, omitted, or distributed across multiple physical or virtual machines. For example, the ingestion and normalization subsystem 112 and the governed store 110 may be implemented as a single data governance platform; the arbitration engine 120 and policy evaluator 122 may be integrated into a combined verification and policy module; or the display gate 124 may be partially implemented on client devices 106 through trusted execution environments that validate render tokens locally. Similarly, the models 118 may be hosted within the same data center as the governance system 102 or may be accessed through external interfaces, as further described in other figures.

FIG. 2

Figure 2:
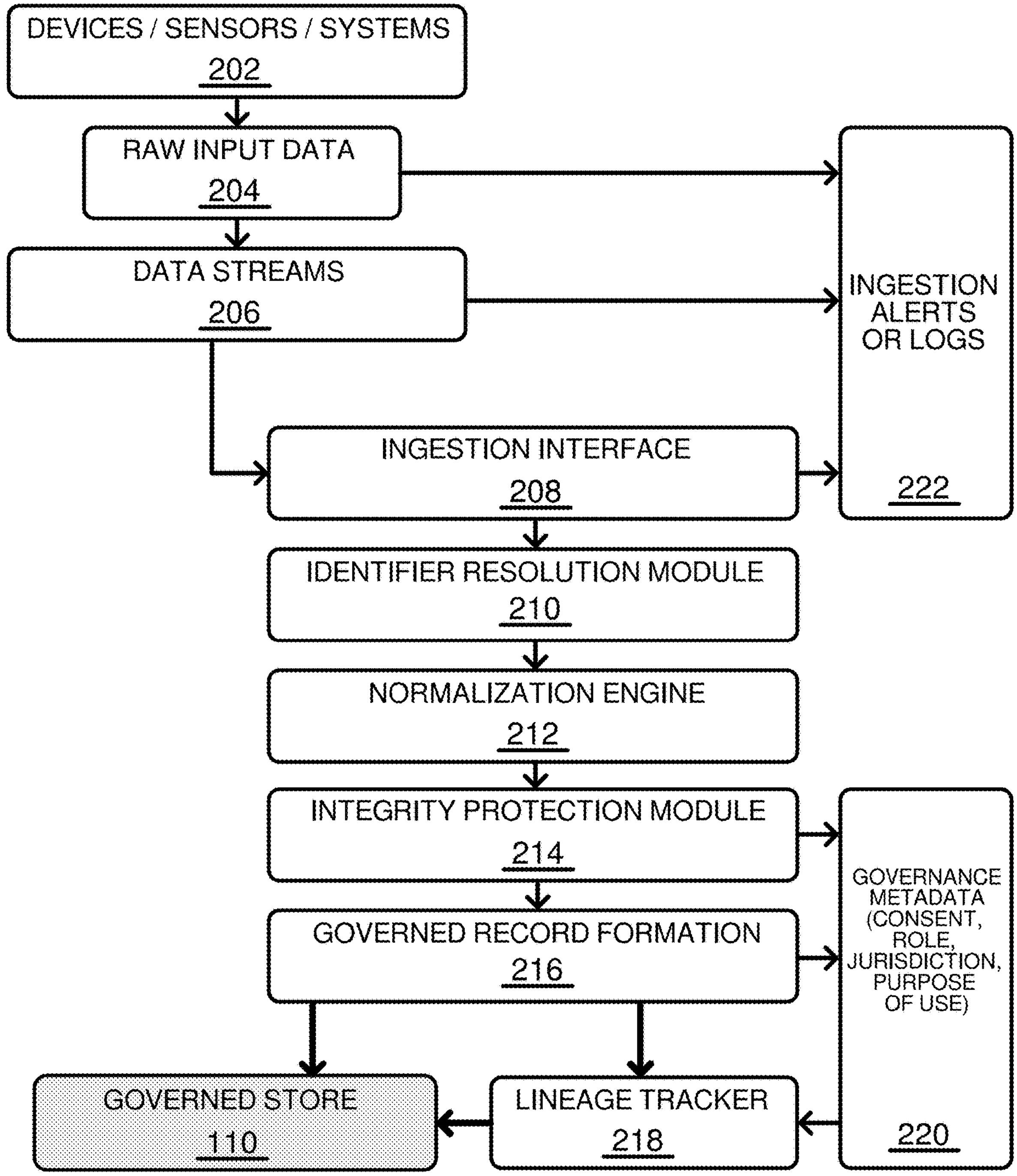
FIG. 2 is a sequence diagram illustrating a representative end-to-end workflow for governed generation, including model inference, symbolic transformation, policy filtering, deterministic evidence pack formation, render token generation, display gating, and logging into a compliance ledger.

FIG. 2 illustrates an example governed data ingestion, normalization, and persistence workflow 200 implemented within the governance system. The workflow 200 may be executed by an ingestion and normalization subsystem 112, operating in conjunction with the governed store 110, and interacting with one or more data sources 104 that provide patient-related, clinical, operational, or sensor-derived information.

In the illustrated embodiment, the data sources 104 supply raw inbound data streams 202 that may include heterogeneous formats such as HL7 messages, device waveform streams, numerical observations, configuration logs, medication events, imaging metadata, reports, telemetry values, or environmental measurements. The ingestion and normalization subsystem 112 receives these raw data streams 202 through one or more interfaces 204 that may include device connectors, network listeners, data acquisition drivers, or message brokers. The subsystem 112 may perform initial parsing, extraction, time stamping, and association of each received data item with one or more identifiers 206, such as a patient identifier, device identifier, bed identifier, location identifier, or operational asset identifier.

In some embodiments, the subsystem 112 applies a normalization process 208 that converts raw data into a governed record format. The normalization process 208 may include mapping incoming fields to canonical data structures, converting units of measurement, aligning timestamps to a common reference clock, resolving identifiers to validated patient or asset identities, performing schema validation, and verifying that the data conforms to expected constraints. The normalization process 208 may further include generation of structured governed values 210 that reflect the normalized, validated representation of each data item.

Once normalized, the subsystem 112 applies an integrity protection mechanism 212 to each governed record. The integrity protection mechanism 212 may include computing a digital signature, message authentication code, or cryptographic hash over the governed record and its associated metadata. The integrity mechanism 212 may bind together the governed values, identifiers, timestamps, provenance information, and normalization parameters, such that any later modification, corruption, or tampering of the record may be detectable. In some embodiments, the ingestion subsystem 112 stores the cryptographic keys or signing materials within a secure module or hardware security element to preserve trust boundaries.

The normalized and integrity-protected governed records 214 are then persisted to the governed store 110. The governed store 110 may employ a data model in which each governed record is stored together with its identifiers, time windows, and provenance metadata, and may further maintain lineage relationships 216 linking original governed records with corrected or amended versions. For example, if a previously ingested data item is later determined to have been associated with an incorrect patient identifier or an incorrect time segment, a corrected governed record may be generated, stored in the governed store 110, and linked to the original record through a lineage pointer. The governed store 110 may provide controlled access interfaces 218 that allow downstream components, such as an evidence pack constructor or a policy evaluator, to retrieve governed records or lineage information in a deterministic and auditable manner.

The workflow 200 also provides governance metadata 220 that includes indicators of consent status, role visibility constraints, jurisdictional tags, and purpose-of-use classifications. This metadata may be added during normalization or at later governance stages, and persisted as part of the governed record to support downstream arbitration and policy decisions.

In some embodiments, the ingestion and normalization subsystem 112 may detect inconsistencies or anomalies in the raw data streams 202, such as missing values, overlapping time windows, out-of-range measurements, or device-transmission errors. When such inconsistencies occur, the subsystem 112 may flag the affected records for affinity analysis or correction workflows executed by other components described in later figures. The ingestion process may also provide alerts or logs 222 that are recorded for inspection by administrative tools or for inclusion in compliance or audit workflows.

As depicted in FIG. 2, the governed data ingestion workflow provides a foundation for all higher-level deterministic governance operations. By performing identifier association, normalization, integrity protection, and lineage tracking at ingest time, the system ensures that any subsequent evidence pack selection, deterministic generation, arbitration, policy evaluation, or rendering is grounded in validated and provenance-aware governed records. This design supports reproducibility, regulatory audit requirements, and downstream use of the governed store by external and internal model-driven workflows.

Although a sequential pipeline is shown in FIG. 2, the ingestion and normalization subsystem 112 may execute processes concurrently, in streaming mode, or in micro-batched intervals. Additionally, certain operations, such as integrity protection or lineage updates, may be delegated to specialized hardware or distributed services without departing from the operation illustrated in FIG. 2.

FIG. 3

Figure 3:
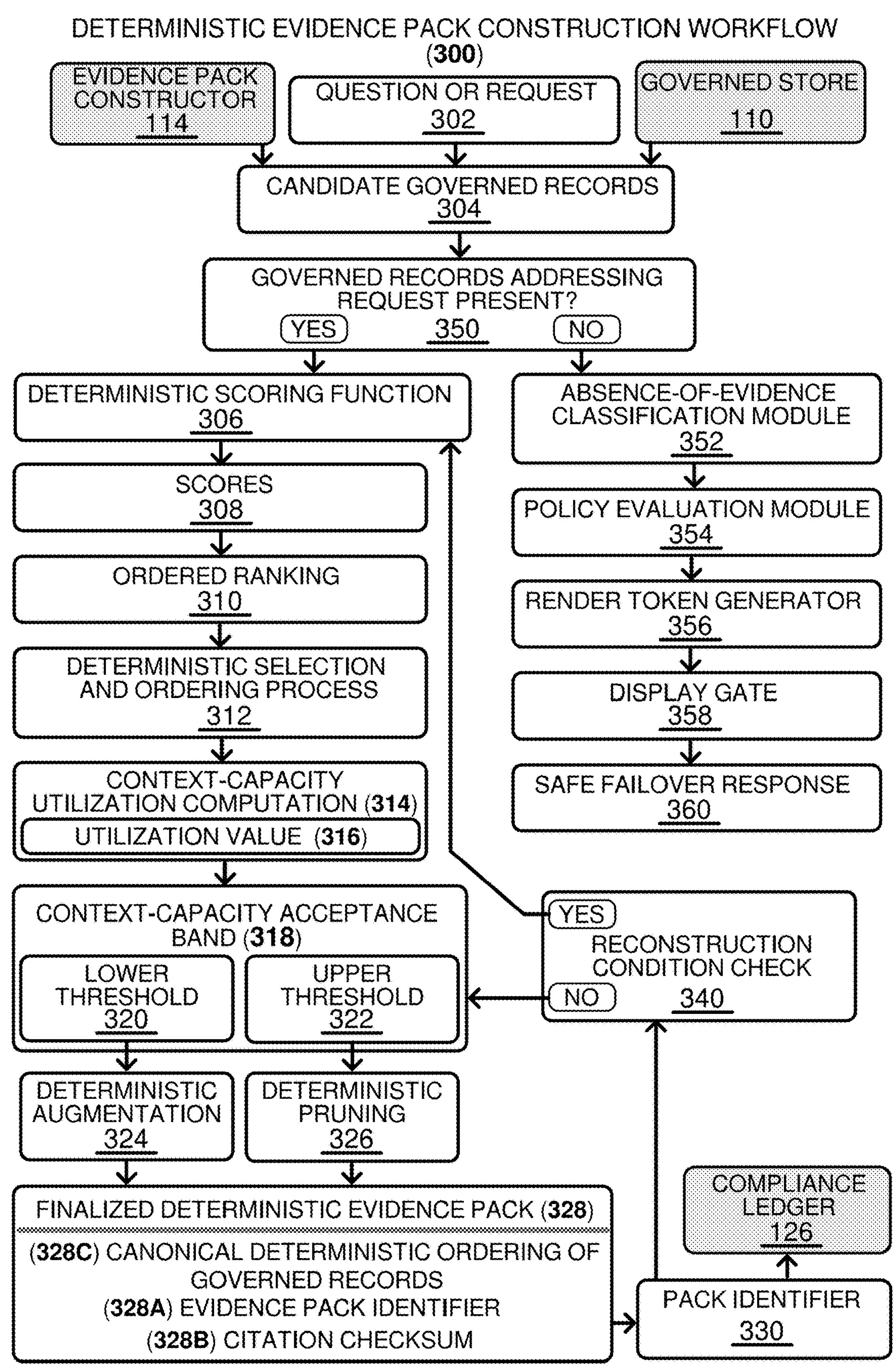
FIG. 3 is a diagram illustrating an example deterministic evidence pack construction workflow, including retrieval of governed records, relevance scoring, canonical ordering, context-capacity acceptance-band enforcement, and generation of a pack identifier and citation checksum.

FIG. 3 illustrates an example deterministic evidence pack construction and reconstruction workflow 300 performed by an evidence pack constructor 114 using governed records retrieved from a governed store 110. The workflow 300 determines whether governed evidence addressing a user request exists, constructs a deterministic evidence pack when such evidence is present, reconstructs the evidence pack when additional governed records become available, and enforces a safe absence-of-evidence pathway when governed evidence is not available. The deterministic evidence pack 328 produced by this workflow provides a reproducible evidentiary context for downstream deterministic model invocation, arbitration, policy evaluation, render token generation, and compliance ledger recording.

As shown in FIG. 3, the evidence pack constructor 114 receives a question or request 302 and queries the governed store 110 to retrieve candidate governed records 304. The governed store 110 may filter governed records based on patient identifiers, device identifiers, encounter identifiers, timestamps, consent attributes, declared purpose of use, and other governance metadata. A governed record presence test 350 evaluates whether any retrieved governed records 304 address the user request 302.

If no governed records addressing the user request are present, the workflow follows an absence-of-evidence path. An absence-of-evidence classification module 352 classifies the request as unsupported. A policy evaluation module 354 applies institutional or jurisdictional policy rules that prohibit rendering of unsupported factual content. Because no deterministic evidence pack 328 can be constructed, a render token generator 356 declines to issue a cryptographically authenticated render token. Without a valid render token tied to an evidence pack identifier 328*a* and citation checksum 328*b*, a display gate 358 refuses rendering. A safe failover response 360 is produced, representing the terminal state of the absence-of-evidence branch. No reconstruction occurs, no evidence pack is formed, and the workflow does not rejoin the deterministic evidence pack construction path.

If governed records addressing the request 302 are present, the workflow proceeds to deterministic evidence pack construction. The evidence pack constructor 114 applies a deterministic scoring function 306 to each candidate governed record 304. The scoring function 306 may compute relevance scores 308 based on semantic similarity to the question 302, temporal proximity, measurement quality, clinical facet relevance, or institution-defined weighting functions. The scores 308 are used to produce an ordered ranking 310 via deterministic sorting and deterministically defined tie-breaking operations. The ordered ranking 310 ensures that identical inputs always produce identical sequencing.

Ranked governed records advance to a deterministic selection and ordering process 312, which produces a preliminary evidence list according to canonical ordering rules and deterministic facet-coverage requirements. FIG. 3 then illustrates a context-capacity utilization computation 314 in which the evidence pack constructor 114 computes a utilization value 316 representing the number of tokens or encoding units required to represent the preliminary evidence list under the tokenizer identity associated with the target model.

The utilization value 316 is evaluated against a context-capacity acceptance band 318, consisting of a lower threshold 320 and an upper threshold 322. If the utilization 316 falls below the lower threshold 320, deterministic augmentation 324 adds additional governed records from the ordered ranking 310 using deterministic expansion rules. If the utilization 316 exceeds the upper threshold 322, deterministic pruning 326 removes governed records in a deterministic order while preserving required clinical or operational facet coverage. When one or both thresholds 320, 322 are omitted, augmentation 324 and/or pruning 326 are omitted, and the preliminary evidence list proceeds directly to finalization. These operations ensure that capacity constraints are applied deterministically and reproducibly.

After threshold enforcement, the evidence pack constructor 114 finalizes a deterministic evidence pack 328. The deterministic evidence pack 328 includes (i) a canonical deterministic ordering of governed records 328*c*, (ii) an evidence pack identifier 328*a*, and (iii) a citation checksum 328*b*. The canonical deterministic ordering of governed records 328*c* represents the strictly ordered, reproducible sequence of governed records selected for the model invocation. The evidence pack identifier 328*a* uniquely identifies the deterministic evidence pack 328 based on the canonical ordering 328*c*, governed record signatures, tokenizer identity, and capacity-band parameters. The citation checksum 328*b* represents a deterministic hash or digest of the governed record content as encoded for model invocation.

Pack identifier generation operations 330 compute the evidence pack identifier 328*a* and citation checksum 328*b*. The deterministic evidence pack 328—including canonical deterministic ordering 328*c*, pack identifier 328*a*, citation checksum 328*b*, the ordered ranking 310, and acceptance-band parameters 318—is then recorded in a compliance ledger 126 as an immutable ledger entry. The compliance ledger 126 provides deterministic replay, model-output traceability, render token validation, and supersession tracking but does not control workflow branching.

From pack identifier generation operations 330, control flows to a reconstruction condition check 340. The reconstruction condition check 340 evaluates whether additional governed records 304 addressing the request 302 exist in the governed store 110 that were not included in the deterministic evidence pack 328. If the reconstruction condition check 340 evaluates positively, the evidence pack constructor 114 reexecutes the deterministic scoring function 306, ordered ranking 310, deterministic selection and ordering process 312, context-capacity utilization computation 314, acceptance band 318, and deterministic augmentation 324 or deterministic pruning 326 with the expanded governed record set. Reconstruction produces a revised deterministic evidence pack 328 with updated canonical deterministic ordering 328*c*, evidence pack identifier 328*a*, and citation checksum 328*b*, which are recorded in the compliance ledger 126 as a new immutable ledger entry.

If the reconstruction condition check 340 evaluates negatively and the governed record presence test 350 had evaluated positively, no additional governed records are available, and the workflow proceeds using the existing deterministic evidence pack 328. In such embodiments, no new evidence pack identifier 328*a* or citation checksum 328*b* is generated, no new ledger entry is created, and deterministic replay relies on the previously recorded pack structure, including canonical deterministic ordering of governed records 328*c*.

Across embodiments, FIG. 3 demonstrates that deterministic evidence pack construction, deterministic reconstruction, and absence-of-evidence rendering refusal collectively provide a reproducible, policy-governed, and auditable framework for downstream model invocation, arbitration, and rendering. Determinism ensures consistent outputs under identical conditions, and the absence-of-evidence safeguarding prevents fabricated or unsupported output when governed evidence is unavailable.

FIG. 4

Figure 4:
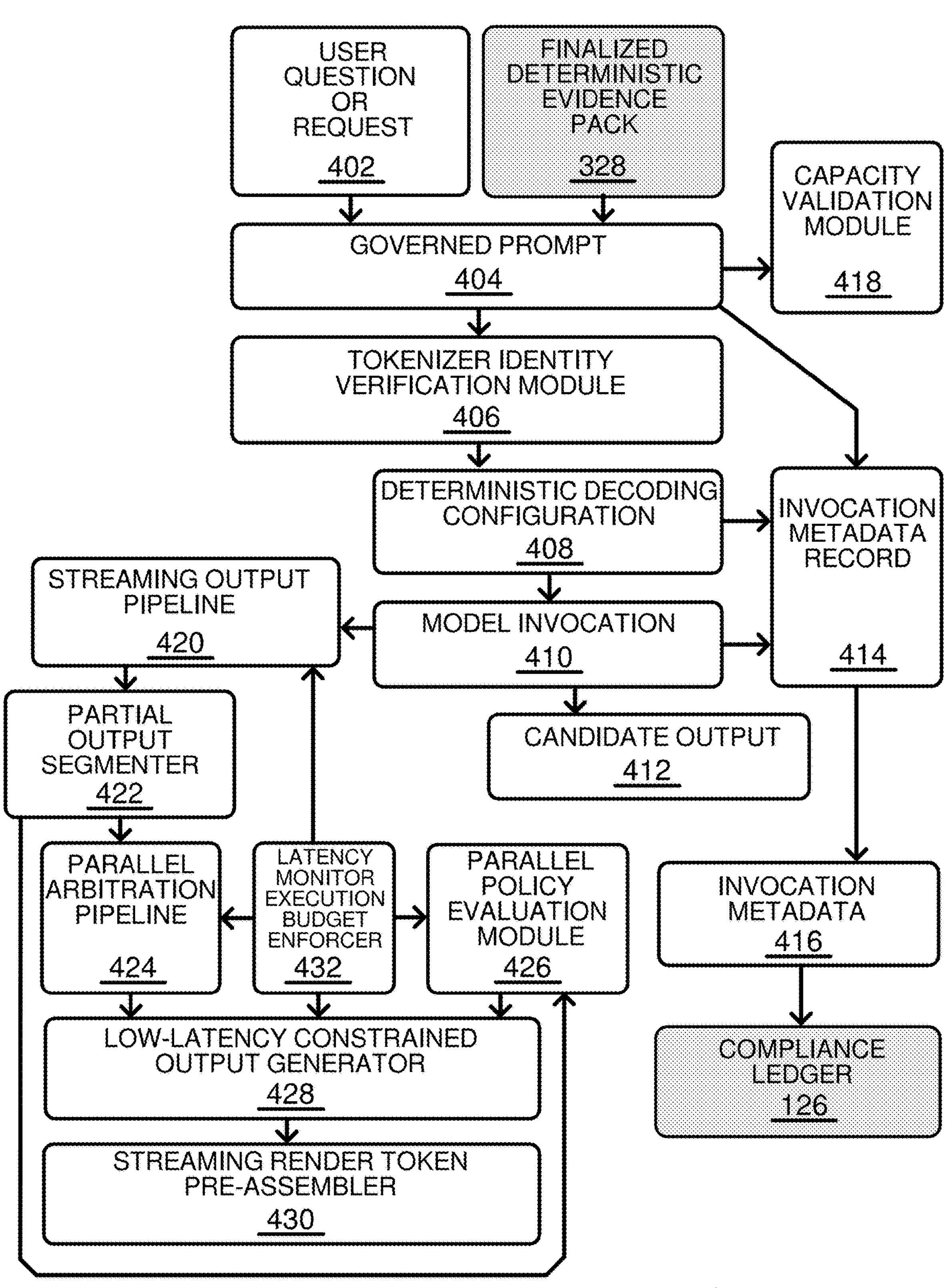
FIG. 4 is a block diagram of a symbolic interpreter, illustrating symbolic extraction, contextual enrichment, disambiguation heuristics, symbol-policy pairing, and transformation into governed records.

FIG. 4 illustrates an example deterministic model invocation workflow 400 performed by a deterministic generation controller 116. The workflow 400 ensures that each model invocation is reproducible, auditable, capacity-aware, and bound to a specific tokenizer identity and deterministic decoding configuration. By enforcing these constraints, the deterministic generation controller 116 eliminates nondeterministic behavior commonly associated with AI model invocation and prepares model outputs for downstream arbitration and policy evaluation.

As shown in FIG. 4, the deterministic generation controller 116 receives a deterministic evidence pack 328 generated by the evidence pack constructor described in FIG. 3. The deterministic evidence pack 328 includes a deterministic ordering of governed records, references to their identifiers, and the pack identifier needed to bind resulting outputs to the governing data context. Along with the evidence pack 328, the deterministic generation controller 116 receives a user question or request 402, which may be expressed in natural language or in a structured format. The deterministic generation controller 116 formats these inputs into a governed prompt 404. The governed prompt 404 may include text, encoded structured data, or other representations of the governed records and the user request, arranged in a deterministic format and compatible with the tokenizer identity of the selected model.

The tokenizer identity verification module 406 verifies that the tokenizer identity associated with the selected model 118 matches the tokenizer identity embedded in the evidence pack metadata. This check ensures that the evidence pack was constructed using the same tokenization schema that will be used to process the governed prompt. If the tokenizer identities do not match, the deterministic generation controller 116 may refuse to proceed, generate an error report, or request that a new evidence pack be constructed for the model's tokenizer identity.

After verifying tokenizer identity consistency, the deterministic generation controller 116 applies a deterministic decoding configuration 408 to govern how the model will produce output. The deterministic decoding configuration 408 may include fixed temperature parameters, disabled sampling or randomness, fixed beam search sizes, fixed top-k or top-p parameters, fixed seeds or seedless deterministic decoding modes, and selection of canonical formatting rules for model output. These settings ensure that the same governed prompt 404, when processed by the same model version, always produces the same candidate output.

Once the governed prompt 404 and deterministic decoding configuration 408 are prepared, the deterministic generation controller 116 performs a model invocation 410 against the selected model 118. The model invocation 410 produces candidate output 412, but the output 412 is not immediately delivered to users. Instead, the candidate output 412 is forwarded to the arbitration engine for verification, as shown in later figures.

In some embodiments, the deterministic generation controller 116 supports a streaming and parallelized execution pathway configured to reduce end-to-end latency for clinical or other time-sensitive workflows. As shown in FIG. 4, a streaming output pipeline 420 receives partial model output tokens or sentence fragments as they are produced by the deterministic decoding process. A partial output segmenter 422 converts this incremental data stream into sentence-level or clause-level segments suitable for verification.

These partial segments are forwarded to a parallel arbitration pipeline 424, which applies the same deterministic comparison rules used for full output but operates incrementally as each segment arrives. In parallel, a parallel policy evaluation module 426 performs incremental policy evaluation, allowing the system to determine at an early stage whether a segment is permitted, must be masked, or must be escalated, without waiting for model completion.

A low-latency constrained output generator 428 produces constrained output fragments in near real time, applying masking or redaction based on verification results. These constrained fragments are passed to a streaming render token pre-assembler 430, which prepares render token metadata for partial outputs while ensuring cryptographic continuity with the final render token issued by the display gate.

A latency monitor 432 evaluates the performance of each stage and enforces target response times suitable for bedside use. When latency thresholds are approached, the deterministic generation controller may adjust buffer sizes, segment frequency, or arbitration batch size to maintain compliance with clinical time budgets.

During the invocation process, the deterministic generation controller 116 constructs an invocation metadata record 414. The invocation metadata record 414 includes values such as the model version, tokenizer identity, pack identifier, governed prompt hash, decoding parameters, timestamps, and any additional contextual identifiers needed to reproduce the invocation at a later time. The governed prompt hash may be computed as a cryptographic digest of the entire governed prompt, guaranteeing that any modification to the governed records or the prompt structure would produce a different hash.

The invocation metadata record 414 is transmitted to the compliance ledger 126 as invocation metadata 416. The compliance ledger 126 persists this metadata in append-only form, ensuring that the invocation can later be reproduced by a deterministic replay subsystem. The invocation metadata 416 may also include references to user identifiers, session identifiers, or policy versioning states if such information is required for the institution's audit requirements.

The deterministic generation controller 116 also verifies the representational capacity associated with the governed prompt 404. In some embodiments, a capacity validation module 418 confirms that the governed prompt 404, when tokenized under the verified tokenizer identity, falls within the allowable capacity limits for the model invocation. This verification protects against overflow conditions, malformed prompts, or nondeterministic truncation of evidence.

The candidate output 412 and invocation metadata 416 are then provided to downstream components, such as the arbitration engine and the policy evaluator, as described in later figures. The deterministic generation controller 116 may log invocation timing or resource utilization for operational monitoring.

As depicted in FIG. 4, the deterministic model invocation workflow ensures that all model interactions are grounded in strict determinism, capacity compliance, tokenizer identity alignment, and auditability. This design supports reproducibility, regulatory review, and post-hoc analysis of any model-assisted decision or recommendation.

FIG. 5

Figure 5:
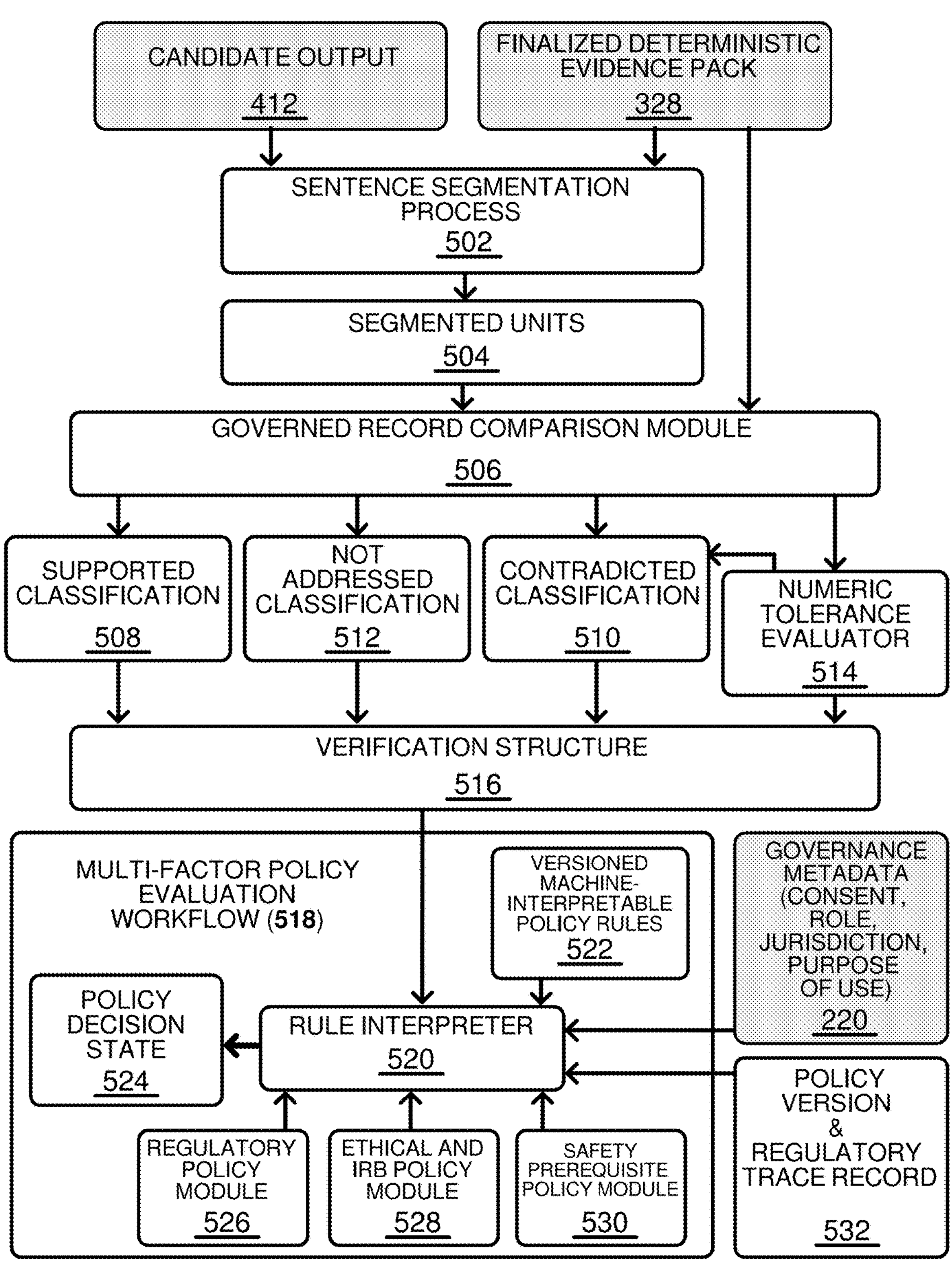
FIG. 5 is a block diagram showing a multi-policy evaluation module integrating clinical, legal, operational, environmental, and energy-aware constraints into a unified decision layer that regulates symbolic rendering.

FIG. 5 illustrates an example arbitration and policy evaluation workflow 500 in which candidate output generated by a deterministic model invocation is validated against governed records and subjected to versioned machine-interpretable policy rules before any output may be rendered. The workflow 500 ensures that no model-generated content is displayed to users unless it is both data-supported and policy-authorized, thereby enforcing provenance, trustworthiness, and regulatory compliance.

As shown in FIG. 5, the arbitration engine 120 receives candidate output 412 from the deterministic generation controller and the deterministic evidence pack 328 from the evidence pack constructor. The arbitration engine 120 initiates a sentence segmentation process 502 that divides the candidate output 412 into atomic units such as sentences, clauses, or structured assertions. The segmentation process 502 enables fine-grained verification by allowing the arbitration engine 120 to evaluate individual logical units rather than treating the model output as an undifferentiated whole.

The segmented units 504 are next processed by a governed record comparison module 506 configured to evaluate each unit 504 against the governed records contained in the evidence pack 328 and, in some embodiments, additional governed records retrieved from the governed store 110. The comparison module 506 examines factual claims, numerical values, time-bound assertions, and context-dependent references. For each unit 504, the comparison module 506 determines whether the unit is supported 508, contradicted 510, or not addressed 512 by the governed data context.

In embodiments involving numerical assertions, the arbitration engine 120 applies a numeric tolerance evaluator 514 that assesses numeric closeness, clinically acceptable variation, or time-window-dependent thresholds. These tolerances are defined relative to governed data values and institutional safety constraints. If a numeric claim falls outside the allowable tolerance, the unit may be classified as contradicted 510 or subject to corrective transformation in downstream stages.

The arbitration engine 120 aggregates these results into a verification structure 516. The verification structure 516 associates each segmented unit with a classification (supported, contradicted, or not addressed), identifies the governed records that support or contradict the statement, and records any tolerance metrics or contextual parameters used in the evaluation. In some embodiments, the verification structure 516 also encodes sentence-level identifiers or token boundaries to facilitate reconstruction, constrained rendering, and replay.

The verification structure 516 is then provided to the policy evaluator 122. The policy evaluator 122 supports a multi-factor policy evaluation workflow 518 that considers not only the verification structure but also metadata associated with governed records, as well as institution-specific constraints. The metadata 220 may include consent attributes, role-based visibility restrictions, jurisdictional legal requirements, purpose-of-use tags, institutional safety rules, and workflow classification indicators such as research, clinical, or operational contexts.

Within the policy evaluator 122, a rule interpreter 520 applies versioned machine-interpretable policy rules 522 to the verification structure 516 and the referenced metadata 220. These policy rules 522 may specify which categories of content may be rendered, which role or user types may access particular governed records, how sensitive information must be constrained or redacted, and under what jurisdictional or regulatory conditions certain content is permitted or prohibited. Policies may also require that contradicted or unsupported content be removed, transformed, or escalated before rendering, and may determine whether rendering is permitted based on context, workflow type, or institutional risk classifications.

The policy evaluator 122 produces a policy decision state 524, which indicates whether the candidate output may be rendered as-is, rendered only after constraint or redaction, deferred for additional review, or fully blocked. The policy decision state 524 may include granular directives such as "remove unsupported units," "mask jurisdiction-limited fields," "restrict display to specific roles," or "require additional consent verification." These directives are consumed by the display gate, described in later figures.

In embodiments supporting multi-model arbitration or ensemble verification, the arbitration engine 120 may merge or compare verification structures generated from multiple model sources before providing a unified verification structure 516 to the policy evaluator 122. The policy evaluator 122 may use policy rules 522 to determine whether ensemble agreement is required and whether contradictory model outputs should be ignored, constrained, or escalated.

The workflow 500 ensures that every rendered output undergoes a dual-governance process: one layer based on factual grounding in governed records (arbitration) and another based on compliance with institutional, regulatory, jurisdictional, and consent-based policy rules (policy evaluation). By separating these functions and enforcing deterministic behavior at each step, the system provides a robust, auditable, and regulatory-aligned framework for AI-assisted workflows.

In some embodiments, the policy evaluator 122 receives additional structured inputs from a Regulatory Policy Module 526, an Ethical and IRB Policy Module 528, and a Safety Prerequisite Policy Module 530.

The Regulatory Policy Module 526 encodes machine-interpretable rules derived from FDA guidance, Good Machine Learning Practice, Software-as-a-Medical-Device requirements, transparency expectations, real-world performance monitoring obligations, and update control requirements.

The Ethical and IRB Policy Module 528 incorporates institution-specific ethical guidelines, harm-mitigation rules, IRB governance for research-linked workflows, and clinician-oversight requirements, enabling the system to block or constrain model outputs inconsistent with institutional ethics.

The Safety Prerequisite Policy Module 530 applies rule sets requiring the presence of specific prerequisite clinical evidence—such as laboratory results, imaging findings, or verified measurements—before certain recommendations or interpretations may be rendered.

In some embodiments, the Policy Decision State 524 incorporates metadata from a Policy Version and Regulatory Trace Record 532, enabling deterministic audit and FDA-aligned traceability of the policy set used for each rendering event.

FIG. 6

Figure 6:
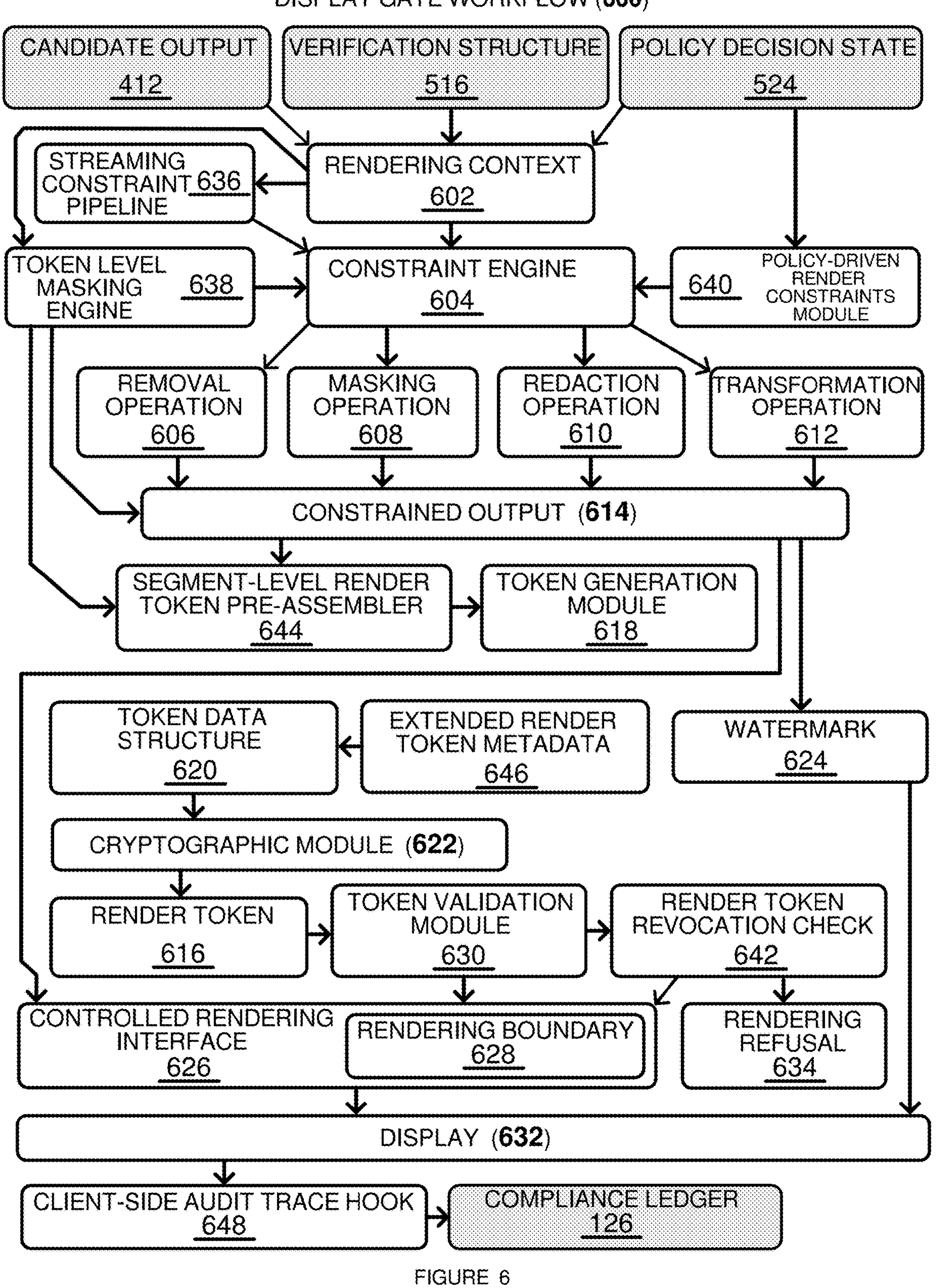
FIG. 6 is a diagram of a multi-pass rendering system comprising an initial symbolic rendering pass, a policy-constrained revision pass, a deterministic validation pass, and a final constraining and gating stage.

FIG. 6 illustrates an example display gate workflow 600 that governs how candidate model output is constrained, filtered, masked, transformed, tokenized, authorized, and ultimately rendered in a regulated environment. The display gate 124 operates as the sole authorized rendering pathway, and enforces a multilayered set of verification, policy, regulatory, and cryptographic controls before any model-generated content may be displayed on a user-facing viewport.

In some embodiments, render token generation is performed by the display gate 124 via one or more internal tokenization modules, including a token generation module; references herein to a 'render token generator' refer to the display gate or such internal modules depending on context.

In some embodiments, the Segment-Level Render Token Pre-Assembler 644 may correspond to or implement the streaming render token pre-assembler 430 of FIG. 4.

As shown in FIG. 6, the display gate 124 receives a candidate output 412, a verification structure 516 produced by the arbitration engine, and a policy decision state 524 produced by the policy evaluator. These inputs form a rendering context 602 that determines the set of constraints necessary to ensure safe, compliant rendering.

A constraint engine 604 processes the rendering context 602 and applies removal operations 606, masking operations 608, redaction operations 610, and semantic transformation operations 612 to unsupported, contradicted, or policy-disallowed content. In some embodiments, the constraint engine 604 operates in cooperation with a Streaming Constraint Pipeline 636, which supports segment-level or partial output constraint processing used in low-latency, streaming model-invocation workflows. The Streaming Constraint Pipeline 636 allows the display gate to evaluate and constrain portions of the model output incrementally as they are received, thereby enabling real-time or interactive rendering consistent with the deterministic streaming architecture described in connection with FIG. 4.

In some embodiments, the display gate 124 includes a Token Level Masking Engine 638 configured to identify unsupported or prohibited content at token or sub-token granularity. The Token Level Masking Engine 638 applies fine-grained masking operations consistent with the arbitration results and the policy decision state, thereby removing or transforming minimal necessary spans of text while preserving readability and comprehensibility of the remaining content.

In further embodiments, the display gate 124 receives additional policy-derived constraints through a Policy-Driven Render Constraints Module 640. The Policy-Driven Render Constraints Module 640 interprets regulatory requirements (including FDA Software-as-a-Medical-Device guidance, Good Machine Learning Practice criteria, and institution-specific regulatory rules), ethical or IRB requirements, safety prerequisites, jurisdiction-specific constraints, and role-visibility permissions encoded in the policy decision state 524. These policy-driven constraints modify the behavior of the constraint engine 604 and determine which categories of content may be rendered, masked, escalated, or blocked entirely.

The output of the constraint engine 604 and associated modules is a constrained output 614, which represents the only form of the model-generated text eligible for rendering. In some embodiments, the constrained output 614 is produced incrementally through the Streaming Constraint Pipeline 636 to support streaming model invocation and real-time verification.

A Segment-Level Render Token Pre-Assembler 644 receives constrained output segments and constructs partial render token metadata consistent with the streaming or incremental rendering workflow. These partial artifacts are passed to the token generation module 618, which generates a render token 616 by constructing a token data structure 620 containing the evidence pack identifier, citation checksum, model identity, tokenizer identity, viewport identifier, session identifier, policy version, and additional regulatory or environmental metadata. In some embodiments, the token data structure 620 incorporates Extended Render Token Metadata 646, which may include energy state metadata, FDA-required trace metadata, policy evaluation traces, governed record lineage identifiers, or streaming-segment identifiers.

A cryptographic module 622 applies a digital signature, cryptographic hash, message authentication code, or equivalent integrity mechanism to the token data structure 620 to produce an authenticated render token 616. A watermark generator 624 may embed a visible or invisible watermark associated with the render token 616 into the constrained output 614 to provide a forensic link between the rendered content and the token that authorized it.

Before any content may be displayed, a controlled rendering interface 626 enforces a rendering boundary 628, requiring that a valid, authenticated render token 616 be presented by the requesting client. The token validation module 630 verifies the integrity of the render token 616, checks its validity interval, ensures proper binding to the viewport and session identifiers, and performs a Render Token Revocation Check 642. The revocation check may invalidate tokens corresponding to prior renderings that relied on governed records that have since been corrected, superseded, or revoked, as described in connection with FIG. 7. If the render token 616 is invalid, expired, revoked, mismatched, or absent, the controlled rendering interface 626 produces a rendering refusal 634.

Rendered content 632 that passes validation may activate a Client-Side Audit Trace Hook 648, which records rendering events, applied constraints, and watermark information to the compliance ledger 126 to support audit, traceability, and regulatory review. This hook may also record contextual execution metadata, such as the applicable policy version, energy state metadata, or role-based permissions used at render time.

Through these combined mechanisms, FIG. 6 demonstrates that the display gate 124 not only constrains model outputs but also enforces deterministic, cryptographically authorized rendering, integrates regulatory, ethical, and safety policies, supports streaming and low-latency workflows, and maintains full auditability and correction-propagation guarantees required in regulated environments.

FIG. 7

Figure 7:
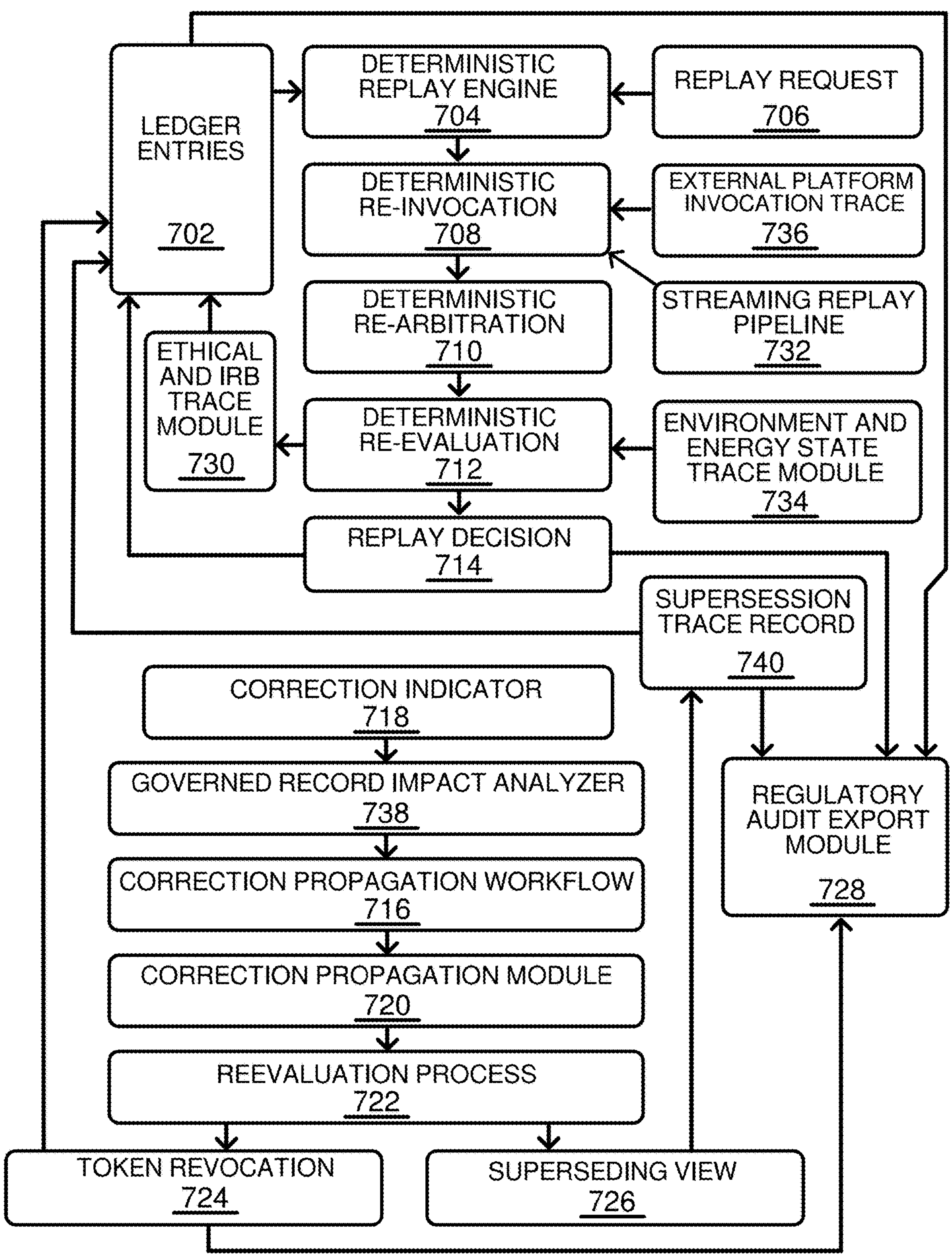
FIG. 7 is a diagram illustrating a governed prompt constructor that composes prompt frames strictly from deterministic evidence pack elements, together with pack identifier checking and citation-checksum validation.

FIG. 7 illustrates an example compliance ledger, deterministic replay, and correction propagation workflow 700, which ensures that every model-generated output, constraint decision, policy evaluation, and rendered view can be verifiably reproduced, audited, superseded, or revoked in accordance with regulatory, ethical, and institutional requirements. The system shown in FIG. 7 unifies rendering governance, policy versioning, evidence lineage, environmental traceability, external-platform invocation tracking, and governed record correction propagation.

As shown in FIG. 7, the compliance ledger 126 stores a set of ledger entries 702 corresponding to every invocation, arbitration result, policy evaluation, rendering event, render token, and superseding-view action performed by the system. Each ledger entry may include the governed evidence pack identifier, the verification structure 516, the policy decision state 524, policy version information, render token lineage metadata, correction-propagation links, and environmental execution context. The ledger entries 702 form a canonical, append-only record used for regulatory audits, deterministic replay, and clinical governance.

A deterministic replay engine 704 receives a replay request 706, which may originate from an auditor, regulator, compliance officer, or internal governance subsystem. The replay request 706 identifies the invocation, render token, or rendered view whose behavior must be reconstructed. The deterministic replay engine 704 retrieves the relevant ledger entries 702 and initiates deterministic reinvocation 708, which follows the same governed prompt construction, tokenizer verification, deterministic decoding parameters, and evidence pack constraints recorded during the original execution.

In some embodiments, the deterministic replay engine 704 includes a Streaming Replay Pipeline 732, which reconstructs the original token-stream or segment-stream execution pathway used when the model invoked streaming or low-latency decoding. The Streaming Replay Pipeline 732 ensures that replay produces the same segmentation, partial output arbitration steps, and constraint-assembly behavior as the original run, even when the original invocation used parallel arbitration, incremental policy evaluation, or segment-level constrained rendering.

The deterministic reinvocation 708 may include a rerun of external model calls, when the system initially delegated inference to an external platform. In such cases, the system records the external-platform invocation identifier through an External Platform Invocation Trace 736, which is preserved within the ledger entries 702 to support validation, forensics, and regulatory audit. The replay engine 704 may use this identifier to confirm deterministic external behavior or to reconstruct the expected effect using stored results.

The output of the deterministic reinvocation 708 is passed into deterministic rearbitration 710, which regenerates the supported/contradicted/not-addressed classifications and numerical-tolerance evaluations. These results are forwarded to deterministic reevaluation 712, where the same versioned machine-interpretable policy rules 522 and policy-driven constraints are applied. In some embodiments, the reevaluation 712 incorporates environmental metadata such as energy state or grid-condition context through an Environment and Energy State Trace Module 734, ensuring that execution conditions relevant to regulatory or institutional policy enforcement are preserved.

The resulting replay decision 714 determines whether the replayed execution matches the original rendering context, diverges from it, reveals a correction, or indicates that the original rendered output requires supersession. Every replay decision 714 is recorded into the compliance ledger 126 for future audit and reproducibility checks.

In some embodiments, the system includes a correction propagation workflow 716. A correction indicator 718 identifies a governed record—such as a clinical measurement, laboratory value, imaging result, or evidence pack element—that has been corrected, superseded, or withdrawn. The correction indicator 718 is processed by a Governed Record Impact Analyzer 738, which determines all render tokens, constrained outputs, or rendered views that depend on the corrected governed record. The impact analyzer 738 communicates the affected elements to the correction propagation module 720, which triggers a reevaluation process 722.

During the reevaluation process 722, the system performs new arbitration, policy evaluation, and constraint application steps to determine whether the prior rendered output remains valid under the updated governed record. If the rendered output is no longer valid, the system issues token revocation 724, which invalidates the render token associated with the original output. The revocation 724 ensures that downstream systems, client devices, and regulated workflows cannot display out-of-date or non-compliant content. Revocation events are cryptographically recorded in the ledger entries 702.

The reevaluation process 722 may produce a superseding view 726, which replaces the invalidated rendering. The system records this relationship using a Supersession Trace Record 740, stored within the compliance ledger 126. The supersession trace includes identifiers for the prior view, the new view, the correction indicator 718, the policy version in effect at the time, and the relevant regulated or ethical conditions that triggered the supersession.

The compliance ledger 126 may also include an Ethical and IRB Trace Module 730, which records the specific ethical, IRB, or institutional-governance rules applied during the original and replayed evaluations. This ensures that downstream auditors can verify not only regulatory correctness but also ethical appropriateness of each rendered output.

The system may further include a Regulatory Audit Export Module 728, which aggregates ledger entries 702, replay traces, supersession records, render token artifacts, and governed record lineage into exportable regulatory audit bundles. These bundles support FDA Software-as-a-Medical-Device review, Good Machine Learning Practice documentation, institutional ethics oversight, IRB reporting obligations, and clinical governance requirements.

Through these combined mechanisms, FIG. 7 demonstrates that the system maintains deterministic reproducibility, full transparency, regulatory and ethical traceability, token-level correction propagation, environment-aware context preservation, and cryptographic guarantees that ensure rendered outputs cannot drift out of compliance. The illustrated workflow guarantees that every output can be reevaluated under corrected data, policy changes, or updated regulatory requirements, and that any superseded or invalidated content is deterministically revoked and replaced with a compliant rendering.

FIG. 8

Figure 8:
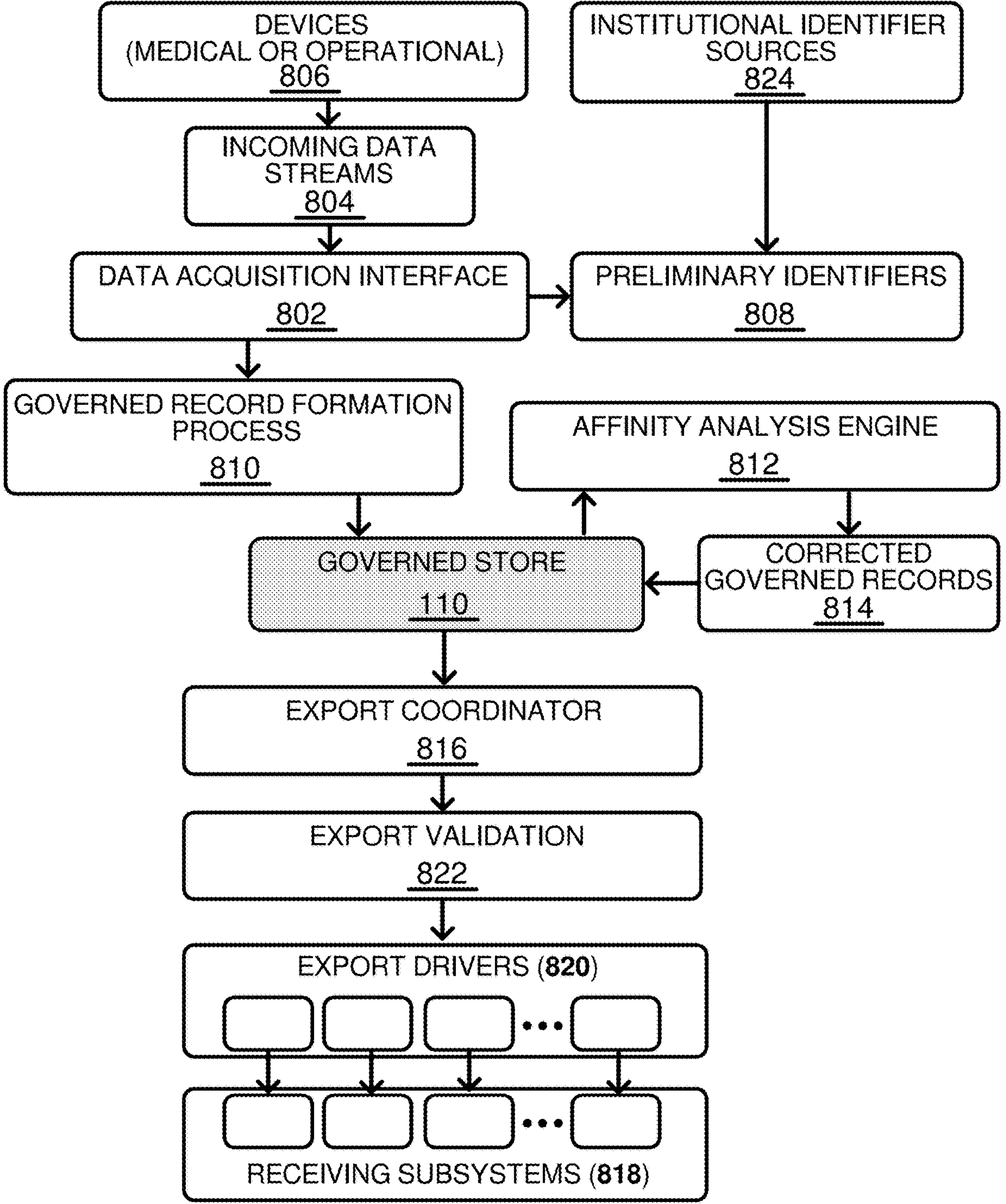
FIG. 8 is a block diagram showing a multi-model compliance orchestration framework supporting internal and external scientific AI platforms, including decision arbitration, evidence synchronization, and policy-governed output reconciliation.

FIG. 8 illustrates an example governed data acquisition and export architecture 800 that supports ingestion of clinical or operational data from heterogeneous devices, validation and normalization of the data into governed records, detection and correction of association or temporal inconsistencies, and distribution of corrected or validated governed records to multiple receiving subsystems that may require different data formats.

The architecture 800 includes a data acquisition interface 802 that receives incoming data streams 804 from a plurality of patient-related or operational devices 806. The devices 806 may include physiological monitors, infusion pumps, ventilators, imaging systems, laboratory information systems, wearable sensors, or environmental telemetry systems. The data streams 804 may include time-series data, measurements, device events, configuration logs, orders, or status updates.

The data acquisition interface 802 may perform timestamp alignment, signal decoding, protocol translation, and basic schema validation. In some embodiments, the interface 802 assigns preliminary identifiers 808 such as patient identifiers, device identifiers, or encounter identifiers. These preliminary identifiers 808 may originate from the device interfaces themselves or from institutional patient-registration systems.

The governed store 110 receives partially processed data from the data acquisition interface 802 and executes a multi-stage governed record formation process 810. The governed record formation process 810 associates the incoming data with validated patient or asset identifiers, resolves location or time segments, normalizes measurement units, and transforms the data into a governed record format compatible with the governance system described in prior figures. During this process, the governed store 110 may apply integrity protection mechanisms such as digital signatures or message authentication codes to each governed record and may record provenance metadata including timestamp accuracy, data source identity, and transformation history.

FIG. 8 further illustrates an affinity analysis engine 812 that monitors governed records stored in the governed store 110 for association inconsistencies, temporal conflicts, or data integrity concerns. The affinity analysis engine 812 may detect discrepancies such as governed records assigned to incorrectly identified patients, overlapping or missing time segments, sensor data inconsistent with known device capabilities, or environment-derived signals misaligned with clinical timelines. When such inconsistencies are detected, the affinity analysis engine 812 generates corrected governed records 814. These corrected governed records 814 are persisted in the governed store 110 and linked to the original records through lineage relationships, allowing complete traceability of corrections.

The corrected governed records 814 maintain the same integrity protection properties as original governed records but may include updated identifiers, corrected timestamps, corrected measurements, or corrected location assignments. In some embodiments, corrections may be automatically propagated to downstream systems or flagged for human verification before being marked as authoritative.

Once governed records have been validated or corrected, an export coordinator 816 prepares them for distribution to multiple receiving medical or operational subsystems 818. Each receiving subsystem 818 may implement a different data receipt format, schema, or protocol. For example, one subsystem may accept HL7-formatted clinical observations, another may use FHIR bundles, and another may require proprietary device-specific XML or JSON formats. To support these varied requirements, the export coordinator 816 employs one or more specific export drivers 820.

Each export driver 820 performs formatting, field mapping, consistency checking, and protocol-appropriate packaging to convert a governed record or corrected governed record into a representation suitable for a corresponding receiving subsystem 818. The export drivers 820 may also perform inclusion/exclusion filtering based on the subsystem's role, workflow context, or regulatory classification. In some cases, the export coordinator 816 may apply additional validation 822 to ensure that the exported data conforms to the target subsystem's constraints, reporting any errors or mismatches back to administrative logs.

The export coordinator 816 may transmit governed records or corrected governed records to two or more receiving subsystems 818 in parallel, ensuring that each subsystem receives a version tailored to its required format. For example, the same blood pressure measurement may be simultaneously exported to an electronic health record, a clinical AI system, and a medical device orchestration layer, each in distinct formats but derived from the same governed record.

The architecture shown in FIG. 8 ensures that governed data acquisition is consistent, validated, patient-linked, and integrity protected; that any corrections are tracked through lineage; and that downstream systems receive data in appropriate, subsystem-specific formats. This design preserves the foundational MDG approach while integrating seamlessly with the deterministic governance pipeline described in earlier figures.

In some embodiments, the governed record formation process 810 and affinity analysis engine 812 may execute on edge compute nodes located in clinical environments, while the export coordinator 816 may operate within centralized institutional IT infrastructure. In other embodiments, the entire architecture 800 may be implemented within a cloud-based governance system while maintaining secure transport links to local devices and subsystems.

In some embodiments, preliminary identifiers 808 may also be obtained from institutional identifier sources 824, such as patient registration systems, ADT feeds, master patient indices, or enterprise clinical identity services.

FIG. 9

Figure 9:
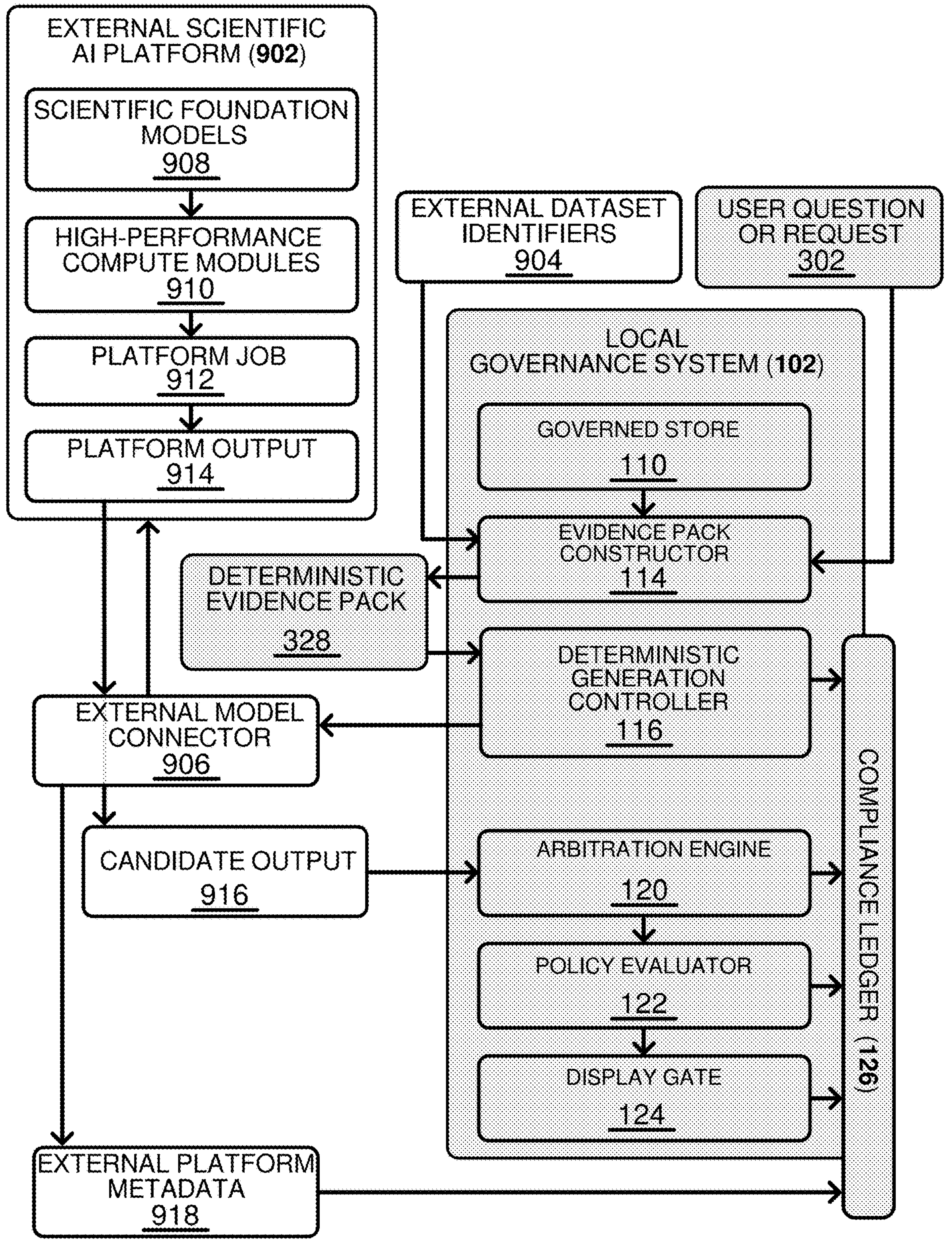
FIG. 9 is a diagram of a spatiotemporal symbolic rendering system for stationary IV-pole configurations, including environmental context acquisition, stable session identifiers, energy state propagation, and device-location-aware rendering.

FIG. 9 illustrates an example integration architecture 900 in which the governance system 102 interoperates with an external scientific artificial intelligence platform 902 operated by a governmental, national, federal, or collaborative scientific entity. The figure demonstrates how the deterministic governance pipeline extends across institutional boundaries, ensuring that external AI resources—such as foundation models, scientific datasets, or high-performance computation—are invoked under the same deterministic, auditable, and policy-controlled semantics as local models.

As shown in FIG. 9, the governance system 102 includes the deterministic generation controller 116, evidence pack constructor 114, governed store 110, and compliance ledger 126, as described in earlier figures. When a user submits a question or request 302 that requires the capabilities, datasets, or domain knowledge of the external scientific AI platform 902, the evidence pack constructor 114 may construct an evidence pack 328 that includes identifiers for local governed records as well as external dataset identifiers 904. These external dataset identifiers 904 reference collections, models, or scientific corpora curated by the external platform 902 and may be used by the deterministic generation controller 116 to build governed prompts that merge locally governed data with externally hosted scientific knowledge.

To enforce deterministic and auditable behavior across platforms, the deterministic generation controller 116 communicates with the external scientific AI platform 902 exclusively through an external model connector 906. The external model connector 906 validates authentication credentials, enforces input and output schemas, and ensures that all model invocations performed via the platform 902 comply with fixed decoding parameters, tokenizer identity requirements, and deterministic invocation semantics. The external model connector 906 may also serialize the governed prompt into a format accepted by the platform 902, record invocation metadata, and validate response structures before forwarding outputs to downstream arbitration.

The external scientific AI platform 902 may include one or more scientific foundation models 908 trained on specialized datasets such as genomic corpora, oncology trial registries, bioinformatics data, molecular simulations, grid stability datasets, epidemiological archives, or scientific literature. The platform 902 may also expose high-performance compute modules 910 for large-scale simulation, inference, or analytics that exceed the capacity of local institutional infrastructure.

When the deterministic generation controller 116 invokes a model 908 through the external model connector 906, the external platform 902 executes a platform job 912 using the governed prompt or scientific dataset identifiers. The output 914 of the platform job 912—such as explanatory text, analytic summaries, model-generated predictions, or scientific analyses—is returned to the external model connector 906. The connector normalizes the output 914 and forwards a candidate output 916 to the arbitration engine 120, where the content is segmented, compared against governed records, and verified using the procedures described in earlier figures.

To support reproducibility and external auditability, the compliance ledger 126 records external platform metadata 918. This metadata may include the platform job identifier, external model version, dataset identifiers, compute configuration identifiers, timestamps, and cryptographic hashes associated with the invocation. Recording metadata 918 allows auditors or regulators to reconstruct exactly which external resources contributed to the rendered output, and ensures that the provenance of any external computation is preserved alongside local provenance. Where an external platform does not guarantee deterministic execution, the system records the returned outputs and treats such outputs as governed inputs for purposes of replay, arbitration, and policy evaluation.

In healthcare embodiments, the external scientific AI platform 902 may provide models that generate clinical pathway analyses, oncology cohort stratification, pharmacogenomic interpretations, or population-level risk estimations. FIG. 9 illustrates that the governance system 102 may restrict the influence of these models on bedside decision support. Specifically, the arbitration engine 120 may require that externally generated recommendations be grounded in locally governed patient records, and the policy evaluator 122 may restrict rendering unless role-based, jurisdictional, and consent-derived constraints are satisfied. The display gate 124 enforces these decisions using constrained rendering and render tokens as described previously.

Beyond clinical workflows, FIG. 9 supports embodiments in which institutional research teams, academic centers, or regulated industrial environments participate in national scientific computing initiatives. The integration architecture 900 ensures that even when using large-scale external models or shared datasets, all resulting outputs remain traceable, governed, and aligned with institutional safety requirements.

The arrangement shown in FIG. 9 is one example. In other embodiments, the external model connector 906 may directly enforce deterministic tokenization constraints, or may generate additional metadata linking local governed records to the external scientific datasets used in the analysis. In still other embodiments, the external scientific AI platform 902 may provide containerized agents, workflow pipelines, or distributed training services, each of which may be invoked deterministically through the connector.

FIG. 10

Figure 10:
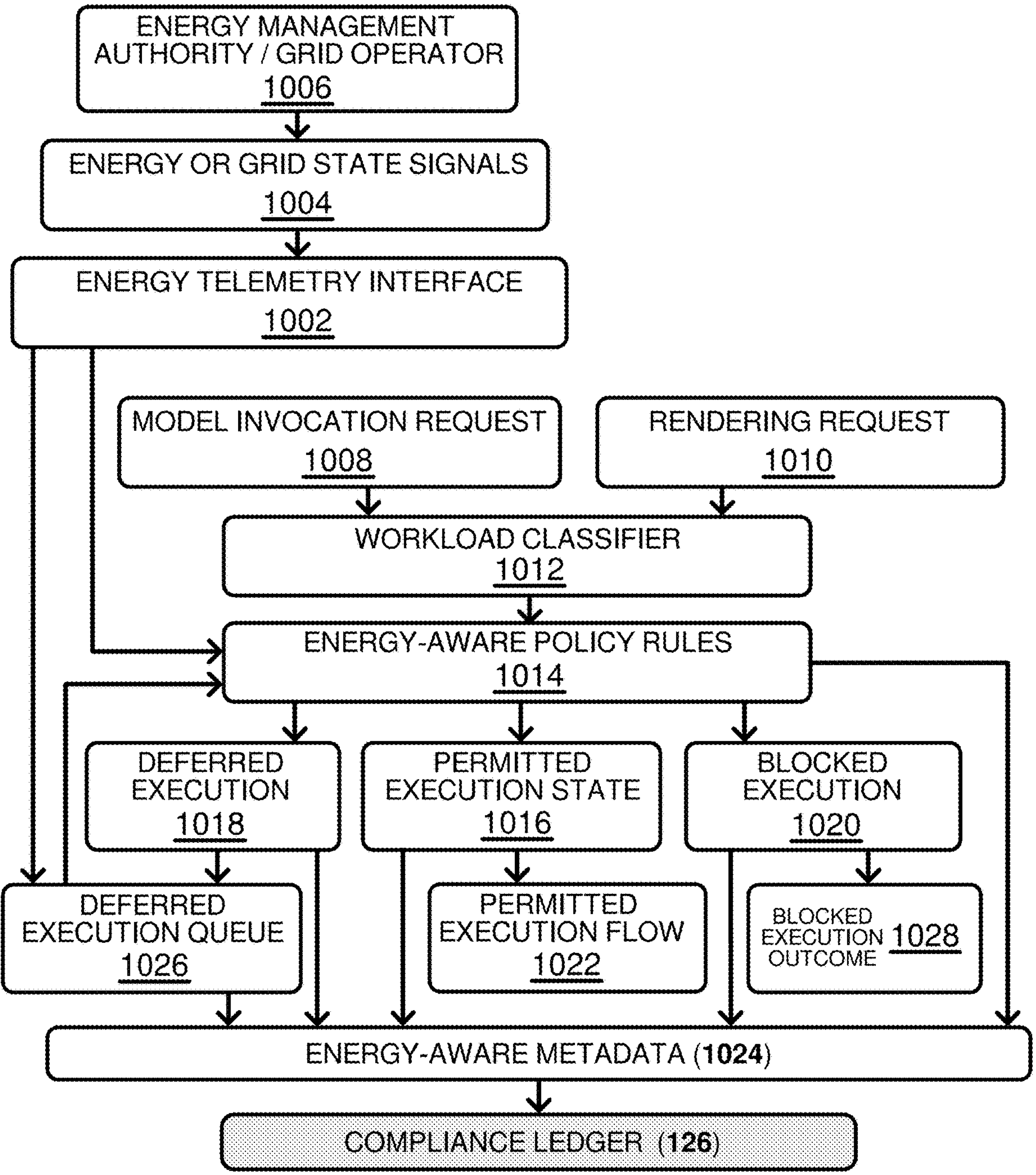
FIG. 10 is a diagram illustrating a policy-gated augmented-reality (AR) visualization pathway, including AR projection, symbolic resolution, gating checks, token validation, and contextual overlays anchored to medical-device or patient-room coordinates.

FIG. 10 illustrates an example energy- and grid-aware governance workflow 1000 in which the governance system dynamically incorporates external energy and grid state information into policy decisions about model invocation, workload scheduling, and output rendering. This workflow enables regulated environments—such as hospitals, life sciences facilities, and energy infrastructure operators—to participate in large-scale AI platforms while ensuring that model-assisted operations remain aligned with energy constraints, safety requirements, and institutional risk policies.

As depicted in FIG. 10, an energy telemetry interface 1002 receives one or more energy or grid state signals 1004 originating from an energy management authority or grid operator 1006. These signals 1004 may include real-time or forecasted electrical load, available reserve capacity, local or regional energy prices, frequency and voltage stability indicators, demand-response events, or declared emergency states. The energy telemetry interface 1002 parses, validates, normalizes, and timestamps these signals, and supplies the resulting energy state information to a policy evaluator 122 and associated orchestration components, where it is used as an input to energy-aware decision making.

The governance system receives one or more model invocation requests 1008 or rendering requests 1010 from upstream components. A model invocation request 1008 may be generated by the deterministic generation controller when a deterministic evidence pack has been formed and is ready for model invocation. A rendering request 1010 may be generated after the arbitration engine and policy evaluator have produced verification structures and preliminary policy decisions for candidate output.

A workload classifier 1012 categorizes each incoming request into a criticality class based on institutional policies and workflow metadata. For example, the classifier 1012 may distinguish time-critical clinical workflows (such as sepsis detection, stroke triage, or ventilator management) from medium-priority operational analytics and non-urgent tasks such as retrospective research, exploratory data mining, or training-data synthesis. The classifier 1012 may use policy metadata 220, workflow tags, or governed record attributes stored in the governed store 110 to assign each request to an appropriate class.

The policy evaluator 122 receives both the workload classifications from the classifier 1012 and the current energy or grid state information produced by the energy telemetry interface 1002. The policy evaluator 122 applies energy-aware policy rules 1014 that define under what environmental conditions particular categories of AI workloads may proceed. These rules 1014 may specify that time-critical clinical workflows are permitted even when grid conditions are stressed, while non-urgent or exploratory workloads must be deferred or blocked when load, reserve margin, or stability metrics fall outside defined operating envelopes. The energy-aware policy rules 1014 thus combine workload criticality, institutional tolerance for risk, and current energy or grid state signals 1004 into a governance decision.

If the energy-aware policy rules 1014 determine that a given workload can proceed under the current energy conditions, the policy evaluator 122 generates a permitted execution state 1016. This state authorizes execution under a permitted execution flow 1022, which may include full-capacity model invocation, constrained low-power model invocation, or rendering of previously verified outputs. An orchestration component 128 (not separately numbered in FIG. 10) may enforce the permitted execution flow 1022 by scheduling the workload, allocating compute resources, selecting appropriate model variants, or routing the request into the deterministic invocation and rendering pipelines described in earlier figures.

If the energy-aware policy rules 1014 determine that execution should not proceed immediately, but may be acceptable when energy conditions improve, the policy evaluator 122 generates a deferred execution state 1018. This state is supplied to a deferred execution queue 1026, which stores a representation of the pending workload—such as a governed prompt, rendering context, or invocation descriptor—together with its workload classification and the energy-aware rationale for deferral. The deferred execution queue 1026 monitors updated energy or grid state signals 1004 (via the energy telemetry interface 1002) and, when conditions return to an acceptable range, resubmits the queued workload into the governance pipeline at the energy-aware policy rules stage 1014. This preserves the original workload classification from the classifier 1012 while ensuring that the policy evaluator 122 reapplies the same policy rules 1014 under the new energy state. If the reevaluation under 1014 now results in permission, the workload transitions into the permitted execution state 1016 and follows the permitted execution flow 1022. If conditions remain unfavorable, the workload may remain in the deferred execution queue 1026 or, in some cases, be transitioned to a blocked outcome as described below.

If the energy-aware policy rules 1014 determine that execution of a workload must not proceed under current or foreseeable conditions—such as when the workload exceeds institutional risk thresholds, conflicts with safety envelopes, or is repeatedly deferred without realistic prospect of safe execution—the policy evaluator 122 generates a blocked execution state 1020. The blocked execution state 1020 leads to a blocked execution outcome 1028, which terminates the request and may produce a governance alert or user-visible refusal message indicating that the workload cannot be executed under the governing energy and safety policies. The blocked execution outcome 1028 is based explicitly on the combination of energy or grid state signals 1004 (as processed by the energy telemetry interface 1002) and the energy-aware policy rules 1014, ensuring that the connection between external energy conditions and blocked decisions is recorded and auditable.

Throughout these operations, the governance system records energy-aware metadata 1024 in the compliance ledger 126. The energy-aware metadata 1024 may include, for each request, the current energy or grid state, the workload classification from the classifier 1012, the decision state (permitted 1016, deferred 1018, or blocked 1020), any queued or rescheduled execution times associated with the deferred execution queue 1026, and the final outcome (including blocked execution outcome 1028 when applicable). This metadata extends the auditability of the governance system by enabling regulators, auditors, and institutional investigators to reconstruct how energy constraints influenced AI-assisted operations over time.

In additional embodiments, FIG. 10 also applies to energy system control workflows. When a model 118 proposes control actions for power generation, storage management, or load balancing, the arbitration engine 120 may compare the proposed actions against governed records describing system state, operational limits, and safety envelopes. The policy evaluator 122 then applies the same energy-aware policy rules 1014, using energy or grid state signals 1004 received via the energy telemetry interface 1002, to determine whether such control recommendations may be rendered to human operators. The display gate 124 enforces these energy-aware decisions by allowing only authorized recommendations to be displayed, and all such decisions are captured as part of the energy-aware metadata 1024 in the compliance ledger 126.

The workflow illustrated in FIG. 10 thus extends deterministic governance beyond data provenance and model behavior to include the environmental and operational conditions under which AI workloads may be invoked and rendered. By incorporating energy and grid state signals into policy evaluation, deferral, and blocking logic, the system supports safe integration of AI into critical infrastructure and regulated clinical environments, ensuring that AI-assisted workflows remain aligned with energy constraints, safety requirements, and institutional policies.

FIG. 11

Figure 11:
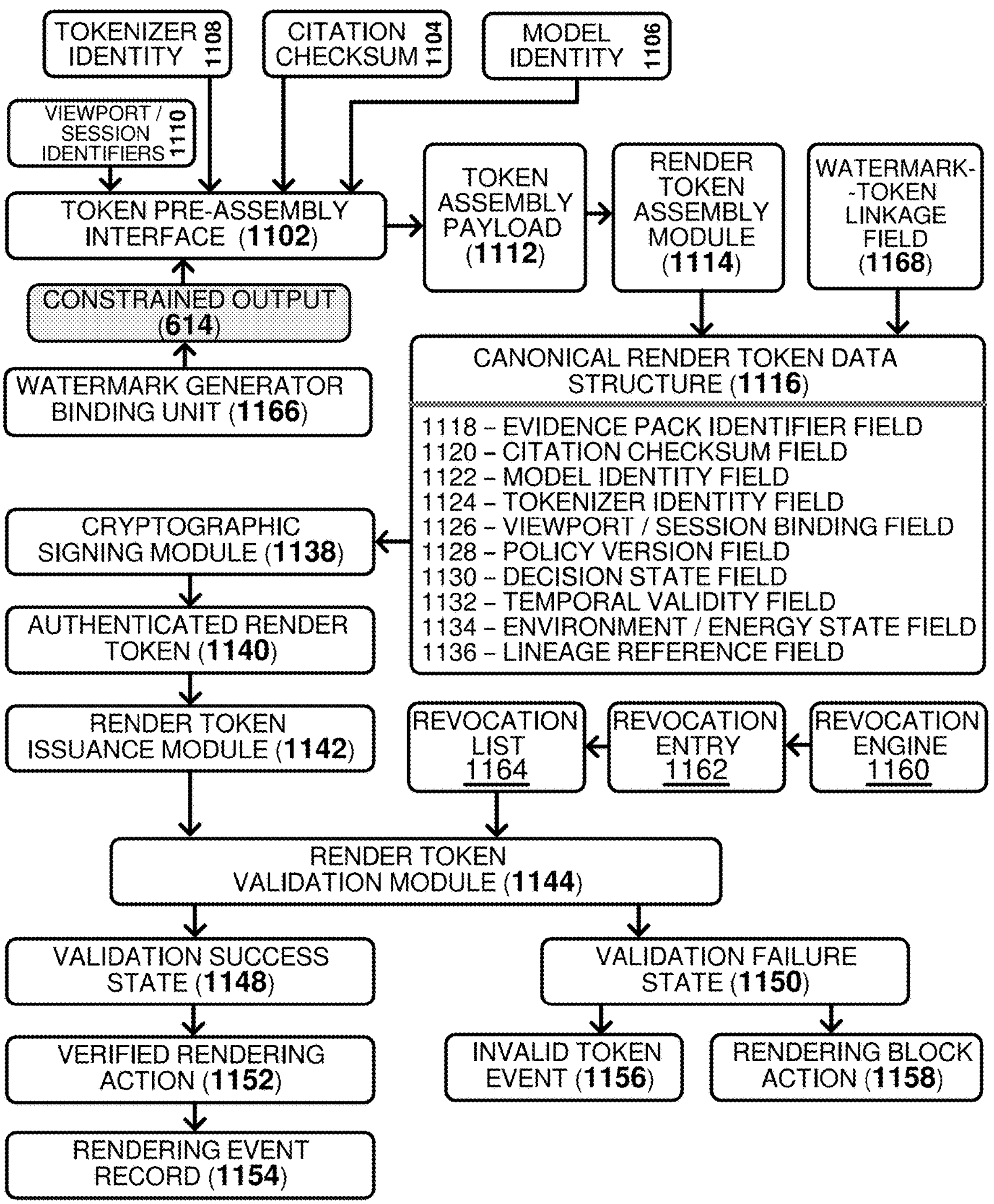
FIG. 11 is a schematic diagram illustrating an example render token architecture and lifecycle, including a render token data structure, cryptographic signing and validation components, and a revocation mechanism.

FIG. 11 illustrates an example render token architecture and lifecycle 1100 that governs the creation, authentication, validation, and revocation of render tokens used by the display gate to authorize all model-generated outputs. The workflow emphasizes deterministic construction of token contents, cryptographic protection mechanisms, and policy-controlled rendering behaviors, ensuring that no model output can be displayed without a valid, authenticated, and ledger-verifiable token tied to a deterministic evidence pack.

As shown in FIG. 11, the display gate receives constrained output 614 produced by the constraint engine 604 after masking, redaction, transformation, and removal operations have been applied in accordance with the verification structure and policy decision state. The constrained output 614 is delivered to a token pre-assembly interface 1102. The token pre-assembly interface 1102 also receives deterministically derived metadata fields, including a citation checksum 1104, a model identity 1106, a tokenizer identity 1108, and one or more viewport or session identifiers 1110. These fields correspond to the canonical deterministic ordering of governed records used in forming the deterministic evidence pack (see FIG. 3) and are derived from the evidence pack identifier and citation checksum recorded in the compliance ledger.

The token pre-assembly interface 1102 assembles the elements into a token assembly payload 1112, which is then provided to a render token assembly module 1114. The render token assembly module 1114 organizes the payload into a canonical render token data structure 1116. This canonical structure includes, without limitation, an evidence pack identifier field 1118, a citation checksum field 1120, a model identity field 1122, a tokenizer identity field 1124, a viewport or session binding field 1126, a policy version field 1128, a decision-state field 1130, a temporal-validity field 1132, an environmental or energy state field 1134, and a lineage reference field 1136. Each field is assembled in a deterministic ordering so that identical inputs always produce identical canonical structures. The evidence pack identifier 1118 and citation checksum 1120 are deterministically derived from the canonical deterministic ordering of governed records used to construct the evidence pack and therefore change whenever the governed record ordering changes.

The canonical render token structure 1116 is delivered to a cryptographic signing module 1138, which applies one or more integrity mechanisms including digital signatures, message authentication codes, cryptographic hashes, or hardware-anchored attestations. The result is an authenticated render token 1140. The authenticated render token 1140 is recorded by a render token issuance module 1142, which writes issuance metadata—including the evidence pack identifier 1118, citation checksum 1120, and deterministic assembly parameters—to the compliance ledger.

Before any rendering may occur, the client must present the authenticated render token 1140 to a render token validation module 1144. The validation module verifies the structural correctness of the token, validates its cryptographic signature, confirms that the token is bound to the correct session or viewport, and checks that it has not expired under temporal-validity rules. The validation module additionally confirms that: (i) the policy version recorded in field 1128 matches the currently active institutional policy set; (ii) the evidence pack identifier 1118 and citation checksum 1120 correspond to a current, unsuperseded evidence pack entry recorded in the compliance ledger; and (iii) the canonical deterministic ordering represented by the evidence pack identifier has not been invalidated or superseded by a correction event as described in FIG. 12.

If all validation requirements are satisfied, the validation module 1144 produces a validation success state 1148, authorizing the display gate to render the constrained output 614 via a verified rendering action 1152. Details of the rendering event, including the identifying fields of the validated render token and associated watermark identifiers, are stored in a rendering event record 1154 in the compliance ledger. If the token is invalid, expired, mismatched, revoked, or structurally incorrect, the validation module generates a validation failure state 1150, prompting the system to issue an invalid-token event 1156 and a rendering block action 1158, preventing unauthorized or outdated content from being displayed.

FIG. 11 further illustrates a revocation engine 1160 that monitors governed record corrections, evidence pack supersession events, policy updates, and environmental changes. When any such event affects the canonical deterministic ordering used in a previously issued evidence pack—or the corresponding evidence pack identifier or citation checksum—the revocation engine 1160 generates a revocation entry 1162 and records it in a revocation list 1164 stored in the compliance ledger. During validation, if the render token's evidence pack identifier 1118 or citation checksum 1120 appears on the revocation list, the validation module automatically issues a validation failure state and a rendering block action.

Finally, FIG. 11 shows a watermark-binding unit 1166, which embeds visible or invisible watermarks into the constrained output 614. These watermarks are linked via a watermark-token linkage field 1168 contained in the canonical render token data structure 1116. This linkage ensures that any rendered content can be cryptographically associated with the exact evidence pack, canonical deterministic ordering, and render token that authorized its display.

Together, the components illustrated in FIG. 11 establish a deterministic, cryptographically authenticated, policy-controlled tokenization architecture that guarantees that every rendered output is provably derived from governed records organized in a canonical deterministic ordering, validated against policy, and authorized only when a current, unsuperseded evidence pack identifier and citation checksum are present in the compliance ledger.

FIG. 12

Figure 12:
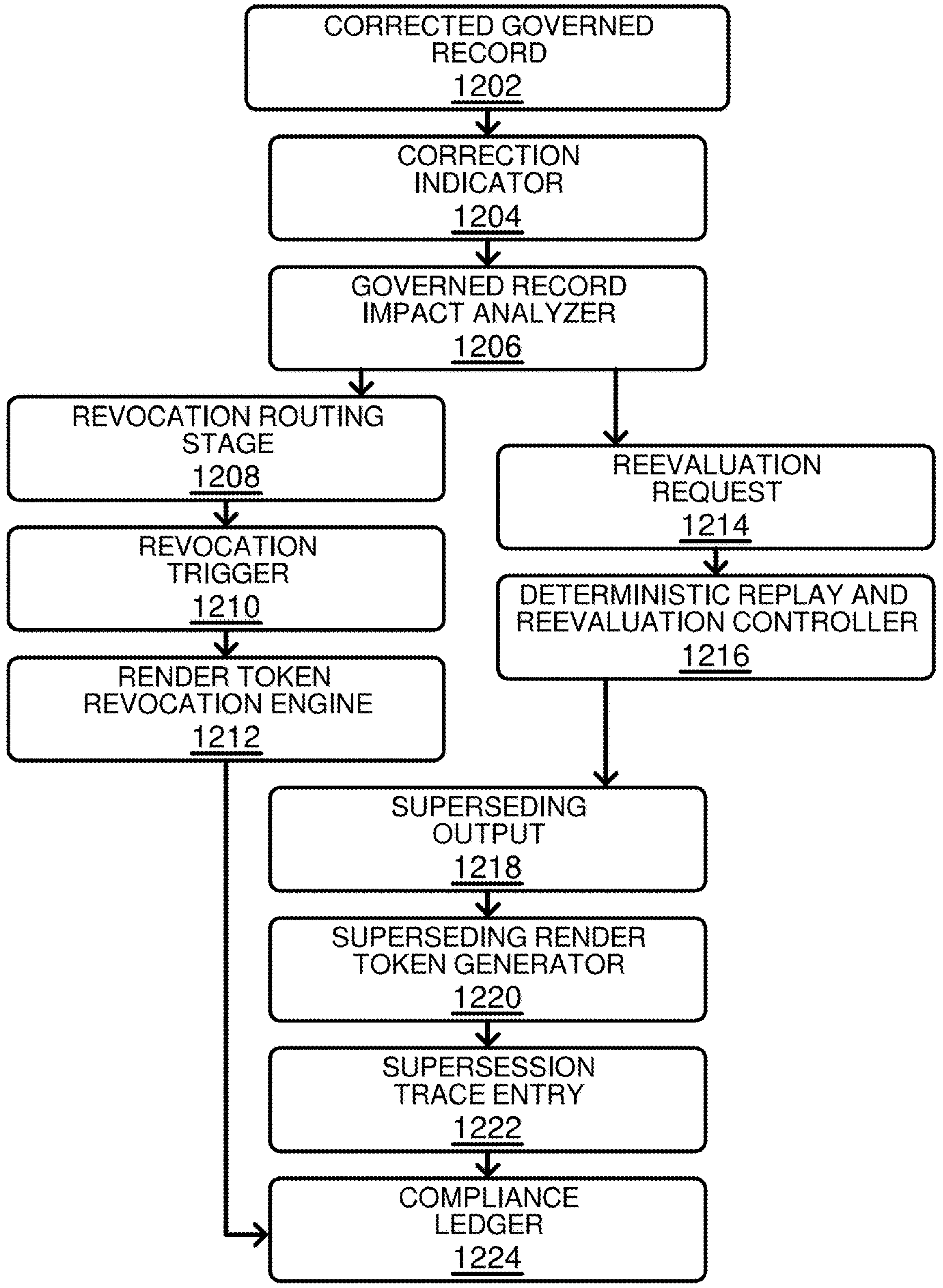
FIG. 12 is a workflow diagram illustrating an example correction propagation and supersession process, including impact analysis, revocation routing, deterministic replay, and superseding output generation.

FIG. 12 illustrates an example correction propagation and supersession workflow 1200 that governs how the system responds when a governed record or any upstream evidentiary element previously contributing to a rendered view is corrected, superseded, or otherwise invalidated. This workflow ensures that outdated or erroneous governed data cannot continue to influence downstream clinical or operational decisions. The figure depicts the event sequence beginning with identification of a corrected governed record and continuing through render token revocation, deterministic reevaluation of the evidence pack, issuance of superseding output, and recording of a supersession trace within the compliance ledger.

As shown in FIG. 12, the workflow begins when a correction event is detected at the governed store. A corrected governed record 1202 may result from human review, automated consistency detection, external system updates, or reconciliation of time-segment or association inconsistencies. The corrected governed record 1202 is delivered to a correction indicator 1204, which identifies which prior model invocations, render tokens, constrained outputs, or rendered views depended on the earlier, now-invalid version of the governed record. The correction indicator 1204 communicates this information to a governed record impact analyzer 1206.

The governed record impact analyzer 1206 evaluates lineage relationships and dependency metadata recorded in the governed store, the evidence pack constructor, and the compliance ledger. The analyzer determines the full set of render tokens and rendered outputs whose underlying evidence packs included the invalidated governed record. Each evidence pack identified in this step is associated with its previously recorded pack identifier and citation checksum, ensuring that the analyzer can determine exactly which canonical deterministic ordering of governed records was used in each rendering.

Once all affected tokens are identified, the system initiates a revocation routing stage 1208. During this stage, each render token is examined to determine whether: (i) the token references an evidence pack whose canonical deterministic ordering included the invalidated governed record, (ii) the token's embedded pack identifier corresponds to a pack that must be superseded, or (iii) the constrained output contains statements derived from or validated against outdated information. When any such condition is satisfied, the system generates a revocation trigger 1210, which is delivered to a render token revocation engine 1212.

The render token revocation engine 1212 marks the affected render tokens as invalid and generates revocation entries containing the obsolete pack identifier and citation checksum associated with each token. These revocation entries are added to a revocation list maintained by the compliance ledger, ensuring that any future attempt to validate a superseded or outdated render token will correctly result in rejection by the display gate and client-side validation mechanisms.

Following token revocation, the system initiates a deterministic reevaluation of the impacted content. A reevaluation request 1214 is delivered to a deterministic replay and reevaluation controller 1216. The controller reconstructs the prior execution context using invocation metadata, including the original pack identifier, citation checksum, canonical deterministic ordering of governed records, policy version identifiers, and environmental state metadata recorded in the compliance ledger. The controller then reassembles a corrected evidence pack by executing the full deterministic evidence pack workflow described in FIG. 3. This includes re-scoring, re-ranking, re-selecting, and reordering governed records; reevaluating capacity constraints; regenerating the canonical deterministic ordering; and computing updated pack identifiers and citation checksums. The corrected pack thus reflects the incorporation of the corrected governed record and ensures deterministic replay equivalence.

The resulting candidate output is forwarded to the arbitration engine, which reevaluates factual, numerical, and contextual claims against the updated governed data. The policy evaluator again applies versioned policy rules using the updated evidence pack and corrected canonical deterministic ordering. If the reevaluated content remains fully supported and policy-permitted, the display gate may issue a new render token tied to the updated evidence pack. However, if the correction alters the evidentiary basis such that any portion of the original output becomes unsupported or contradicted, the system produces a superseding output 1218. The superseding output includes only content validated against the corrected governed records and permitted by the policy evaluator.

The superseding output 1218 is delivered to a superseding render token generator 1220, which produces a new render token that is cryptographically bound to the updated evidence pack. The new token embeds the updated pack identifier, citation checksum, and associated deterministic context identifiers. This ensures that the superseding rendered view cannot be confused with any prior view created under outdated evidence.

After generating the superseding output and render token, the governance system creates a supersession trace entry 1222. The supersession trace entry links the original rendering event to the superseding rendering event, identifies the corrected governed record that triggered the update, records the original and updated evidence pack identifiers and citation checksums, and specifies the policy version and environmental state in effect during the superseding rendering. This information is written to the compliance ledger 126 (shown as compliance ledger 1224 in FIG. 12) as an immutable append-only record, ensuring complete auditability and enabling deterministic reconstruction of the full supersession pathway.

The compliance ledger 1224 ensures that any client or downstream system attempting to use the original superseded render token will encounter a revocation state rather than outdated content. The deterministic replay and supersession workflow therefore ensures that corrections propagate throughout the entire AI governance pipeline, prevents outdated or invalid model-generated content from persisting in user-facing systems, and guarantees that all superseding outputs are produced deterministically and in full accordance with corrected governed data and applicable policy rules.

In some embodiments, the system maintains model metadata describing the conditions under which a model was trained, validated, or authorized for use, including data acquisition modality, measurement resolution or precision, expected reference ranges, temporal scope, institutional protocols, and applicable regulatory definitions.

During operation, incoming data and contextual parameters are evaluated against the stored model metadata to determine whether declared model fitness conditions are satisfied. For example, differences in measurement modality, sensor characteristics, calibration behavior, or reference ranges may be detected even when the underlying variable or semantic label is identical.

If one or more model fitness conditions are not satisfied, the system may prevent rendering of model output, require explicit revalidation or fine-tuning of the model for the detected conditions, or apply policy-driven restrictions, annotations, confidence adjustments, or governance actions to any rendered output.

This enforcement ensures that model outputs are not applied outside the scope of their declared validity, independent of whether the model's internal parameters, architecture, inference mechanism, or decision methodology remain unchanged.

FIG. 13

Figure 13:
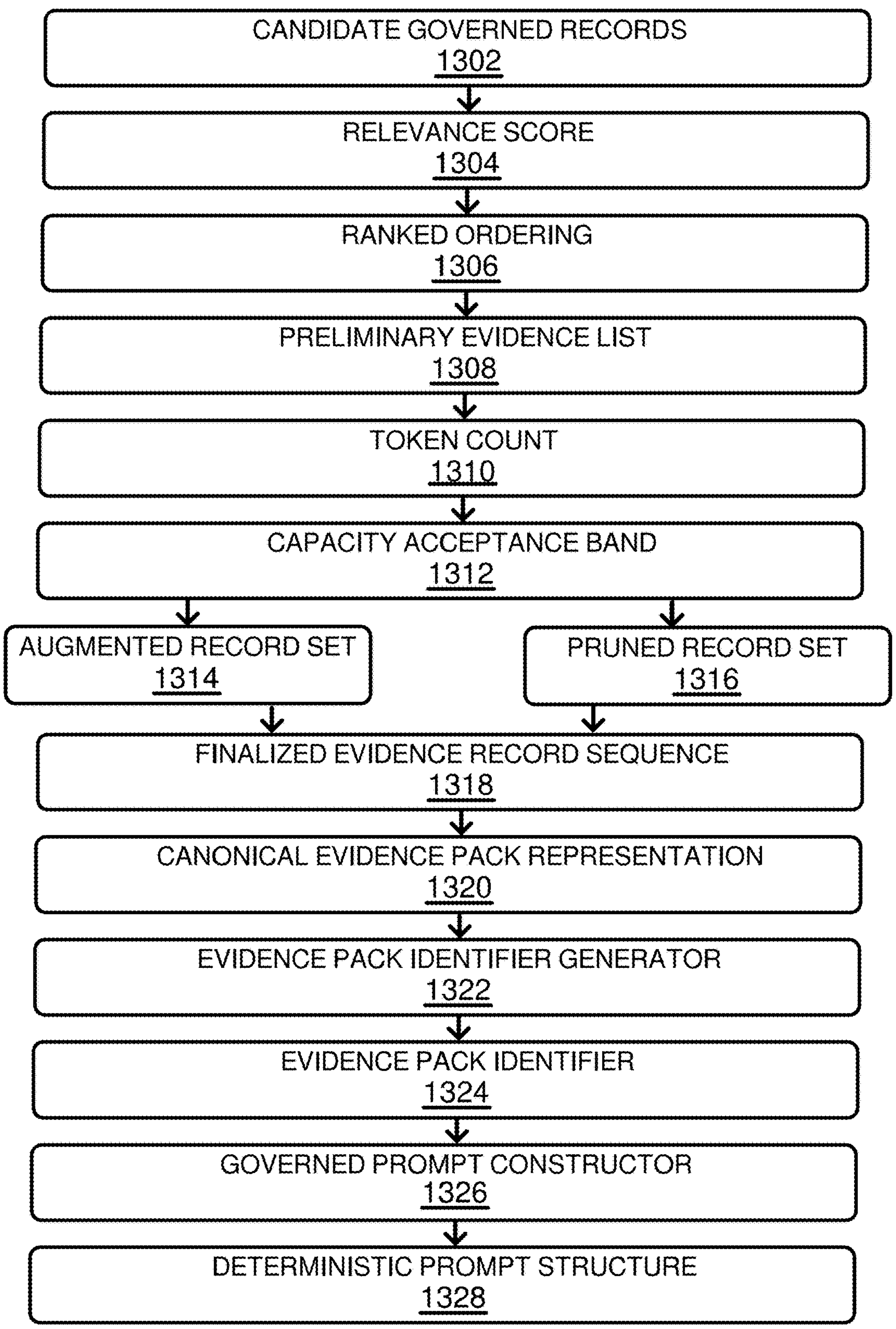
FIG. 13 is a diagram illustrating an example deterministic evidence pack structure, including relevance scoring, ranked ordering, acceptance-band enforcement, and pack identifier generation.

FIG. 13 illustrates an example deterministic evidence pack structure 1300 that represents the internal organization of governed records selected by the evidence pack constructor. The figure depicts the canonical deterministic ordering of governed records, the scoring hierarchy, representational-capacity constraints, and hashing fields that collectively ensure deterministic reconstruction of the evidence pack in all model-invocation scenarios. The architecture shown in FIG. 13 provides structural support for the deterministic behavior introduced in earlier figures and demonstrates how governed records are arranged, serialized, and bound to a cryptographically verifiable identifier.

In some embodiments, the evidence pack constructor 114 comprises one or more internal submodules, including a deterministic scoring module, a token-count computation module, and a pack identifier generator, which collectively operate as part of the evidence pack constructor to perform deterministic scoring, ordering, capacity evaluation, serialization, and identifier generation. These submodules do not operate independently of the evidence pack constructor and do not represent separate system components.

As shown in FIG. 13, the evidence pack constructor receives a set of candidate governed records 1302, retrieved from the governed store in response to a user question or workflow-driven event. Each candidate governed record 1302 includes metadata such as timestamps, measurement types, identifiers, normalization lineage, and record-integrity signatures generated during ingestion. These governed records are processed by a deterministic scoring module that assigns a relevance score 1304 to each record. The scoring module uses deterministic algorithms so that identical inputs always produce identical score values and ordering.

The relevance scores are arranged in a ranked ordering 1306, shown as a vertical sequence sorted from highest-scoring to lowest-scoring governed records. The ranked ordering 1306 is created using a stable sorting method with deterministic tie-breaking criteria, ensuring reproducible positioning for governed records with similar attributes. A deterministic selection process traverses this ranked ordering and assembles a preliminary evidence list 1308, which forms the basis for the evidence pack, subject to representational-capacity constraints.

The preliminary evidence list 1308 is evaluated by a tokenization module (for token-count computation) 1310, reflecting the encoding footprint of the governed records when formatted for inclusion in the governed prompt. The token count 1310 is compared to a capacity acceptance band 1312, which contains a lower threshold and an upper threshold defined according to the tokenizer identity associated with the model. If the token count 1310 falls below the lower threshold, the system performs deterministic augmentation to add additional governed records from the ranked ordering 1306, producing an augmented record set 1314. If the token count exceeds the upper threshold, the system performs deterministic pruning to remove the least-relevant governed records, producing a pruned record set 1316. Both augmentation and pruning operations rely exclusively on the ordered ranking and deterministic selection rules, ensuring that they are reproducible under identical input conditions.

The result of augmentation or pruning is a finalized evidence record sequence 1318, which represents the canonical deterministic ordering of governed records for the evidence pack. The finalized sequence 1318 is a strictly ordered list of normalized governed values and identifiers arranged according to deterministic relevance, ordering, and capacity rules. Each governed record in sequence 1318 is associated with its ingestion-origin integrity signature and retains the lineage reference indicating whether it is original, corrected, or superseded. The canonical deterministic ordering represented by 1318 forms the evidentiary foundation for the deterministic evidence pack structure.

The evidence pack constructor transforms the finalized evidence record sequence into a canonical evidence pack representation 1320. This representation encodes the deterministic ordering embodied in sequence 1318 into a canonical serialized form using deterministic field ordering, key-value mapping, and formatting rules. The canonical representation 1320 is designed to ensure that identical governed record inputs and configuration parameters always result in identical serialized structures. The canonical deterministic ordering of governed records embodied in 1318 therefore directly defines the structure and content of the canonical representation 1320.

To support verification, reproduction, and audit, the canonical representation 1320 is processed by a pack identifier generator 1322. The pack identifier generator 1322 applies a cryptographic hashing or message-digest algorithm over a defined set of deterministic inputs that include: (i) the canonical deterministic ordering of governed records represented in 1318; (ii) the canonical serialized structure 1320; (iii) the associated integrity signatures of included governed records; (iv) the tokenizer identity used for prompt formation; and (v) deterministic formatting parameters. The output is a pack identifier 1324, which uniquely and deterministically identifies the complete evidence pack. The evidence pack identifier 1324 ensures that any change to the governed record ordering, lineage, or content results in a different identifier, thereby enabling compliance ledger traceability, deterministic replay, and secure render token validation.

The finalized deterministic evidence pack—consisting of the canonical deterministic ordering 1318, the canonical serialized representation 1320, and the evidence pack identifier 1324—is delivered to a governed prompt constructor 1326, which formats the governed records into a deterministic prompt structure 1328. The deterministic prompt structure 1328 arranges text, structured data, numerical fields, and identifiers in a deterministic sequence that directly corresponds to the canonical deterministic ordering in 1318. This ensures that model invocations executed under fixed decoding parameters yield reproducible output and that any replay operation using the same evidence pack produces the same results.

Across embodiments, FIG. 13 shows that deterministic evidence pack structure 1300 guarantees that governed records are scored, ordered, capacity-constrained, serialized, and hash-bound in a manner that eliminates nondeterministic variation. The structural elements illustrated in FIG. 13 provide the foundation for deterministic replay, auditability, explainability, revocation logic, and regulatory verification by enabling the system to reconstruct exactly which governed records contributed to a particular model output or rendered view and to verify that such records appeared in the canonical deterministic ordering defined by 1318.

FIG. 14

Figure 14:
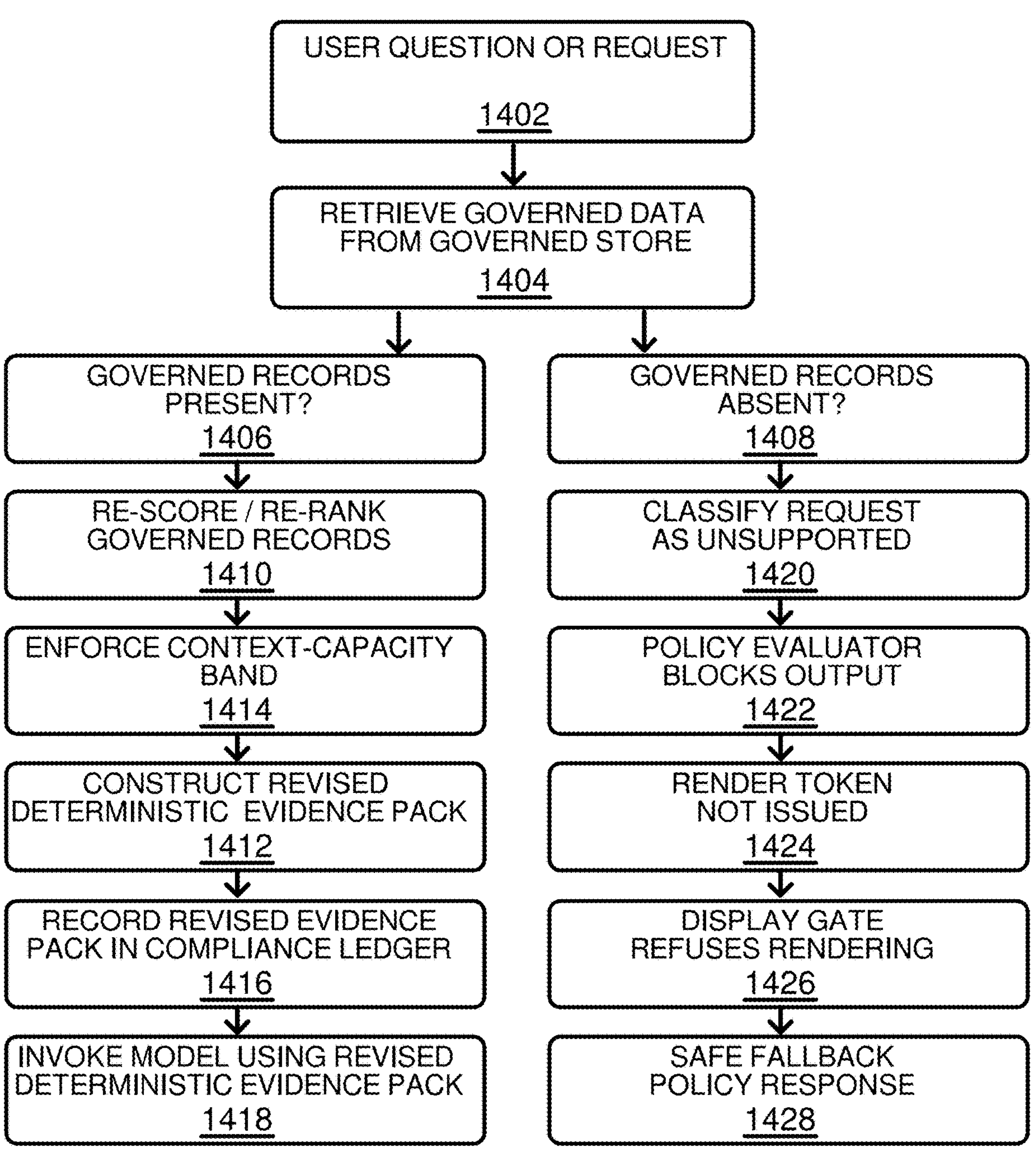
FIG. 14 is a diagram illustrating an example deterministic evidence-governance workflow for handling supported requests through evidence pack reconstruction and unsupported requests through governed output refusal.

FIG. 14 illustrates an example deterministic evidence-governance workflow 1400 that determines whether a deterministic evidence pack must be reconstructed or whether a user request must be classified as unsupported due to the absence of governed records. The workflow begins when the system receives a user question or workflow-driven request 1402. In response, the evidence pack constructor retrieves governed records from the governed store 1404, applying any required consent, purpose-of-use, role-based, or jurisdictional filters as described in earlier sections.

The system then determines whether governed records relevant to the user request are present in the governed store. If governed records exist, as indicated by decision element 1406, the system initiates a deterministic reconstruction pathway. The evidence pack constructor re-scores and re-ranks governed records under deterministic relevance-scoring criteria 1410 and enforces the context-capacity acceptance band 1414 by deterministically augmenting or pruning governed records to ensure that the representational footprint remains within the tokenizer-specific capacity constraints. The constructor next forms a revised deterministic evidence pack 1412, assigning a new evidence pack identifier and citation checksum that reflect the canonical deterministic ordering used to structure the pack. The revised evidence pack is recorded as an immutable entry 1416 in the compliance ledger, enabling deterministic replay and audit verification. The deterministic generation controller then invokes the model using the revised deterministic evidence pack 1418, ensuring that subsequent arbitration, policy evaluation, render token generation, and rendering operations are grounded in the updated evidence context.

If governed records addressing the user request are absent from the governed store, as indicated by decision element 1408, the system initiates an absence-of-evidence pathway. The request is deterministically classified as unsupported 1420, and the policy evaluator applies the applicable policy rules to block rendering of any model-generated statements related to the unsupported topic 1422. Because no governed evidence exists to justify rendering, the render token generator declines to issue a render token 1424, and the display gate refuses rendering 1426 in accordance with its requirement that all rendering be authorized by a valid, non-revoked, cryptographically authenticated render token. In some embodiments, the system may generate a safe fallback policy response 1428 indicating that the requested content cannot be rendered due to the absence of authoritative governed data.

The dual-path workflow illustrated in FIG. 14 ensures that the system behaves deterministically and safely regardless of the availability of governed evidence. When governed records exist, the system reconstructs the evidence pack in a reproducible manner and updates all downstream components to use the revised pack. When governed records are absent, the system deterministically prevents the rendering of unsupported, speculative, or hallucinated model output. This workflow enforces evidence-bounded behavior across model invocation, arbitration, policy evaluation, render token issuance, and display-gate enforcement, and supports deterministic replay and comprehensive auditability.

DETAILED DESCRIPTION OF THE EMBODIMENTS

This and following sections describes a unified deterministic governance pipeline in which each module relies on the outputs of previous modules and produces structured artifacts required by subsequent modules. The subsystems disclosed from here on do not operate independently, but together implement a coordinated technical process that ensures deterministic evidence alignment, verified provenance, reproducible inference, and cryptographically governed rendering.

Overview of System Architecture

In an exemplary embodiment, the invention provides a coordinated computational architecture that governs the production, verification, and rendering of artificial intelligence output in environments requiring high reliability and strict compliance. The architecture is composed of a set of cooperating modules that together implement deterministic evidence procurement, deterministic model invocation, governed output arbitration, cryptographic rendering controls, and replayable compliance auditing.

The system receives governed clinical or operational records from multiple heterogeneous sources, constructs deterministic evidence contexts according to invariant rules, and derives from those records a canonical deterministic ordering of governed records that defines the evidentiary basis for each model invocation. This canonical ordering is used to compute a deterministic evidence pack identifier and a citation checksum, both of which uniquely bind the governed evidence to the invocation context and are recorded in the compliance ledger.

Model invocation proceeds only under deterministic conditions that guarantee reproducibility. The arbitration engine verifies candidate model outputs against governed records in the evidence pack using structured, reproducible comparison logic. A policy evaluator then applies machine-interpretable institutional, jurisdictional, and workflow policies to determine whether each statement may be rendered.

Rendering is permitted only when the display gate receives a valid render token whose cryptographically authenticated fields match a current, unsuperseded ledger entry. Each render token binds the constrained output to the evidence pack identifier, the citation checksum, the model and tokenizer identity, the policy version, the viewport or session, and other deterministic metadata. If no governed evidence exists for a portion of the model output—or if a required governed record has been corrected or superseded—the system declines to issue a valid render token, and the display gate refuses to render the associated content.

All significant transformations—including governed record ingestion and correction, deterministic evidence pack construction and reconstruction, model invocation parameters, arbitration results, policy decisions, render token issuance and revocation, and supersession of prior outputs—are recorded in an append-only compliance ledger. These records enable deterministic replay, forensic verification, and external or internal regulatory auditing.

FIG. 1 provides a high-level architectural overview of the deterministic governance system described in this section. As shown in FIG. 1, the system includes a governed store, a deterministic evidence pack constructor, a deterministic generation controller, an arbitration engine, a policy evaluator, a display gate with render token enforcement, and a compliance ledger, together with data flows and control flows interconnecting these subsystems. The subsequent figures (FIGS. 2-14) expand each functional component of this architecture in greater detail and illustrate how governed data ingestion, deterministic evidence formation, deterministic model invocation, arbitration, policy evaluation, rendering control, token validation, and correction propagation are implemented within the unified deterministic governance framework.

Unity-of-Architecture

In various embodiments, the governed store, deterministic evidence pack constructor, deterministic generation controller, arbitration engine, policy evaluator, display gate, render token validation engine, and revocation engine operate as interdependent components of a unified deterministic governance pipeline. Each subsystem produces structured outputs that are consumed by subsequent subsystems, and the overall deterministic, evidence-bound, and policy-compliant rendering behavior is achieved only when all components operate together. The omission of any subsystem disrupts the deterministic reconstruction pathway, breaks evidentiary alignment, disables deterministic replay, or prevents cryptographic enforcement at the display boundary. Accordingly, the disclosed architecture constitutes a single coordinated technical system in which each module is necessary to achieve the governed rendering operations described herein.

Ingest, Normalization, and Signing of Governed Data

The system receives data from clinical and operational sources such as physiological monitors, ventilators, infusion devices, wearable sensors, laboratory analyzers, imaging systems, health information systems, and order management platforms. Incoming data may consist of continuous measurement streams, discrete laboratory results, clinician documentation, orders, timestamps, or device metadata. An ingest subsystem normalizes these heterogeneous formats into a unified internal representation suitable for deterministic downstream processing, including construction of the canonical deterministic ordering of governed records used in the evidence pack.

Each incoming data element is bound to a set of identifiers that permit precise lineage and contextualization. These identifiers may include a patient identifier, provider identifier, device identifier, location identifier, a verified start and end time window, the provenance source, and an ingestion timestamp. Values and metadata are normalized to a consistent internal schema; for example, continuous measurements may be resampled or windowed, and discrete values such as laboratory results may incorporate verified collection and measurement timing. This deterministic normalization ensures that governed records are comparable, stable, and suitable for producing repeatable ordering and hashing outcomes.

An integrity protection mechanism is applied to each governed record. In one embodiment, the system computes a digital signature or message authentication code over the record contents and metadata. In another embodiment, a secure hash function is used to provide tamper detection. These integrity artifacts form the atomic inputs to the citation checksum and to the evidence pack identifier computed during deterministic evidence pack construction. Each governed record, together with its integrity protection, is persisted in a governed store that supports versioning and lineage tracking. When corrections occur—such as amended measurements, metadata updates, or changes to patient consent—the governed store maintains a traceable lineage between the original and corrected records, enabling downstream modules to determine when a previously computed canonical deterministic ordering must be recomputed.

Corrections to governed records propagate deterministically through the remainder of the system. Because the integrity, ordering, and lineage of governed records define the evidence pack, any update to a governed record may trigger a recalculation of the canonical deterministic ordering, a new evidence pack identifier and citation checksum, and revocation of render tokens associated with prior pack versions. These updated identifiers are recorded in the compliance ledger as immutable entries and support deterministic replay and supersession workflows, ensuring that downstream rendering cannot rely on stale or invalid evidence. This guarantees that ingestion-level changes properly propagate through deterministic evidence procurement, model invocation, arbitration, and render token validation as described in subsequent sections.

Governed Store and Query Interface

The deterministic evidence pack constructor operates as the system's controlled mechanism for defining the exact evidence context used for any model invocation. It receives governed records from the governed store, determines which records are relevant to a question or workflow, and applies deterministic scoring, ranking, and capacity-band rules to form a reproducible evidence pack. The constructor ensures that the composition and ordering of the pack are canonical and auditable, and produces a evidence pack identifier that binds downstream inference, verification, and rendering steps to a verifiable evidence lineage.

The governed store exposes a unified schema that permits consistent access to clinical measurements, laboratory values, documentation, imaging metadata, orders, and operational states regardless of their original format. A deterministic query interface allows downstream modules, including the evidence pack constructor, to retrieve governed records according to patient identifiers, device or measurement types, time windows, verified locations, and contextual constraints such as patient consent, clinician role, and declared purpose of use. All query operations are deterministic: given the same query parameters, governed store state, and policy context, the same governed record set is returned in the same stable ordering.

The governed store ensures that returned records preserve deterministic ordering that supports later construction of the canonical deterministic ordering of governed records used in the evidence pack. Records may be ordered chronologically, by stable record identifier, or by a reproducible policy-defined ordering function. The governed store additionally performs lineage resolution when multiple versions of a governed record exist, ensuring that the correct lineage state is used in downstream deterministic ranking and hashing procedures. When record timing, metadata alignment, or provenance reconciliation is required for deterministic replay, the governed store applies deterministic normalization rules so that downstream evidence pack reconstruction yields identical results.

Queries may apply consent filtering, visibility restrictions based on clinician role, or jurisdiction-specific rules. These filters ensure that governed records excluded by policy cannot appear in the canonical deterministic ordering used for model invocation. The governed store records the parameters and filters applied to each query so that deterministic replay procedures can reproduce the same governed record set for auditing or regulatory verification.

In embodiments where governed data relevant to a user request is absent, the governed store deterministically returns an empty or null result set. This absence-of-evidence condition propagates directly into evidence pack construction, which classifies the request as unsupported and prevents issuance of a render token for any model-generated output addressing the unsupported topic. In contrast, when relevant governed records exist but were not included in a prior evidence pack, the governed store's deterministic query interface permits the evidence pack constructor to detect these additional records and perform deterministic evidence pack reconstruction as described in "Deterministic Evidence Pack Constructor" section and FIG. 3.

The governed store thus provides the authoritative, deterministic foundation for evidence pack construction, replay, correction propagation, and supersession. By ensuring that governed records are consistently filtered, normalized, ordered, version-resolved, and query-reproducible, the governed store enables every downstream component—including the evidence pack constructor, deterministic generation controller, arbitration engine, policy evaluator, display gate, and render token validation modules—to operate on a reliable, reproducible governed data substrate.

Deterministic Evidence Pack Constructor

When a user submits a question or workflow-associated request, the system constructs a deterministic evidence pack that defines precisely the governed evidence context permitted for model invocation. The evidence pack constructor identifies clinical facets relevant to the question—such as vital sign time series, laboratory values, device states, medications, imaging results, documentation excerpts, or prerequisites for a forthcoming interpretation—and retrieves governed records from the governed store using deterministic filtering rules.

Each candidate governed record is evaluated using a deterministic ranking function that considers relevance to the question, temporal proximity, measurement specificity, provenance metadata, and lineage state. These deterministic ranking operations guarantee that identical governed records, query parameters, and policy contexts always yield the same score values and ordered ranking. The constructor arranges these records into a stable ranked ordering used as the precursor to the canonical deterministic ordering of governed records, which defines the sequence of governed records to be included in the evidence pack.

The system computes a measure of context-capacity utilization by dividing the number of tokens required to encode the candidate governed records by the model's context capacity. A deterministic acceptance band defines a lower and upper utilization bound. If utilization is below the lower bound, the constructor deterministically augments the ranked list to improve evidence coverage. If utilization exceeds the upper bound, the constructor deterministically prunes lesser-ranked records. These deterministic augmentation and pruning procedures ensure that, regardless of environment or timing, the same governed record set yields the same finalized structure.

After augmentation or pruning, the constructor forms a finalized evidence record sequence—the canonical deterministic ordering of governed records. This canonical ordering is the authoritative sequence of governed records used during model invocation and is recorded in the compliance ledger. The canonical ordering is serialized into a canonical evidence pack representation using deterministic formatting rules, field mappings, and lineage signatures to ensure that identical input conditions always yield identical pack structures.

The system then computes two deterministic identifiers:

An evidence pack identifier, derived from a cryptographic hash or message digest over the canonical deterministic ordering, its serialized representation, the tokenizer identity, governed record integrity signatures, and deterministic formatting parameters.

A citation checksum, derived from the governed record content as encoded for prompt construction, providing integrity protection and lineage sensitivity.

Together, the canonical ordering, the evidence pack identifier, and the citation checksum form the immutable, auditable identity of the deterministic evidence pack and are recorded in an append-only compliance ledger entry.

The deterministic evidence pack may be materialized as structured data or formatted text for use by the deterministic generation controller. In one embodiment, the deterministic scoring, ranked ordering, acceptance-band augmentation and pruning, canonical ordering formation, canonical serialization, pack-identifier generation, and governed prompt construction are implemented in the structures shown in FIG. 13, which includes candidate governed records 1302, relevance scores 1304, ranked ordering 1306, preliminary evidence list 1308, token count 1310, capacity acceptance band 1312, augmented and pruned record sets 1314 and 1316, canonical finalized evidence sequence 1318, canonical evidence pack representation 1320, evidence pack identifier generator 1322, evidence pack identifier 1324, and governed prompt constructor 1326.

In some embodiments, the evidence pack constructor is further configured to perform deterministic evidence pack reconstruction when governed records exist in the governed store that are relevant to the user's request but were not included in the currently active deterministic evidence pack. In such embodiments, the evidence pack constructor reexecutes its deterministic scoring, ranking, capacity-band enforcement, canonical ordering generation, and hashing steps over the complete governed record set. The revised evidence pack is assigned a new evidence pack identifier and citation checksum, and the updated canonical deterministic ordering is recorded in a new immutable ledger entry. Subsequent model invocations, arbitration, policy evaluation, and render token generation operate using this superseding deterministic evidence pack.

In contrast, when governed records addressing the user request are absent from the governed store, the system deterministically classifies the request as unsupported. In such embodiments, the arbitration engine classifies model-generated statements responsive to the unsupported topic as "not addressed," the policy evaluator prohibits or constrains rendering of such statements, the render token generator declines to issue a cryptographically authenticated render token, and the display gate refuses to render any model output that cannot be tied to governed evidence through a valid evidence pack identifier and citation checksum. This dual-path design ensures that the system may reconstruct or expand evidence packs when authoritative governed data is available, while preventing unsupported or hallucinated content from being displayed when governed evidence is absent.

An example reconstruction workflow illustrating the deterministic branching logic for evidence pack reconstruction, augmentation or pruning under the context-capacity acceptance band (also referred to herein as the capacity-acceptance band or context-capacity band), and the absence-of-evidence classification pathway is shown in FIG. 14. As depicted in FIG. 14, when governed records relevant to the user question or request are present in the governed store, the system performs deterministic re-scoring and re-ranking of governed records (1410), enforces the context-capacity acceptance band (1414), constructs a revised deterministic evidence pack with a new evidence pack identifier and citation checksum (1412), records the revised evidence pack as an immutable entry in the compliance ledger (1416), and invokes the model using the revised deterministic evidence pack (1418). When governed records are absent, the system deterministically classifies the request as unsupported (1420), the policy evaluator blocks output (1422), the render token generator declines to issue a render token (1424), and the display gate refuses rendering (1426), optionally providing a safe fallback policy response (1428).

In one embodiment, canonical deterministic ordering is computed by applying a reproducible multi-key sort over the governed records selected for inclusion in the evidence pack. The ordering may be determined, for example, by sorting records according to (1) a primary identifier or hash of the governed record, (2) a normalized timestamp associated with the record, and (3) a lineage index distinguishing original, corrected, or superseding versions. Alternate deterministic ordering mechanisms, including lexicographic ordering, stable ranking functions, authenticated data structures, or institution-specific deterministic comparators, may be used so long as the resulting ordering is reproducible whenever the same governed records and metadata are provided as inputs.

In one embodiment, the deterministic scoring function assigns each governed record a numeric relevance score computed from reproducible attributes. The score may be calculated, for example, using a weighted combination of (1) temporal proximity to the question or workflow time window, (2) semantic relevance of the record type to the requested clinical facet, and (3) a lineage weight indicating whether the record is an original version or a corrected or superseding version. An illustrative scoring formula may be expressed as:

$$\text{Score} = w_t \cdot f_t(\Delta t) + w_s \cdot f_s\,(\text{semantic match}) + w_l \cdot f_l\,(\text{lineage index})$$

where $\omega_t$, $\omega_s$, and $\omega_l$ are fixed deterministic weights, and each function $f_t$, $f_s$, and $f_l$ is a predefined deterministic mapping applied consistently across sessions. Alternate deterministic scoring mechanisms may be used so long as identical governed records and metadata yield identical scores and thus identical ranked orderings.

When a user request is classified as unsupported due to the absence of governed evidence, the system generates a safe fallback policy response (1428). This response may include a neutral message, redirection to human review, or other institution-approved non-clinical output. The fallback is deterministic, is not model-generated content, and does not require or receive a render token.

This workflow ensures consistent, evidence-bound behavior regardless of whether governed evidence exists.

Deterministic Generation Controller

The deterministic generation controller governs the invocation of one or more artificial intelligence models using the deterministic evidence pack constructed in Deterministic Evidence Pack Constructor" section. Before invocation, the controller validates that the canonical deterministic ordering of governed records, the evidence pack identifier, and the citation checksum associated with the evidence pack correspond to a current, unsuperseded entry in the compliance ledger. If any mismatch, correction, or supersession event has occurred, invocation is halted and the evidence pack is deterministically reconstructed before proceeding.

In one embodiment, deterministic decoding settings are enforced by configuring the model invocation parameters to eliminate sampling variability. Such settings may include, for example, enforcing a temperature value of 0, selecting top-k=1, disabling nucleus sampling and all stochastic sampling modes, and applying strict greedy decoding so that the model always selects the highest-probability next token. Additional deterministic configurations may be used so long as the decoding procedure produces identical token sequences for identical governed prompts, tokenizer identities, and model parameters across repeated executions.

The controller verifies that the tokenizer identity used to prepare the governed prompt matches the tokenizer identity associated with the requested model. The controller additionally verifies that all required clinical or operational prerequisites are satisfied, that governed records fall within valid consent scopes, and that the model's context capacity is sufficient to accommodate the canonical deterministic ordering of governed records and the governed prompt derived from it.

To ensure repeatability, the controller enforces deterministic decoding settings, such as fixed temperature, deterministic top-k or nucleus suppression, and exclusion of sampling randomness. These settings guarantee that identical governed inputs and configuration parameters always yield identical model outputs. The deterministic generation controller rejects any invocation attempt that does not meet these strict determinism requirements.

For each invocation, the controller records, in an append-only ledger entry, the model version, tokenizer identity, deterministic decoding parameters, the evidence pack identifier, the citation checksum, the hash of the governed prompt, and a reference to the canonical deterministic ordering used in the evidence pack. These recorded values ensure that the system, a regulator, or an auditor may reproduce the exact same model output at a later time using the same governed inputs and model configuration.

When governed data relevant to the invocation is corrected or superseded (as described in "Correction Propagation and Superseding Views" section and FIG. 12), the deterministic generation controller replays the invocation using the revised evidence pack. This includes recomputing the canonical deterministic ordering, reconstructing the governed prompt, reapplying deterministic decoding parameters, and producing a superseding model output. The superseding output is then evaluated by the arbitration engine and policy evaluator and may result in issuance of a superseding render token if the content remains acceptable. Invocations tied to outdated evidence packs cannot be reused and are deterministically flagged as superseded by the compliance ledger.

In embodiments where multiple models are used, the deterministic generation controller ensures that all models receive the identical deterministic governed prompt, derived from the same canonical deterministic ordering, evidence pack identifier, and checksum. This enables consistent arbitration, policy evaluation, and consensus assessment across parallel deterministic model invocations.

Arbitration Engine

The arbitration engine provides the system's technical verification layer by evaluating whether model-generated statements are supported by governed records contained in the deterministic evidence pack. It operates at sentence or token granularity and classifies each output segment as supported, contradicted, or not addressed. The arbitration engine produces a structured verification record consumed by the policy evaluator and display gate, ensuring that no rendering action can occur without evidence-based validation.

The arbitration engine receives candidate model output and determines, in a deterministic and reproducible manner, whether each portion of the output is supported by governed evidence. The candidate output is segmented into sentences using deterministic normalization rules that ensure identical segmentation results under deterministic replay. For each sentence, the arbitration engine examines the canonical deterministic ordering of governed records contained in the evidence pack and evaluates whether the asserted facts, numerical values, clinical relationships, or contextual claims are supported, not addressed, or contradicted by governed data.

The arbitration engine applies deterministic comparison rules that incorporate numeric tolerances, verified time windows, lineage-sensitive equality checks, and semantic-equivalence mappings defined in policy. Because these comparison rules are deterministic, identical governed inputs and identical model output produce identical arbitration results, supporting deterministic replay and regulatory verification. Each sentence is classified as:

supported—fully substantiated by one or more governed records in the canonical deterministic ordering, not addressed—no governed record exists in the evidence pack to substantiate the claim, contradicted—the asserted claim is inconsistent with one or more governed records.

The arbitration engine produces a verification structure containing mapping relationships between sentences and the governed records referenced from the canonical deterministic ordering, records of contradictions, a cross-reference to the evidence pack identifier and citation checksum, and any intermediate comparison results. The verification structure is deterministic and is written to the compliance ledger so that regulators or auditors may reconstruct how every sentence was evaluated.

If multiple models are used, each model's output is independently verified using the same deterministic governed record set. Any material disagreements, inconsistencies, or contradictions detected across models may be recorded and supplied to a consensus module or downstream human reviewer.

In some embodiments, the arbitration engine operates in a streaming, low-latency manner. As the deterministic generation controller receives tokens or sentences from the model, the arbitration engine incrementally classifies each new sentence or segment relative to governed records in the canonical deterministic ordering. In parallel, a policy evaluator may compute incremental policy decisions, enabling the system to block or constrain unsupported statements before the model completes its output. This deterministic streaming design ensures that arbitration results remain reproducible even when partial outputs are processed.

In further embodiments, arbitration, policy evaluation, render token generation, and constrained rendering operate in parallel pipelines. While a model produces later tokens, the arbitration engine finalizes verification for earlier segments, and render tokens may be generated for those segments once policy evaluation and governance checks are complete. This pipeline design maintains deterministic correctness while delivering interactive latency suitable for time-sensitive regulated workflows.

In clinical deployments, the arbitration engine functions as a deterministic safety guardrail that prevents hallucinated, unsupported, or contradicted statements from being presented as validated facts. Only sentences classified as supported—and permitted under policy evaluation—may be rendered. Sentences marked as not addressed or contradicted are masked, redacted, suppressed, or flagged for human review as required by policy. The display gate enforces these classifications by refusing to render any sentence that cannot be tied to governed evidence via a valid evidence pack identifier and citation checksum.

When governed records are corrected or superseded, the arbitration engine participates in the deterministic replay and supersession workflow described in "Correction Propagation and Superseding Views" section and FIG. 12. The engine reevaluates each sentence against the updated canonical deterministic ordering, producing a superseding verification structure as needed. This ensures that outdated or invalidated statements cannot persist in clinician-facing or operationally critical displays.

Policy Evaluator

The policy evaluator applies machine-interpretable, versioned institutional, regulatory, and workflow rules to the arbitration results and governed metadata. It determines which portions of candidate output may be rendered, must be masked or modified, or must be blocked entirely. The evaluator produces a deterministic policy decision state used by the display gate to enforce compliant rendering behavior and to ensure reproducibility under deterministic replay.

The policy evaluator receives the verification structure produced by the arbitration engine together with the canonical deterministic ordering of governed records, the evidence pack identifier, the citation checksum, and the contextual metadata associated with the request. The policy evaluator applies a set of machine-interpretable, versioned institutional, jurisdictional, or workflow-specific policies that determine whether each governed record may be used in the evidence pack, whether each sentence may be rendered for a particular user, and whether additional safety conditions must be satisfied before rendering is permitted.

Policy evaluation is fully deterministic. Given the same governed evidence, canonical ordering, policy version, arbitration results, and contextual parameters, the policy evaluator always yields the same policy decision state. This determinism ensures that replay, auditing, and supersession workflows reproduce the same outcomes when invoked under identical conditions.

Policies may incorporate clinician role, declared purpose of use, patient consent attributes, sensitive data classifications, time-of-care constraints, prerequisite clinical conditions, and institutional safety guidelines. Each policy rule is evaluated independently against the governed evidence contained in the canonical deterministic ordering and against the verification structure's sentence classifications (supported, not addressed, contradicted). Policies may prohibit rendering of statements derived from governed records outside a user's permitted visibility scope, require redaction for certain sensitive fields, disallow recommendations when prerequisite clinical conditions are missing, or require that unsupported or contradicted statements be masked or withheld.

The evaluator produces a policy decision state that specifies, for each segment of candidate output, whether it may be rendered, must be constrained, must be routed for human override, or must be blocked entirely. The policy evaluator also generates a policy trace, a deterministic record of each rule evaluated, the rule's outcome, the policy version applied, and references to the evidence pack identifier and citation checksum. The policy trace is recorded in the compliance ledger along with arbitration results and the deterministic generation parameters.

When governed records are corrected or superseded, or when policy versions change, the policy evaluator participates in the deterministic replay and supersession workflow described in "Correction Propagation and Superseding Views" section and FIG. 12. The evaluator reprocesses the corrected evidence pack—including its updated canonical deterministic ordering, evidence pack identifier, and checksum—and reevaluates all policy conditions. If any previously rendered content no longer satisfies policy requirements, the display gate and render token enforcement modules issue a superseding render token corresponding to the updated policy decision state and evidence pack, and the original token is invalidated.

The policy evaluator therefore governs the admissibility of model-generated content in a deterministic, reproducible, and auditable manner. By tying all rendering decisions to the canonical deterministic ordering, evidence pack identifier, citation checksum, and versioned policy set, the evaluator ensures that the rendering process remains compliant with consent, role-based restrictions, jurisdictional rules, safety prerequisites, and institutional guidelines. Render tokens may only be issued when the policy evaluator determines that all required rules have been satisfied, guaranteeing that rendered outputs are grounded in governed evidence and authorized under the institution's governance framework.

Display Gate and Render Token Enforcement

The display gate functions as the exclusive rendering boundary for all model-generated content and enforces both evidence-based and policy-based constraints. It receives constrained or candidate output together with arbitration structures, policy decision states, and contextual identifiers, and determines whether the content may be rendered. When rendering is allowed, the display gate issues a cryptographically authenticated render token that binds the output to the evidence pack, governing metadata, and session identity, ensuring that no model output can be displayed without verified lineage and authorization.

The display gate governs the creation, authentication, and enforcement of rendering rights for all model-assisted content and serves as the sole authorized rendering pathway. The display gate operates only as the terminal stage of the deterministic governance pipeline and consumes structured outputs from all prior deterministic subsystems, including the deterministic evidence pack, arbitration results, policy decision state, and render token metadata; it cannot function independently of these upstream components. It receives the constrained output produced by the constraint engine, the arbitration verification structure, the policy decision state, and the session or viewport identifiers associated with the requesting user. Before any rendering is permitted, the display gate verifies that the evidence pack identifier, citation checksum, and corresponding canonical deterministic ordering of governed records associated with the constrained output match a current, unsuperseded entry in the compliance ledger. Rendering cannot proceed unless the underlying governed evidence remains valid and consistent with the canonical ordering recorded at the time the evidence pack was constructed.

If rendering is allowed under the policy decision state, the display gate removes unsupported or disallowed spans identified during arbitration or policy evaluation, preserving grammatical coherence while ensuring that no contradicted or unverified statements appear. The display gate then initiates render token assembly. The token pre-assembly interface receives the constrained output together with deterministically derived metadata, including the evidence pack identifier, citation checksum, model identity, tokenizer identity, policy version, viewport or session binding, environmental or energy state, and a lineage reference. These elements are arranged into a canonical render token data structure in which field ordering and serialization rules are entirely deterministic. Identical governed inputs and policy conditions therefore yield identical canonical token structures during deterministic replay.

In some embodiments, the render token includes at least an evidence pack identifier, a citation checksum, a model identity, a tokenizer identity, a policy version identifier, and a viewport or session identifier, and may further include additional metadata such as environmental or energy state indicators, lineage references, revocation-related fields, or session-timestamp information.

The canonical render token data structure is provided to a cryptographic signing module, which produces an authenticated render token using digital signatures, message authentication codes, secure hashing, or hardware-rooted attestation. The authenticated render token is registered in the compliance ledger together with its construction parameters and becomes the authoritative reference for any rendering of the associated constrained output. The token has a limited temporal validity, is bound to the originating session or viewport, and cannot be reused across sessions or exported outside of permitted workflows.

Before content may be displayed, the requesting client must present the authenticated render token to the display gate or to a downstream render token validation module. The validator performs deterministic checks to ensure that: (i) the token's structural integrity and cryptographic signature are intact; (ii) the evidence pack identifier and citation checksum embedded in the token match the governed evidence entry and canonical deterministic ordering stored in the compliance ledger; (iii) the token has not expired; (iv) the token is bound to the correct user session or viewport; (v) the policy version recorded in the token remains current; and (vi) the token has not been revoked or superseded by correction events recorded in the compliance ledger. If any check fails, the display gate deterministically produces a rendering-block action, and the content cannot be displayed.

When governed records contributing to an evidence pack are corrected or superseded, the display gate participates in the deterministic replay and supersession workflow described in "Correction Propagation and Superseding Views" section and FIG. 12. The revocation engine records a token-revocation entry, and any subsequent validation attempt for the affected token automatically fails. A new render token is generated only after the evidence pack has been deterministically reconstructed, the canonical deterministic ordering updated, arbitration and policy evaluation reexecuted, and a new evidence pack identifier and citation checksum recorded in the ledger.

Rendered content may include a visible or invisible forensic watermark generated by a watermark binding unit. This watermark incorporates a linkage field cryptographically associated with the render token, the evidence pack identifier, the citation checksum, the model identity, and the session identifier. This linkage ensures that any rendered content-whether displayed internally or exported externally—can be unambiguously traced back to its governing evidence, policy conditions, and authorization event recorded in the compliance ledger.

Through deterministic construction of render tokens, cryptographic authentication, strict validation, and immutable ledger integration, the display gate ensures that no model-generated content is rendered unless it is grounded in governed evidence, verified by arbitration, authorized by policy evaluation, and tied to a current, unsuperseded deterministic evidence pack.

The display gate is an indispensable component of the unified deterministic governance pipeline, consuming outputs from all prior stages and enforcing cryptographically controlled rendering boundaries.

Compliance Ledger and Audit Subsystem

The compliance ledger records all significant governance events in an append-only format and serves as the authoritative system of record for deterministic replay, correction propagation, and regulatory auditing. For each governed data query, evidence pack construction, evidence pack reconstruction, model invocation, arbitration result, policy decision, render token issuance, token validation, and rendered view, the ledger writes an immutable entry that binds these events to the canonical deterministic ordering of governed records, the evidence pack identifier, and the citation checksum associated with the governing evidence pack.

Each ledger entry includes the deterministic scoring outputs, the canonical ordered sequence of governed records, the governed prompt hash, the model and tokenizer identity, deterministic decoding parameters, the policy version and policy-trace results, the arbitration classifications of each sentence, and the gating decision taken by the display gate. This holistic binding ensures that every rendered output, rejected output, or constrained result can be traced to its governing evidence, model identity, and policy constraints at the moment the rendering was authorized or blocked.

The ledger enables deterministic replay. Given the recorded canonical deterministic ordering, evidence pack identifier, tokenizer identity, governed prompt hash, and decoding parameters, the system reconstructs the same evidence pack, reinvokes the model under deterministic settings, reapplies arbitration and policy evaluation, and verifies that the resulting gate decision matches the recorded decision. If the governed data, lineage state, or applicable policies have changed since the original event, the ledger indicates that deterministic replay cannot reproduce the prior output, and the prior render token is identified as superseded or revoked.

When governed records are corrected or superseded, the ledger coordinates the deterministic replay and supersession workflow described in "Correction Propagation and Superseding Views" section and FIG. 12. The ledger stores a revocation entry linking each invalidated render token to the corrected governed record, the updated canonical deterministic ordering, and the replacement evidence pack identifier and citation checksum. Any attempt to validate a revoked token automatically fails, and a superseding render token is generated only after reconstitution of the evidence pack, reexecution of arbitration and policy evaluation, and issuance of a superseding rendering event. The ledger stores a supersession trace linking the original and replacement render tokens, ensuring a complete causal history.

For each rendered view, the ledger records the render token, the watermark-token linkage fields, the constrained output that was displayed, the session or viewport binding, and all relevant contextual metadata. This ensures that any rendered content—whether viewed internally or carried outside of institutional systems—can be cryptographically linked to its governing evidence and policy state.

In embodiments involving regulatory, institutional, or scientific audits, the compliance ledger supports the generation of a certified governance export. This export binds rendered content to the exact governed records, canonical deterministic ordering, arbitration results, policy decisions, environmental or energy state considerations, and display-gate actions that permitted or blocked rendering. Regulators, clinical-safety officers, or institutional reviewers may verify that model-generated outputs were governed, constrained, displayed, or suppressed in exact accordance with institutional, jurisdictional, and workflow-specific requirements.

Through immutable linkage of governed evidence, deterministic model invocation settings, sentence-level arbitration, policy decision states, render token events, and supersession workflows, the compliance ledger ensures a complete, verifiable, and reconstructable governance trail for all model-generated content.

Non-Limiting Example: Compliance Ledger Entry Format

In one embodiment, the compliance ledger stores each decision as an immutable ledger entry having a fixed field schema. An exemplary, non-limiting structure is shown below:

```
LedgerEntry {
  ledger_id: monotonically increasing identifier or hash-chain index;
  timestamp: cryptographically verifiable event time;
  causal_chain_id: identifier linking all events related to a single user request;
  evidence_pack_identifier: hash corresponding to the deterministic evidence pack used;
  governed_prompt_hash: hash of the serialized governed prompt delivered to the model;
  model_version: identifier of model parameters at time of invocation;
  tokenizer_identity: tokenizer reference used to build the evidence pack;
  decoding_parameters: deterministic decoding settings (e.g., temperature=0);
  arbitration_results: structured list mapping sentence indices to classification (supported /
contradicted / not addressed);
  policy_decision_state: policy version identifier and rule outcomes;
  gate_action: {allowed, constrained, escalated, blocked};
  render_token_metadata: when applicable, includes { token_id, validity_interval,
signature, session_binding };
  revocation_state: { valid, revoked, superseded_by: token_id };
  external_references: when applicable, includes identifiers for external scientific platform
jobs, datasets, or models;
  hash_of_entry: cryptographic hash of all above fields, forming an anchor in an append-
only chain;
}
```

The ledger MAY be implemented as a hash-chained sequence, a Merkle-tree-indexed store, WORM media, or an append-only database with cryptographic sealing. Identical inputs produce identical ledger entry hashes, allowing deterministic replay and evidentiary verification.

Correction Propagation and Superseding Views

The correction propagation subsystem ensures that updates, amendments, or corrections to governed records automatically propagate to prior decisions and rendered views. It identifies which outputs depended on superseded data, reconstructs evidence packs, reruns deterministic model invocation, and determines whether the original rendering remains valid. When prior outputs become invalid, the system issues revocation entries, produces superseding views, and records lineage transitions in a supersession trace to maintain a transparent audit trail.

Governed data may be corrected or amended due to clinical updates, metadata adjustments, device reconciliation, provenance refinement, or modifications to consent. When such corrections occur, the system determines which prior decisions, evidence packs, model invocations, or rendered views relied on governed records that have since been superseded. Because every rendered view is cryptographically bound to an evidence pack identifier, citation checksum, and the associated canonical deterministic ordering of governed records, any change to the underlying governed evidence may invalidate the prior evidence pack and the render token derived from it.

Upon detection of a corrected governed record, a correction indicator identifies all evidence packs that included the now-invalidated record or that would include the corrected version under deterministic reconstruction. A governed record impact analyzer uses lineage metadata, provenance chains, and deterministic selection rules to identify affected evidence pack identifiers, governed prompts, render tokens, arbitration structures, and policy decision states. These relationships are retrieved from the append-only compliance ledger, ensuring that every previously rendered view that depended on the superseded record is identified.

When an affected render token is detected, the system initiates the revocation and supersession workflow illustrated in FIG. 12. A revocation routing stage determines whether the evidence pack used to produce the token is outdated by comparing its evidence pack identifier, citation checksum, and canonical deterministic ordering with the updated governed evidence. If a mismatch exists, a revocation trigger is generated, and the render token revocation engine marks the affected render token as revoked. The revocation is recorded in the compliance ledger, and any future attempts to validate the token automatically fail.

The system then performs deterministic replay and reevaluation. A reevaluation request is dispatched to the deterministic replay controller, which retrieves the invocation metadata associated with the affected token, including model identity, tokenizer identity, decoding parameters, and the original evidence pack identifier. The system reconstructs a new evidence pack by reexecuting deterministic scoring, ranking, eligibility filtering, canonical deterministic ordering, and pack-identifier generation on the corrected governed data. The reconstructed evidence pack is assigned a new evidence pack identifier and citation checksum and is recorded as a new immutable ledger entry.

The deterministic generation controller reinvokes the model using the reconstructed governed prompt derived from the updated evidence pack. The arbitration engine reevaluates every sentence against the updated canonical deterministic ordering, and the policy evaluator recomputes the policy decision state under the active policy version. If all governed and policy conditions remain satisfied, the system may issue a new render token for the updated constrained output. If any portion of the original output is no longer supported by governed evidence, contradicted by corrected data, or prohibited under current policy, the system generates a superseding output that removes unsupported elements and applies any additional required constraints.

A superseding render token is issued only after the updated constrained output has successfully passed arbitration, policy evaluation, and render token validation. This replacement token is cryptographically bound to the new evidence pack identifier, citation checksum, canonical deterministic ordering, model identity, tokenizer identity, and viewport or session binding. The compliance ledger records a supersession trace that links the original revoked token to the superseding token, identifies the corrected governed record that triggered revocation, and records the policy version and environmental or energy state context in effect at the time the superseding output was generated.

The compliance ledger ensures that any client or downstream system attempting to use a revoked token, display a superseded view, or rely on outdated governed evidence will encounter a revocation state rather than the obsolete content. Through deterministic reconstruction, revocation, replay, and supersession, the system ensures that corrections propagate consistently across all downstream workflows and that outdated or invalidated model-generated content cannot persist in user-facing or regulated environments.

Multi-Model Consensus Arbitration

In some embodiments, the system invokes multiple artificial intelligence models using the same deterministic evidence pack, governed prompt, and decoding parameters. Each model receives identical deterministic inputs, including the canonical deterministic ordering of governed records, the associated evidence pack identifier, the citation checksum, the tokenizer identity, and the decoding configuration recorded in the compliance ledger. This guarantees that multi-model evaluation occurs over a shared, invariant evidence context.

Each model's output is independently evaluated by the arbitration engine using the same governed records and deterministic comparison rules. The arbitration engine classifies each sentence produced by each model as supported, not addressed, or contradicted relative to the evidence pack. These classifications, along with the model identity and the evidence pack identifier, are recorded as part of a model-specific verification structure. Because arbitration and comparison logic are deterministic, the resulting verification structures for each model are reproducible under deterministic replay conditions.

A consensus module receives the verification structures from all participating models and applies deterministic equivalence rules to determine whether the model outputs agree within defined evidence-bounded thresholds. Consensus rules may require identical factual assertions, numeric equivalence within a defined tolerance, semantic equivalence of clinical statements, or agreement on the absence or presence of contradictions. When consensus is achieved, the resulting consensus decision state is recorded in the compliance ledger along with the policy version, evidence pack identifier, citation checksum, and the canonical deterministic ordering that governed the comparison.

If consensus is not achieved, the consensus module may direct the display gate to constrain the output, escalate the request for human review, suppress or block statements for which no consensus exists, or decline to issue a render token. When consensus is required for safety-critical workflows, the display gate may refuse rendering entirely until a valid consensus state is established.

In embodiments involving correction propagation or supersession, the consensus module participates in the deterministic replay workflow described in "Correction Propagation and Superseding Views" section and FIG. 12. If governed data is corrected or superseded, the system reconstructs the evidence pack, regenerates the governed prompt, and reinvokes each model under deterministic settings. Arbitration and consensus evaluation are repeated for the corrected evidence context. Any render tokens issued under prior consensus evaluations are revoked, and a superseding consensus decision is generated only after all models have been reevaluated against the corrected canonical deterministic ordering.

All consensus results, including inter-model disagreements, contradiction patterns, decision thresholds, and supersession relationships, are recorded in the compliance ledger. This allows institutional reviewers and regulators to confirm that model-assisted content rendered to end users reflects not only deterministic evidence and policy compliance but also consistent inter-model agreement under defined governance criteria.

Token-Level Masking

In some embodiments, unsupported or disallowed segments of model-generated text are identified at token or sub-token granularity and masked or transformed according to the deterministic governance rules applied by the arbitration engine and policy evaluator. Masking decisions derive directly from the classification of each sentence or segment relative to the canonical deterministic ordering of governed records contained in the evidence pack. Any segment classified as contradicted or not addressed, or prohibited by policy, is ineligible for unmasked rendering.

Token-level masking is performed deterministically. Given the same governed evidence, canonical deterministic ordering, model output, arbitration structure, and policy decision state, the same spans are masked in the same way. This ensures that masked outputs are reproducible during deterministic replay and that masking decisions can be audited by institutional or regulatory reviewers. Masked segments may be replaced with placeholder tokens, symbolic markers, or policy-defined redactions that preserve grammatical coherence while preventing unsupported or sensitive content from appearing to the user.

The output of the token-level masking process becomes part of the constrained output delivered to the display gate. Masking metadata—including the identity of masked tokens, the governed record support classification producing the masking, the policy rule invoked, and the evidence pack identifier and citation checksum used during masking—is recorded in the compliance ledger. These masking decisions form part of the provenance chain for the rendered view and are included in the render token lineage references described in "Display Gate and Render Token Enforcement" section.

The display gate enforces that masked output may only be rendered when accompanied by a valid render token, and the render token is cryptographically bound to the masked content. Any attempt to modify, unmask, or reinterpret the content outside of the authorized masking specification causes token validation to fail and rendering to be refused. Token-level masking thus operates as an additional layer of governance ensuring that policy disallowed, unsupported, or contradicted statements do not appear in visible output, even if they were generated by the underlying model.

When governed records affecting a masked output are corrected or superseded, the system participates in the deterministic replay and supersession workflow described in "Correction Propagation and Superseding Views" section and FIG. 12. Masking decisions may change as previously unsupported statements become supported or vice versa, and the resulting constrained output may differ from the original version. Any render token corresponding to the prior masking state is revoked, and a new render token is issued only after arbitration, policy evaluation, and masking have been recomputed using the updated evidence pack identifier, citation checksum, and canonical deterministic ordering.

By enforcing deterministic token-level masking and cryptographic linkage to render tokens and compliance ledger records, the system ensures that only evidence-supported and policy-permitted content appears in any rendering, while maintaining complete auditability and deterministic reproducibility of all masking operations.

Deployment Models

The system supports multiple deployment models while preserving deterministic behavior, evidence-bound governance, and cryptographic rendering controls. In an on-premises configuration, all governed data, lineage metadata, evidence pack construction, deterministic model invocation, arbitration, policy evaluation, render token generation, and compliance ledger recording occur within the institution's secure computing environment. This configuration ensures that governed records never leave the institutional boundary and that all deterministic processes are executed under the institution's direct control.

In hybrid deployments, the governed store, evidence pack constructor, and compliance ledger remain on-premises, while certain compute-intensive components—such as deterministic model invocation or arbitration—may operate in a cloud environment or on institution-authorized external platforms. In such embodiments, the governed prompt transmitted to an external model is derived from a canonical deterministic ordering of governed records and includes the evidence pack identifier and citation checksum, ensuring that model invocation remains auditable and reconstructable even across distributed boundaries. External compute layers must return their results together with identifiers that allow deterministic replay using the institution's governed evidence.

To prevent unauthorized rendering outside the governance pipeline, render token validation and display-gate enforcement may be performed at the edge, including within clinician devices, bedside terminals, mobile clients, or embedded systems such as infusion pumps or monitoring consoles. In all cases, the device must validate the render token's cryptographic signature, confirm that the embedded evidence pack identifier and citation checksum match a current, unsuperseded entry in the compliance ledger, and verify that the token has not been revoked due to governed record corrections or policy updates. Rendering is refused if any validation step fails, ensuring that no content is displayed unless grounded in current governed evidence.

In multi-site or distributed environments, compliance ledger entries—including evidence pack identifiers, canonical deterministic orderings, render token records, revocation lists, and supersession traces—may be synchronized across institutional locations. Deterministic evidence pack reconstruction and deterministic replay can therefore be performed consistently at any site, ensuring that corrected governed data or policy changes propagate uniformly throughout the system. Each site participates in the same deterministic governance logic, and distributed components converge on the same governed evidence state.

In energy-constrained deployments, such as mobile or remote clinical settings, the policy evaluator and deterministic generation controller may incorporate local energy state or grid state inputs to determine whether model invocation or rendering should proceed, be downgraded, or be deferred. Edge devices may apply energy-aware constraints but continue to enforce deterministic rendering, pack-identifier validation, and render token authenticity even under reduced-resource conditions.

The system is compatible with institutionally bounded multi-model or multi-agent deployments. Each model or agent is treated as a governed principal subject to a restricted evidence envelope, policy scope, and deterministic invocation rules. Outputs from local or remote agents must pass through the institution's deterministic arbitration, policy evaluation, and render token generation pipelines before any rendering may occur. Unauthorized agents or workflows cannot bypass the display gate or generate valid render tokens, ensuring that all displayed content remains grounded in governed evidence and subject to institutional governance requirements.

Through these deployment models, the system preserves deterministic evidence fidelity, cryptographic rendering guarantees, auditable replay, and policy-compliant output governance across centralized, hybrid, distributed, and energy-constrained environments.

Implementation Flexibility and Equivalent Embodiments

The deterministic governance architecture described herein may be implemented in a wide range of hardware, software, cloud, or distributed configurations, so long as the deterministic evidence-selection, arbitration, policy evaluation, render token validation, and replay guarantees are preserved. The following section describes non-limiting equivalent embodiments that illustrate how the system's core deterministic and cryptographic enforcement properties may be realized using alternative data structures, execution environments, or cryptographic primitives. These equivalents ensure that the disclosed architecture is not restricted to any single implementation technique while retaining its unified deterministic governance behavior.

The deterministic governance architecture described in this section may be implemented using any combination of hardware, firmware, software, distributed systems, virtualized environments, isolated execution environments, or cloud-based infrastructures. Except where a specific ordering, structure, or mechanism is explicitly required to preserve deterministic replay, evidentiary lineage, or cryptographic validation behavior, the invention is not limited to any particular implementation technique.

In various embodiments, the governed store, deterministic evidence pack constructor, deterministic generation controller, arbitration engine, policy evaluator, display gate, render token validation engine, revocation engine, and associated orchestration components may be deployed as independent modules, combined into fewer modules, decomposed into submodules, executed on a single processor or across multiple processors, implemented using specialized hardware accelerators, or operated as managed services in an external environment. Any such arrangement is considered equivalent so long as it preserves the deterministic evidence-governance, reproducibility guarantees, and cryptographically enforced rendering behavior disclosed herein.

Operations described in this section—including deterministic governed record selection, canonical deterministic ordering, context-capacity computation, governed record comparison, numeric tolerance evaluation, semantic equivalence analysis, policy evaluation, cryptographic render token generation, render token validation, and deterministic supersession—may be implemented using any algorithms, data structures, or cryptographic primitives capable of producing functionally equivalent deterministic outcomes. Alternative deterministic comparison rules, structurally distinct ordering mechanisms, different hashing or signing schemes, varied normalization rules, or alternate serialization formats are regarded as equivalent implementations when they yield the same governed, deterministic, and policy-controlled rendering guarantees.

The deterministic evidence pack may be represented using ordered lists, arrays, balanced trees, authenticated data structures such as Merkle trees, graph-based ordering structures, or any representation that preserves an unambiguous canonical ordering of governed records across deterministic replay. The selection of a specific structure is not limiting provided that deterministic reconstruction of the evidence pack remains feasible and that the evidence pack identifier and citation checksum remain reproducible.

The arbitration engine may employ any deterministic segmentation or comparison mechanism, including but not limited to rule-based segmentation, deterministic tokenization pipelines, semantic-equivalence mappings, timestamp-anchored numeric comparisons, lineage-sensitive equality rules, or token-level masking decisions. Whether implemented using exact-match rules, structured similarity mappings, or deterministic semantic operators, any arbitration mechanism is considered equivalent when it reliably classifies candidate output as supported, contradicted, or not addressed relative to governed records in a reproducible manner.

The policy evaluator may employ any machine-interpretable representation of rules, including declarative policy languages, decision tables, expression trees, compiled rule sets, or logical inference engines. Variations in policy engines, provided they produce a deterministic and reproducible policy decision state based on governed evidence, arbitration results, contextual metadata, and versioned policies, are regarded as equivalent embodiments.

The display gate and render token mechanisms may be implemented using software enforcement layers, secure enclaves, hardware roots of trust, TPM-based attestations, cryptographic validation circuitry, virtual machine isolation, or hypervisor-level enforcement. Render tokens may use digital signatures, message authentication codes, authenticated data structures, or any cryptographically secure construction that binds constrained output to evidence pack lineage, policy conditions, and environmental metadata. Any mechanism that prevents rendering of content unless a valid, non-revoked, cryptographically authenticated render token is presented is considered an equivalent implementation.

Nothing in this disclosure limits the invention to a specific communication protocol, storage architecture, serialization format, database schema, comparison rule set, cryptographic primitive, or implementation language. Any alternative implementation that preserves deterministic evidence-governance behavior, reproducible inference according to canonical deterministic ordering, and cryptographically enforced rendering constraints is regarded as an equivalent embodiment of the unified deterministic governance architecture described herein.

Additional Embodiments: Multimodal Evidence Packs, Non-Textual Arbitration, and Governed Agent Mixtures In some embodiments, the governed store receives and maintains multimodal medical data that includes waveform data, still images, and video streams in addition to textual records. For example, a monitored procedure may produce a video feed that is segmented into keyframes, each keyframe being represented by one or more feature vectors and spatial object tags that identify the presence, location, and size of clinically relevant structures. The evidence pack constructor is configured to select such video-derived governed records using the same deterministic rules applied to textual governed records, including deterministic inclusion based on time windows, patient identifiers, device identifiers, and provenance metadata. For a given interval, the evidence pack may therefore contain both textual progress notes and a sequence of video keyframes, each represented as a governed record with a keyframe index, spatial tags, and a pointer or checksum referencing a governed media store. When a model capable of processing video or other multimodal inputs is invoked, the deterministic generation controller supplies only those governed video elements included in the deterministic evidence pack so that any video-based candidate output remains grounded in a reproducible subset of governed records.

In further embodiments, the arbitration engine is configured to evaluate candidate outputs that are not purely textual. A video analysis model, for example, may produce a sequence of keyframe-level annotations indicating the presence or absence of anatomical structures, instruments, or procedural steps. The arbitration engine deterministically segments this candidate output into annotation units, aligns each annotation unit with governed records included in the evidence pack, and classifies each annotation unit as supported, contradicted, or not addressed. The resulting verification structure associates each non-textual annotation with explicit evidence linkages, enabling the policy evaluator to determine whether such annotations may be rendered, must be suppressed, or must be visually marked as unverified or contradicted in a clinical viewport.

In additional embodiments, an external scientific AI platform may expose a mixture of agents or expert subsystems that collaborate to produce candidate outputs. For example, one agent may generate differential diagnoses, another may propose procedural workflows, and another may summarize video-based clinical findings. The governance system treats each such agent as a governed principal that must operate through the deterministic evidence pack, arbitration, policy evaluation, and display-gate pipeline. Agent identities and declared capabilities may be bound to least-privilege tokens that restrict which governed records an agent may access, which models it may invoke, and which classes of candidate outputs it may propose. Any candidate outputs produced by such agents—including proposed workflows, annotations, or recommendations—are subjected to the same deterministic segmentation, evidence-based arbitration, and policy-controlled rendering constraints as human-initiated requests. Thus, increases in expressive power obtained through mixtures of experts or agent frameworks do not bypass the deterministic governance mechanisms described herein.

Although the architectures described herein could be extended to population-level monitoring or other broad-scale analytic environments, the system is specifically described in the context of regulated clinical, life-sciences, and critical-infrastructure environments. In such environments, the primary goal is to enforce truthful, evidence-bound, and policy-compliant use of artificial intelligence rather than unrestricted or non-consensual surveillance. Deployment choices and policy configurations determine which environments may receive governed outputs, and the same deterministic governance mechanisms may be used to prevent unauthorized or non-compliant uses of governed data or model-generated content.

Integration With External Scientific AI Platforms

In embodiments where external scientific AI platforms, autonomous workflow agents, or orchestration layers initiate tasks or model invocations, each such entity is treated as a governed principal operating under a deterministic, evidence-bound governance framework. Every agent is assigned an explicit identity, role, privilege scope, purpose-of-use constraints, and evidence-access envelope defining which governed records, external models, workflows, or export channels it may access. Agents cannot exceed their assigned privileges or bypass the deterministic governance architecture.

All agent-initiated actions—including model invocation, data retrieval, workflow chaining, parameter optimization, or multi-step reasoning—must be performed using the same deterministic evidence pack construction described in "Deterministic Evidence Pack Constructor" section and FIG. 3. Agents receive only the governed prompt derived from the canonical deterministic ordering of governed records, the evidence pack identifier, the citation checksum, and the tokenizer identity associated with the deterministic invocation. Agents may not directly access raw governed data unless explicitly permitted by policy and consent constraints. This mechanism ensures that all autonomous or semi-autonomous reasoning remains grounded in authoritative governed evidence.

Agents that invoke external scientific AI platforms must do so through an authenticated connector that enforces deterministic invocation semantics. The connector receives the governed prompt, evidence pack identifier, and checksum, and ensures that the external platform executes the requested task under controlled and recordable conditions. The resulting external outputs—whether scientific predictions, simulation results, or multi-agent reasoning artifacts—are returned with platform-specific identifiers, model versions, dataset references, and execution metadata. These are recorded in the compliance ledger, allowing deterministic replay to reestablish exactly which external platform resources contributed to a rendered view or downstream decision.

All agent-generated outputs, including intermediate reasoning steps, proposed actions, workflow expansions, and tool calls, must pass through the arbitration engine and policy evaluator before they may be displayed or used in downstream workflows. Unsupported or contradicted assertions made by agents are removed or masked during token-level masking, and policy-prohibited content is constrained or blocked. The display gate and render token generation function identically for agent-produced outputs: no agent may cause content to be rendered unless a valid cryptographically authenticated render token is issued and validated. Render tokens for agent outputs are bound to the underlying evidence pack, policy version, canonical ordering, and session or agent context, preventing unauthorized or unverified agent behavior.

In embodiments involving agent chaining or multi-agent orchestration, each agent is required to operate deterministically upon the outputs of prior agents. The canonical deterministic ordering, evidence pack identifier, and citation checksum bind the chain to a single, consistent evidence context. Any correction to governed data triggers deterministic replay of each agent's contributions in the chain, with supersession and revocation applied to all dependent render tokens in accordance with FIG. 12. Agent workflows cannot diverge nondeterministically; each step remains auditable, reconstructable, and cryptographically bound to its governing evidence.

All agent-initiated activities—including those performed by autonomous, self-optimizing, or self-modifying agents—are recorded in the compliance ledger with their associated evidence pack identifier, canonical deterministic ordering reference, external platform invocation identifiers, model versions, policy decisions, render tokens, and supersession relationships. This ensures that regulators, institutional reviewers, and scientific auditors can reconstruct all agent behavior and confirm compliance with institutional, workflow-specific, jurisdictional, and scientific-governance rules.

Through deterministic evidence binding, cryptographic token gating, ledger-based auditing, and controlled integration with external scientific AI platforms, the system ensures that autonomous agents operate within a reproducible, safety-critical, and policy-compliant governance framework—regardless of whether they run locally, remotely, or across multi-agent orchestration layers.

Energy and Grid Aware Governance Embodiments

In some embodiments, the policy evaluator and orchestration components interoperate with external energy or electrical-grid telemetry sources. These sources may provide real-time or forecasted signals describing current electrical load, reserve capacity, energy price, carbon intensity, grid-stability margins, or declared emergency conditions from an energy management authority. These signals are treated as governed environmental metadata and are incorporated into the deterministic governance pipeline. The environmental state is recorded in the compliance ledger and embedded into the render token's environmental-state field.

Energy or grid state inputs may influence whether a model invocation or rendering request should proceed, be constrained, be shifted to a lower-resource mode, or be deferred. Policy rules may require that certain classes of AI workloads—such as retrospective analytics, simulation runs, batch workloads, or exploratory queries—be paused or rescheduled when grid load exceeds a defined threshold or when reserve capacity falls below institutionally defined safety margins. Conversely, time-critical clinical workflows or operational safety workflows may be permitted to continue even under constrained grid conditions, provided that the environmental state recorded at the time of invocation is captured in the ledger and validated during render token issuance.

Before a render token may authorize display of content, the display gate verifies that the environmental conditions embedded in the token match the active environmental state recorded in the compliance ledger or a policy-approved environmental range. If the environmental state has changed in a way that invalidates the conditions under which the prior token was issued, the token fails validation and is refused. When environmental or grid state conditions evolve between model invocation and rendering, or when policy thresholds change, the system may require deterministic replay and supersession as described in "Correction Propagation and Superseding Views" section and FIG. 12. Prior render tokens are revoked, and new tokens are issued only if the updated environmental conditions satisfy current policy constraints.

In energy-system embodiments, the system may govern AI models that propose control actions for power generation, storage, grid balancing, or load shedding. In such configurations, the arbitration engine compares model-proposed actions against governed records describing the current system state, operational constraints, asset capabilities, and safety limits. The policy evaluator may require that certain grid state conditions or reserve margins be satisfied before a model-assisted recommendation can be rendered to a human operator or executed by automated systems. The display gate ensures that no grid-control recommendation may be viewed or acted upon unless accompanied by a valid render token whose environmental-state metadata and evidence pack identifier have passed validation.

Deterministic replay supports auditability for energy-governance workflows. Given the recorded canonical deterministic ordering, evidence pack identifier, environmental state, and deterministic decoding and policy parameters, the system can reconstruct the same output and verify that the same decision would have been reached. If environmental-state conditions differ from those recorded originally, replay indicates that the previous decision cannot be reproduced, and the prior render token is superseded.

Through integration of energy- and grid-aware inputs into deterministic evidence governance, policy-controlled model invocation, cryptographic rendering controls, and immutable compliance ledger tracking, the system ensures that safety-critical AI decisions—including clinical, operational, and energy-system decisions—remain grounded in deterministic evidence, validated by policy, and bound to the environmental conditions under which they were authorized.

Energy and grid state metadata form part of the render token lineage and directly influence rendering eligibility under the policy evaluator, thereby integrating environmental governance as a required and inseparable component of the deterministic evidence-controlled rendering pipeline.

The invention claimed is:

1. A computer-implemented system comprising:

one or more processors;

one or more non-transitory memory devices storing processor-executable instructions; and one or more databases forming a governed store accessible by the one or more processors, wherein the processor-executable instructions, when executed by the one or more processors, cause the one or more processors to perform operations comprising:

receiving data, associating the data with identifiers, normalizing the data, applying a digital signature or message authentication code to each governed record as an integrity protection mechanism, and persisting the governed records in the governed store;

constructing a deterministic evidence pack by deterministically selecting governed records from the governed store according to a question or request, forming a deterministic evidence pack having a canonical deterministic ordering of governed records and a pack identifier, and enforcing a context-capacity acceptance band by augmenting or pruning governed records according to deterministic rules based on tokenizer identity and available representational capacity, wherein factual validity is determined exclusively by deterministic comparison of symbolic or textual elements of a model-produced output against governed records contained in the deterministic evidence pack;

constructing a governed prompt from the deterministic evidence pack, verifying that a tokenizer identity associated with a selected model matches a tokenizer identity used to form the deterministic evidence pack, invoking the model using deterministic decoding settings, and recording model version, tokenizer identity, governed prompt hash, and the pack identifier in a compliance ledger as part of an immutable audit trail;

analyzing a candidate output produced by the model, segmenting the candidate output into sentences, comparing each sentence to the governed records contained in the deterministic evidence pack, and classifying each sentence as supported, contradicted, or not addressed;

applying versioned machine-interpretable policy rules to the arbitration results and metadata associated with governed records, consent, role, jurisdiction, and purpose of use, to determine one or more rendering constraints;

executing a display-gate rendering process as a sole authorized rendering pathway for model-generated content, the display-gate rendering process requiring, as a mandatory precondition to any rendering, presentation of a valid, cryptographically authenticated render token corresponding to a matching ledger entry in the compliance ledger, masking or removing unsupported or disallowed content, and generating a cryptographically authenticated render token binding the constrained output to at least a pack identifier, a citation checksum, a model identity, a tokenizer identity, a viewport or session binding, and a policy version identifier, said render token being appended to the compliance ledger;

validating, by the one or more processors, cryptographic signature correctness, structural integrity, evidence pack binding, citation checksum consistency, and ledger correspondence of each render token, and refusing rendering upon validation failure; and generating revocation entries in the compliance ledger when governed records are corrected or superseded, and invalidating render tokens whose lineage depends on superseded or incorrect governed records;

wherein the display-gate rendering process refuses to render any constrained or graphical output unless the presented render token is valid, non-revoked, cryptographically authenticated, and matched to a corresponding entry in the compliance ledger.

2. The system of claim 1, wherein applying the versioned machine-interpretable policy rules comprises applying regulatory machine-interpretable rules derived from Software-as-a-Medical-Device requirements or from versioned machine-learning lifecycle-control requirements encoded in the policy rules, and preventing rendering of model output that violates a regulatory prerequisite represented in the policy rules.

3. The system of claim 1, wherein applying the versioned machine-interpretable policy rules comprises applying ethical or institutional-review-board rules and preventing rendering of model output that violates an ethical, human oversight, or institutional authorization constraint.

4. The system of claim 1, wherein applying the versioned machine-interpretable policy rules comprises preventing rendering of model output that requires clinical safety prerequisites that are absent from the governed records, including prerequisite laboratory values, imaging results, or vital sign measurements.

5. The system of claim 1, wherein the deterministic evidence pack includes a canonical, deterministic ordering of references to governed records, the ordering being hashed together with a citation checksum to generate a lineage value that is embedded within a render token and verified by the one or more processors prior to permitting any rendering.

6. The system of claim 1, wherein the processor-executable instructions further cause the one or more processors to deterministically reproduce, during a streaming replay operation, partial output sequences, segment boundaries, and intermediate arbitration outcomes from a prior model invocation.

7. The system of claim 1, wherein supersession of a rendered view triggers execution by the one or more processors of deterministic reconstruction of the evidence pack, deterministic replay of the model invocation, reevaluation of arbitration and policy decisions, and generation of a superseding render token cryptographically linked to the revoked token.

8. The system of claim 1, wherein the render token is serialized by the one or more processors according to a canonical field ordering such that identical governed inputs always generate an identical token payload prior to cryptographic signing.

9. The system of claim 1, wherein the processor-executable instructions further cause the one or more processors to invoke two or more artificial intelligence models using the same governed prompt and evidence pack, to verify each model's candidate output independently against the evidence pack, and to determine eligibility for rendering only when a consensus condition is satisfied that requires at least a configured degree of agreement among the verified candidate outputs.

10. The system of claim 1, wherein the processor-executable instructions further cause the one or more processors to construct governed prompts that include governed records from the governed store together with references to external datasets or models exposed by an external scientific artificial intelligence platform, invoke one or more external models through a network connector interface under deterministic invocation and logging semantics, and treat outputs produced by the external scientific artificial intelligence platform as candidate model outputs subject to the same sentence-level verification and policy checks as outputs produced by locally hosted models.

11. The system of claim 1, wherein applying the versioned machine-interpretable policy rules further comprises deterministically incorporating external energy state or grid state metadata into the policy decision state, and wherein the energy state or grid state metadata forms part of the render token lineage such that rendering eligibility is reproducibly dependent on the recorded environmental conditions at the time of token issuance.

12. The system of claim 1, wherein the system further comprises an edge device including an edge processor and edge memory storing client validation instructions that, when executed by the edge processor, independently validate the render token, check revocation status, and refuse rendering when environmental or policy conditions have changed since token issuance.

13. The system of claim 1, wherein analyzing the candidate output comprises evaluating numerical claims using configured tolerances defined relative to governed data values and verified time windows.

14. The system of claim 1, wherein applying the versioned machine-interpretable policy rules comprises applying rules specifying role-based visibility restrictions or jurisdiction-specific limitations.

15. The system of claim 1, wherein the display-gate rendering process generates, by the one or more processors, a deterministic watermark derived from the render token, the watermark being constructed from a cryptographically bound checksum that uniquely identifies at least an evidence pack identifier, a citation checksum, a policy version identifier, and environmental metadata, thereby enabling forensic validation of constrained output rendered to a viewport.

16. The system of claim 1, wherein the processor-executable instructions further cause the one or more processors to condition rendering of any constrained or graphical output on presentation of a valid render token that is cryptographically authenticated and not revoked, to prevent rendering when the render token is missing, invalid, expired, revoked, or fails cryptographic validation, and to verify that the render token corresponds to a matching record maintained in a compliance ledger.

17. A computer-implemented method comprising:

receiving data and forming governed records by associating the data with identifiers, normalizing the data, applying a digital signature or message authentication code to each governed record as an integrity protection mechanism, and persisting the governed records in a governed store;

constructing a deterministic evidence pack by deterministically selecting governed records from the governed store according to a question or request, forming a canonical deterministic ordering of the governed records, computing a utilization of representational capacity based on tokenizer identity, and enforcing a context-capacity acceptance band by augmenting or pruning governed records according to deterministic rules;

constructing a governed prompt from the deterministic evidence pack, verifying that a tokenizer identity associated with a selected model matches a tokenizer identity used to form the deterministic evidence pack, invoking the model using deterministic decoding settings, and recording a model version, tokenizer identity, governed prompt hash, and a pack identifier in a compliance ledger as part of an immutable audit trail;

analyzing candidate output produced by the model by segmenting the candidate output into sentences, comparing each sentence to governed records contained in the deterministic evidence pack, and classifying each sentence as supported, contradicted, or not addressed;

applying versioned machine-interpretable policy rules to the classification results and metadata associated with governed records, consent, role, jurisdiction, and purpose of use to obtain a policy decision state;

generating a cryptographically authenticated render token when permitted by the policy decision state, the render token binding a constrained output to a pack identifier, a citation checksum, a model identity, a tokenizer identity, and a viewport or session identifier, and recording the render token in the compliance ledger; and rendering the candidate output only when accompanied by a valid, non-revoked, cryptographically authenticated render token, and blocking rendering of the candidate output when the render token is absent, invalid, expired, or fails validation.

18. A non-transitory computer-readable medium storing instructions that, when executed by one or more processors, cause the one or more processors to perform operations comprising:

receiving data and forming governed records by associating the data with identifiers, normalizing the data, applying a digital signature or message authentication code to each governed record as an integrity protection mechanism, and persisting the governed records in a governed store;

constructing a deterministic evidence pack by deterministically selecting governed records from the governed store according to a question or request, forming a canonical deterministic ordering of the governed records, computing a utilization of representational capacity based on a tokenizer identity, and enforcing a context-capacity acceptance band by augmenting or pruning governed records according to deterministic rules;

constructing a governed prompt from the deterministic evidence pack, verifying that a tokenizer identity associated with a selected model matches a tokenizer identity used to form the deterministic evidence pack, invoking the model using deterministic decoding settings, and recording a model version, tokenizer identity, governed prompt hash, and a pack identifier in a compliance ledger as part of an immutable audit trail;

analyzing candidate output produced by the model by segmenting the candidate output into sentences, comparing each sentence to governed records contained in the deterministic evidence pack, and classifying each sentence as supported, contradicted, or not addressed;

applying versioned machine-interpretable policy rules to the classification results and metadata associated with governed records, consent, role, jurisdiction, and purpose of use to obtain a policy decision state;

generating a cryptographically authenticated render token when permitted by the policy decision state, the render token binding a constrained output to a pack identifier, a citation checksum, a model identity, a tokenizer identity, and a viewport or session identifier, and recording the render token in the compliance ledger; and rendering the candidate output in response to verifying that a valid, non-revoked, cryptographically authenticated render token is present, and refraining from rendering the candidate output when the render token is absent, invalid, expired, or fails validation.

19. A computer-implemented system comprising:

one or more processors;

one or more non-transitory memory devices storing processor-executable instructions; and a client device including a display and client validation instructions executable by a client processor, wherein the processor-executable instructions, when executed by the one or more processors, cause the one or more processors to perform a display-gate rendering process as a sole authorized rendering pathway for model-generated content, the display-gate rendering process comprising receiving candidate output, a verification structure, and a policy decision state;

constraining, by the one or more processors, the candidate output by removing or transforming unsupported or disallowed portions according to the verification structure and the policy decision state;

generating, by the one or more processors, a render token that cryptographically binds the constrained output to an evidence pack identifier, a citation checksum, a model identity, a tokenizer identity, and a validity interval; and transmitting the constrained output and the render token to the client device, wherein execution of the client validation instructions causes the client device to render content only when a valid render token is presented, to reject content lacking a valid render token, and to refuse rendering of expired, revoked, or mismatched tokens;

wherein the render token is time-limited and is automatically invalidated upon governed record correction or supersession.

20. The system of claim 19, wherein the render token includes a lineage field that encodes a citation checksum and a pack identifier, and execution of the client validation instructions causes the client device to validate the lineage field against a corresponding lineage entry recorded in the compliance ledger, refusing rendering when the lineage does not match due to governed record correction, supersession, or policy state updates.

* * * * *